(12) United States Patent
Koenig et al.

(10) Patent No.: US 8,706,599 B1
(45) Date of Patent: Apr. 22, 2014

(54) SYSTEM AND METHOD OF GENERATING INVESTMENT CRITERIA FOR AN INVESTMENT VEHICLE THAT INCLUDES A POOL OF ESCROW DEPOSITS FROM A PLURALITY OF MERGER AND ACQUISITION TRANSACTIONS

(71) Applicant: Shareholder Representative Services, LLC, Denver, CO (US)

(72) Inventors: William P. Koenig, Denver, CO (US); Glenn A. Kramer, San Francisco, CA (US); Mark B. Vogel, San Francisco, CA (US)

(73) Assignee: Shareholder Representative Services, LLC, Denver, CO (US)

( * ) Notice: Subject to any disclaimer, the term of this patent is extended or adjusted under 35 U.S.C. 154(b) by 76 days.

(21) Appl. No.: 13/672,139

(22) Filed: Nov. 8, 2012

Related U.S. Application Data

(60) Provisional application No. 61/692,909, filed on Aug. 24, 2012.

(51) Int. Cl.
*G06Q 40/00* (2012.01)
(52) U.S. Cl.
USPC .......................................... 705/36 R; 705/35
(58) Field of Classification Search
USPC ...................................... 705/35–45
See application file for complete search history.

(56) References Cited

U.S. PATENT DOCUMENTS

| | | | |
|---|---|---|---|
| 5,704,044 A | 12/1997 | Tarter et al. | |
| 7,546,264 B2 | 6/2009 | Charnley, Jr. | |
| 7,870,067 B2 | 1/2011 | Crowl | |
| 7,949,589 B2 | 5/2011 | Halpin | |
| 8,108,268 B1 | 1/2012 | Andrews | |
| 8,219,471 B2 | 7/2012 | Abuaf | |
| 2003/0046207 A1 | 3/2003 | Torre et al. | |
| 2006/0293992 A1 | 12/2006 | Blair | |
| 2007/0233589 A1 | 10/2007 | Vasinkevich | |
| 2008/0065532 A1 | 3/2008 | De La Motte | |
| 2009/0030853 A1 | 1/2009 | De La Motte | |
| 2010/0023459 A1 | 1/2010 | Sundby | |
| 2010/0268668 A1 | 10/2010 | Burdette | |
| 2012/0095873 A1 | 4/2012 | Narang et al. | |

OTHER PUBLICATIONS

"2011 Private Target Mergers & Acquisitions Deal Points Study," American Bar Association Business Law Section, 2011, 116 pages.

(Continued)

*Primary Examiner* — Seth Weis
(74) *Attorney, Agent, or Firm* — Panitch Schwarze Belisario & Nadel LLP

(57) ABSTRACT

An automated method is provided for generating investment criteria for an investment vehicle that includes a pool of escrow deposits from a plurality of merger and acquisition transactions. An escrow history database is maintained of data derived from historical behavior of escrows from a plurality of previous merger and acquisition transactions. An escrow pool database is maintained of current escrow deposit data from a plurality of current merger and acquisition transactions. The escrow pool database includes the current deposit amounts in the pool of escrow deposits, and stated terms governing the release of each deposit amount in the pool of the escrow deposits. A set of investment criteria for selecting an asset pool is generated using a processor operating on the escrow history database and the escrow pool database. The set of investment criteria includes maturity metrics selected from the group consisting of weighted average maturity, convexity, and maturity distribution profile.

20 Claims, 45 Drawing Sheets

(56) References Cited

OTHER PUBLICATIONS

Mutual Fund Essentials. Printout from web page: <http://www.bmo.com/home/personal/banking/investments/mutual-funds/mf-essentials> Download date: Mar. 26, 2012, original posting date: unknown, 3 pages.

Heritage Group Plan: Contribution Period. Printout from web page: <http://www.heritagerep.com/uploadedFiles/GroupPlanBook.pdf> Copyright © Heritage Education Funds, Inc., Download date: Mar. 2012, original posting date: unknown, 28 pages.

| transaction_type | transaction_date | amount | day | escrow_days |
|---|---|---|---|---|
| DEPOSIT | 2008-03-17 | 6000000.00 | 0 | 365 |
| INVESTMENT_EARNINGS | 2008-04-01 | 63.71 | 8 | 365 |
| INVESTMENT_EARNINGS | 2008-04-28 | 35.77 | 37 | 365 |
| INVESTMENT_EARNINGS | 2008-05-29 | 154.18 | 67 | 365 |
| DISBURSEMENT | 2008-06-02 | -2500.00 | 73 | 365 |
| INVESTMENT_EARNINGS | 2008-06-28 | 163.29 | 95 | 365 |
| INVESTMENT_EARNINGS | 2008-07-29 | 154.81 | 128 | 365 |
| INVESTMENT_EARNINGS | 2008-08-28 | 163.29 | 158 | 365 |
| INVESTMENT_EARNINGS | 2008-09-30 | 163.73 | 190 | 365 |
| INVESTMENT_EARNINGS | 2008-10-28 | 301.33 | 220 | 365 |
| INVESTMENT_EARNINGS | 2008-11-29 | 126.50 | 249 | 365 |
| INVESTMENT_EARNINGS | 2008-12-29 | 191.71 | 281 | 365 |
| INVESTMENT_EARNINGS | 2009-01-30 | 80.11 | 312 | 365 |
| DISBURSEMENT | 2009-03-10 | -6500098.69 | 381 | 365 |

FIG. 7

EscrowTransaction table definition 700

```
CREATE TABLE EscrowTransaction (
      deal_id INT NOT NULL,
      account_type VARCHAR(100),
      transaction_type VARCHAR(100),
      transaction_id INT NOT NULL PRIMARY KEY,
      transaction_date DATE NOT NULL,
      first_deposit_date DATE NOT NULL,
      last_non_expense_release_date DATE,
      amount DOUBLE NOT NULL,
      initial_escrow DOUBLE NOT NULL,
      days_from_close INT,
      total_escrow_days INT,
      INDEX idx(deal_id, transaction_date)
);
```

FIG. 8

SimulationTransaction table definition 800

```
CREATE TABLE SimulationTransaction (
     sim_name VARCHAR(200),
     sim_iteration INT,
     sim_day    INT,
     deal_id   INT,
     transaction_id   INT,
     transaction_type VARCHAR(100),
     amount    DOUBLE,
     UNIQUE idx1(sim_name, sim_iteration, transaction_id),
     INDEX idx2(sim_name, sim_day, sim_iteration),
     INDEX idx3(sim_name)
);
```

SimulationLedger table definition 820

```
CREATE TABLE SimulationLedger (
     sim_name VARCHAR(200),
     sim_iteration INT,
     sim_day    INT,
     balance  DOUBLE,
     deals_to_date   INT,
     deal_dollars_to_date   DOUBLE,
     UNIQUE idx1(sim_name, sim_iteration, sim_day)
);
```

FIG. 9    EventQueue code fragment 900

```
public class EventQueue { private double accountBalance = 0;
    private HashMap<Integer,ArrayList<SimEvent>> queue =
        new HashMap<Integer,ArrayList<SimEvent>>();

public EventQueue () {} public double getAccountBalance () {
        return accountBalance;
    } public void processEvents (int dt) {
        ArrayList<SimEvent> evts = getEventList(dt);
        for (SimEvent e : evts) {
            accountBalance += e.tx_amount;
        }
        setEventList(dt, null);
    } private void setEventList (int dt,
                               ArrayList<SimEvent> evts) {
        queue.put(dt, evts);
    } private ArrayList<SimEvent> getEventList (int dt) {
        ArrayList<SimEvent> evts = queue.get(dt);
        if (evts==null) {
            evts = new ArrayList<SimEvent>();
        }
        return evts;
    } public void addEvent(int dt, SimEvent evt) {
        ArrayList<SimEvent> evts = getEventList(dt);
        // add item
        evts.add(evt);
        queue.put(dt, evts);
    }
}
```

FIG. 10

SimEvent code fragment 1000

```
public class SimEvent { public int deal_id;
    public int tx_days;
    public String tx_type;
    public double tx_amount;   // negative for disbursement
    public int tx_id;

// constructor
    public SimEvent (int dealId, String txType,
                     double txAmt, int txDays, int txId) {
        this.deal_id = dealId;
        this.tx_amount = txAmt;
        this.tx_type = txType;
        this.tx_days = txDays;
        this.tx_id = txId;
    }

}
```

Flowchart 1100

FIG. 12

Stored Procedure 1200

```
DELIMITER //
DROP PROCEDURE IF EXISTS simulationStats//
CREATE
        DEFINER='xxx'@'localhost'
        PROCEDURE simulationStats (IN nm VARCHAR(200))
        SQL SECURITY INVOKER
        READS SQL DATA

BEGIN

DROP TABLE IF EXISTS tmp_sim_stats;

CREATE TEMPORARY TABLE tmp_sim_stats AS
SELECT * FROM
(SELECT sim_name, sim_day, count(balance) AS c,
      MIN(balance) as minimum,
      AVG(balance) AS average,
      MAX(balance) as maximum,
      MIN(deals_to_date) AS deals,
      MIN(deal_dollars_to_date) AS dollars
   FROM SimulationLedger
      WHERE sim_day>0 AND sim_name=nm GROUP BY sim_day
) derived;
UPDATE tmp_sim_stats SET minimum=0 WHERE sim_day>100 AND c<=2;
UPDATE tmp_sim_stats SET minimum=0,average=(maximum/3.0)
      WHERE sim_day>100 AND c=1;
SELECT sim_day,
      FORMAT(minimum, 2) AS minimum,
      FORMAT (average, 2) AS average,
      FORMAT (maximum, 2) AS maximum
   FROM tmp_sim_stats;

END //

DELIMITER ;
```

FIG. 13

SQL code 1300

```
SELECT sim_name,
       sim_day,
       FORMAT (minimum,2) AS minimum,
       FORMAT(average,2) AS average,
       FORMAT (maximum,2) AS maximum,
       deals,
       FORMAT (1-minimum/dollars,2) AS fracUsed
    FROM tmp_sim_stats
    WHERE sim_name='1dpd-300-500-200-1000'
    GROUP BY sim_day
    INTO OUTFILE '/tmp/cone-1dpd-300-500-200-1000.csv'
        FIELDS TERMINATED BY ','
        OPTIONALLY ENCLOSED BY '"';
```

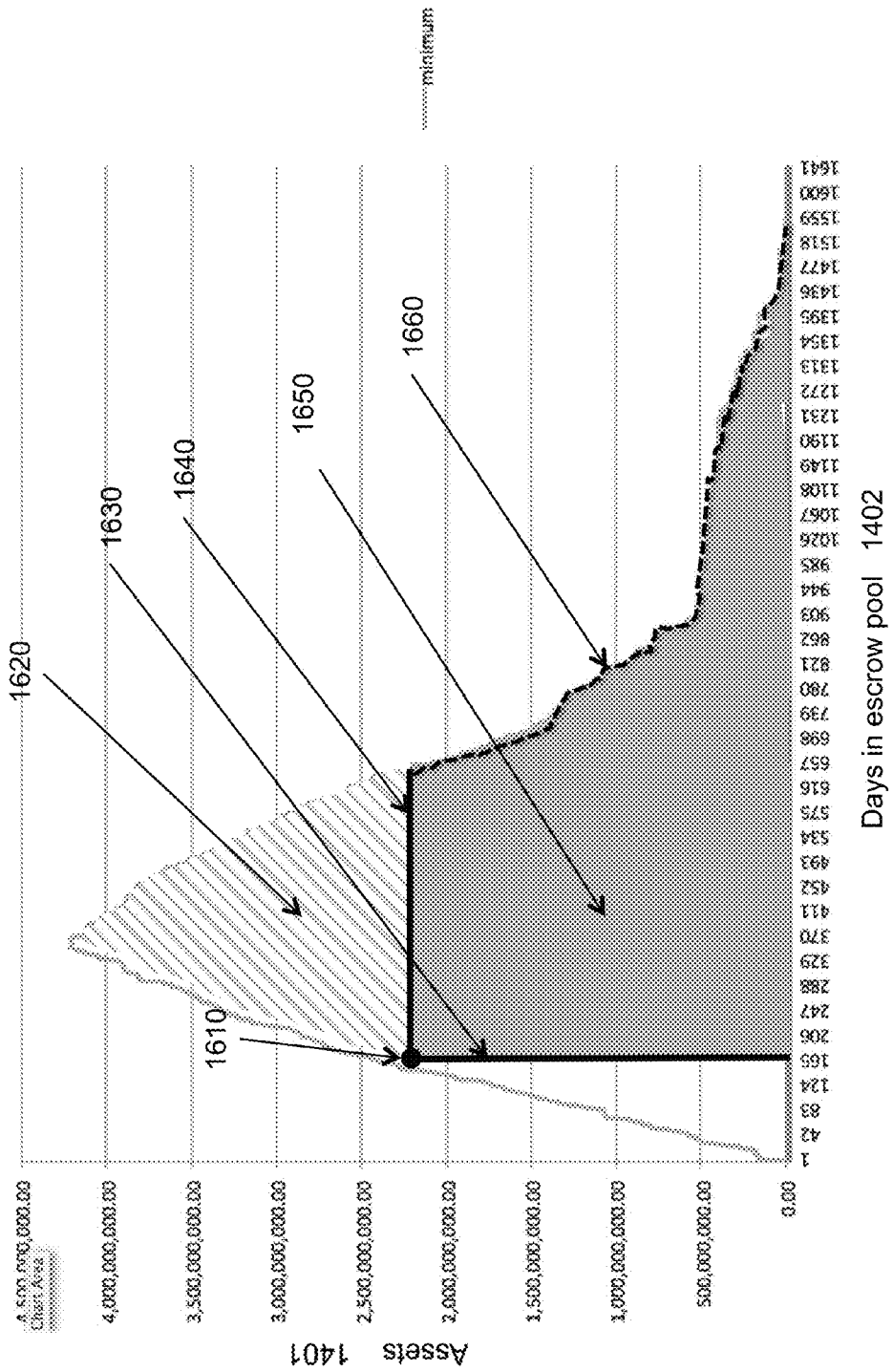

SYSTEM AND METHOD OF GENERATING INVESTMENT CRITERIA FOR AN INVESTMENT VEHICLE THAT INCLUDES A POOL OF ESCROW DEPOSITS FROM A PLURALITY OF MERGER AND ACQUISITION TRANSACTIONS

CROSS-REFERENCE TO RELATED APPLICATIONS

This application claims priority to U.S. Provisional Patent Application No. 61/692,909 filed Aug. 24, 2012, which is incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

In many business transactions, such as mergers and acquisitions, a portion of the transaction consideration may be held in escrow for some period of time. Such amounts are typically used, for example, to provide collateral for damages from breaches of representations and warranties, or to provide a reserve for expenses or third party claims.

Typically, these escrows have been managed as individual accounts of highly uncertain duration. As such, they generally are managed as funds needing to be immediately available despite the fact that such escrows are usually, in the aggregate, paid out in accordance with their planned, long-term scheduled expiration dates. In a normal yield curve environment, funds required to be immediately available are paid interest at the lowest levels of the interest rate curve, such as the federal overnight funds rate.

It has been long known that pooling assets minimizes risk. This is a key tenet in the practice of securitization. See, for example, U.S. Pat. No. 8,126,798 (Dolan et al.), which is incorporated herein by reference, for the securitization of margin loans. While securitization involves both pooling and repackaging the debts or assets, preferred embodiments of the present invention deal with extending the benefits of pooling to a class of assets that has not been pooled before. Because of the more predictable aggregate behavior, if a single entity manages multiple escrows as a pool, it would be desirable to obtain more favorable treatment of the deposits. Such a pool must, however, be carefully managed. While longer-temp investments can yield higher return, interest rate risk and credit risk can mean that principal can be lost. In most instances, parties to a merger or acquisition transaction have been willing to assume little to no risk of loss on the escrow deposit. Prior to the present invention, which provides computer-implemented tools to manage an escrow pool, this effectively meant that a pooling strategy with respect to such assets has not been possible.

SUMMARY OF THE INVENTION

Preferred embodiments of the present invention relate to a computer-implemented method and system for managing a set of escrows as a pool within an investment vehicle, comprising a Simulation Engine, a Portfolio Engine, and a Risk Engine. The Simulation Engine models a set of current and potential future escrow cash flows as a single pool, deriving a range of possible future behaviors using stochastic simulation methods such as Monte Carlo. The Portfolio Engine uses the output of the Simulation Engine to indicate an optimized set of assets in which to invest a particular pool of escrows, and provides instruction on how to invest new cash to move a portfolio from its current asset mix to the optimal mix. The Risk Engine quantifies remaining risks, such that insurance, a guarantee against loss, or similar contractual protection can be added to the portfolio to protect against residual risks.

Preferred embodiments of the present invention use a database of current and historical escrow transactions as input, as well as forecast information such as expected deal flow rates over time. The output of the various Engines guide an investment manager in selecting an optimal set of assets to manage an escrow pool and provide an insurer or guarantor with information required determine the terms of such insurance or protection for a given amount of risk.

The present invention addresses the management of risk by allowing a user to understand the anticipated behavior of a pool of escrow deposits related to merger or acquisition transactions, use that information to model an optimized risk-adjusted investment portfolio of a pool of assets, and in a preferred embodiment, protect against any residual risk of loss through the use of insurance, a guaranty, or other similar contractual provisions. This system and method allows such deposits for the first time to be placed into an investment pool. This process begins with a Simulation Engine, which simulates a collection of current and future potential escrows placed into a single pool, thereby making aggregate performance more predictable. The Simulation Engine uses Monte Carlo simulation to deal with modeling that cannot be expressed as analytic formulas. For example, the Engine of U.S. Pat. No. 6,957,191 (Belcsak et al.), which is incorporated herein by reference, uses analytic formulas. Furthermore, the Simulation Engine is tied to specific, measurable forecasts of behavior such that expected behavior can be updated in response to such metrics. This differs from simulations based purely on historical data without the ability to correct course in response to metrics. For example, see U.S. Published Patent Application No. 2005/0004856 (Brose et al.), which is incorporated by reference herein.

The combination of the Simulation Engine and the Portfolio Engine allow an asset manager to select the optimal allocation of assets to maximize returns at a defined level of risk while meeting the anticipated liquidity needs of the pool. Based on the modeling of the anticipated behavior of the pool, risk of loss can be eliminated in most, but not all scenarios.

The present invention also allows protection against such remaining risk of loss to be possible by using the enhanced predictability of the pool of escrow liabilities provided from the output of the Simulation Engine and the Portfolio Engine to allow:

1. A third-party to have sufficient data and knowledge of such risk to provide insurance, a guaranty against loss, or similar contractual protection in preferred embodiments. A Risk Engine allows quantification of risks such as market value to book value variance of a pool under numerous potential scenarios,
2. Sensitivity to input parameters, both explicit (such as deal flow rates) and implicit (such as escrow duration), and
3. Changes to market factors such as changing market interest rates over time.

Preferred embodiments of the present invention disclose a system and method for modeling a pool of escrows so that the aggregate behavior is more predictable, and large portions of the pool can be treated as longer-term deposits with a high degree of certainty as to the timing of the outflows. This may be applied to both the aggregate behavior of the pool as a whole, or to specific subsets of the behavior, such as the impact of certain representations and warranties on projected outflows. Furthermore, embodiments of the present invention disclose automated machinery for recalculating the optimal mix of investment assets (optimal weighted average maturity and maturity distribution profile) for a collection of managed assets, on a periodic basis or as each new escrow is added to the pool, or as outflows from the pool occur. Some embodiments further calculate the asset mix required to bring the existing portfolio of assets in line with the newly calculated optimized mix of assets.

The present invention may be used in multiple ways. First, preferred embodiments of the present invention provide guidance and instructions as to the optimal investment allocation of a pool of escrow deposits. Second, preferred embodiments of the present invention provide an accurate measure of risk for a given portfolio strategy, particularly when that strategy requires monitoring performance metrics and reacting accordingly. Third, preferred embodiments of the present invention allow a third-party to model risks related to insuring or protecting against a loss on the pooled assets and thereby determine the terms of providing such protection. Again, risk modeling may be applied to both the aggregate behavior of the pool as a whole, or to specific subsets of the behavior, such as the impact of certain representations and warranties. Fourth, given a certain level of risk expected by an insurance provider, guarantor or other party assuming such risk, preferred embodiments of the present invention provide the mix of assets to quantify and accommodate that risk.

BRIEF DESCRIPTION OF DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 7 provides the definition of the EscrowTransaction table.

FIG. 8 provides the definition of the SimulationTransaction and SimulationLedger tables.

FIG. 9 provides a fragment of Java code for an in-memory EventQueue.

FIG. 10 provides Java code for an in-memory SimEvent.

FIG. 12 provides a stored procedure for extracting simulation statistics.

FIG. 13 shows an SQL query for extracting summary statistics from a simulation set.

FIG. 16A illustrates various features of simulation of FIG. 14 with a linearly declining deal flow rate.

DETAILED DESCRIPTION OF THE INVENTION

Figure 1A:
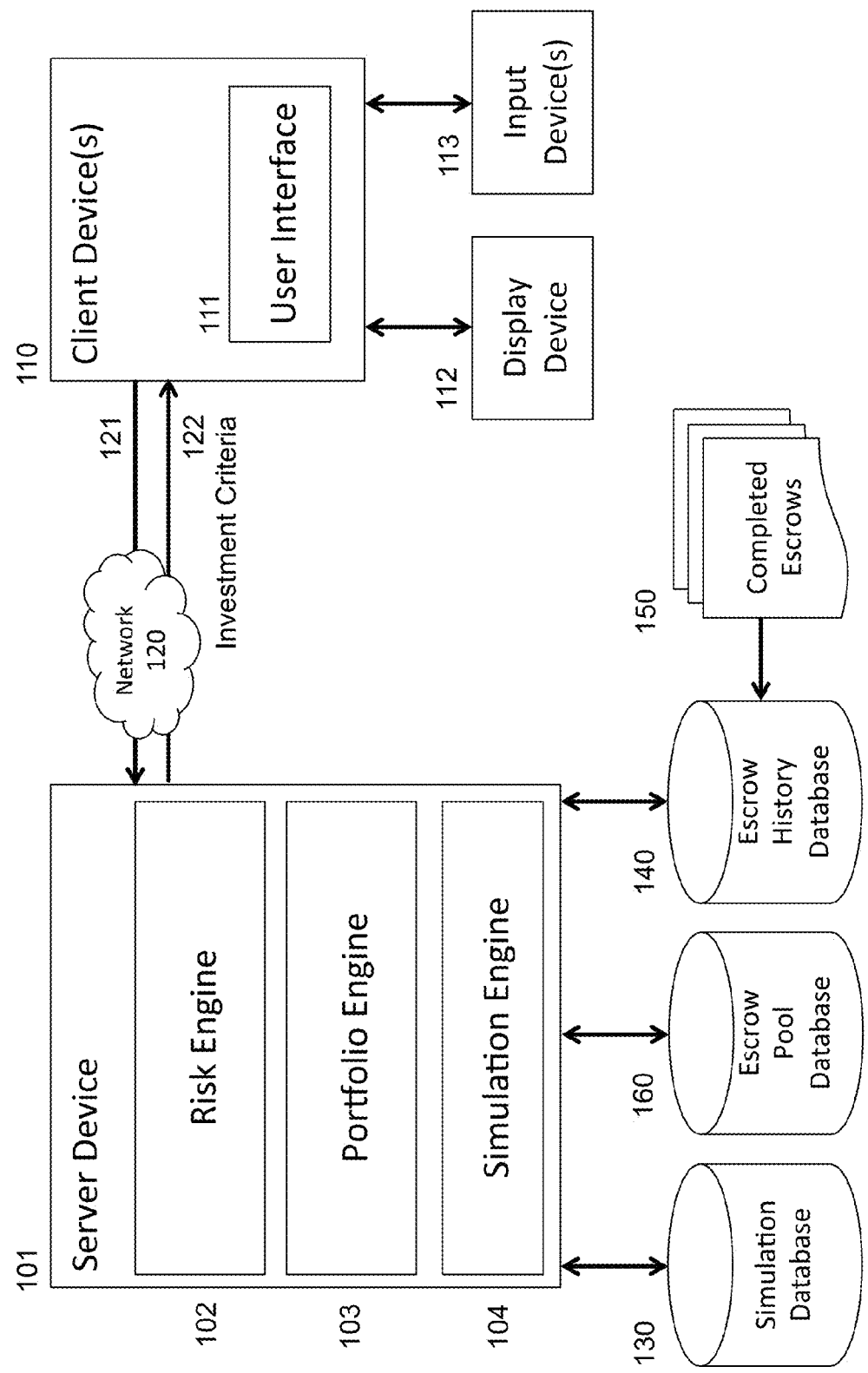
FIG. 1A shows one preferred embodiment of a system in accordance with the present invention.

Certain terminology is used herein for convenience only and is not to be taken as a limitation on the present invention.

Historically, escrows in business transactions such as mergers and acquisitions of business entities ("M&A") have been managed as individual liabilities of highly uncertain duration. As such, they generally provide among the lowest level of interest rate returns, such as the federal overnight funds rate or money market rates, associated with extremely conservative, short-term investment. This is to be expected, since the nature of an escrow is to provide a source of funds for potential claims against the escrow amount that may be asserted at uncertain times.

Based on accumulating significant amounts of data on the performance of past escrows, it can be shown that managing a pool of escrows, as opposed to a single escrow, differs significantly in the predictability of inflows and outflows. Preferred embodiments of the present invention utilize the accumulated data and this insight to provide novel and useful tools that collectively optimally manage a pool of escrows: a Simulation Engine that predicts future cash flows, a Portfolio Engine to optimally select an allocation of investment assets, and (optionally) a Risk Engine to quantify parameters necessary to protect against residual risk with insurance, a guaranty, or similar contractual rights.

Because of diversification, a pool of escrows performs more predictably than an individual escrow. In the analogous world of individual mortgages vs. securities consisting of a pool of mortgages, there can be substantial volatility in the timing of payments or the performance of a single mortgage, but a pool is considerably more stable. The same behavior applies to escrow pools.

This data shows that the pool of M&A escrows is more stable than many other pools of assets. Retail deposits or investments are generally subject to withdrawal at the whim of the individual investor. The collective herd mentality means that fund inflows and outflows are driven by factors impacting the institution holding the funds, world news and macroeconomic events, which can lead to significant numbers of investors behaving in a coordinated fashion.

In contrast to retail deposits or investments, escrows are governed by contract. Money cannot be withdrawn arbitrarily, but only upon predetermined events or resolution of certain types of claims—for example, regarding a breach of a contractual clause or dispute about whether a milestone has been reached. Once an escrow is added to a pool, its behavior is uncorrelated with other escrows. In other words, because each escrow is governed by the terms of unrelated contracts, once their escrows are invested, they are independent.

Because of this independence, predicting the behavior ranges of a pool of escrows is more accurate in the case of extreme events ("black swan" events) than can be achieved for a single escrow. Additionally, because of notice provisions and the complexity of managing and resolving claims, withdrawals generally occur with significant advance notice.

Thus, managing a pool of escrows has many advantages to managing escrows individually once the tools of the present invention provide an understanding of the anticipated behavior of such a pool based on historic data for other such escrows.

Investing escrows (using M&A escrows as an example) in the manner contemplated by the present invention, however, was not possible historically. The parties to M&A transactions generally were not willing to assume a risk of loss on their escrow funds, and without the present invention, it was not possible to invest the funds in a pool of longer duration securities. While it may have been generally understood that a pool of these deposits should enjoy the benefits of diversification, there did not exist sufficient data regarding historic performance, a method or apparatus for determining anticipated future performance of a general pool, a mechanism for determining how the terms and durations of the various components of the pool should be factored into determining how to optimally manage the pooled assets, or a means of calculating loss parameters to allow an insurance company or guarantor to provide protection against any such loss. Without the present system and method, the investment pool contemplated in the present invention would not be feasible for most M&A transactions.

Preferred embodiments of the present invention enable management of the pool of escrows, including protection against loss on such a pool, via a computer system comprising a Simulation Engine, a Portfolio Engine, and (optionally) a Risk Engine. The pool of escrows is preferably managed within an investment vehicle, such as an investment fund, a collective trust, or a total return swap. Other types of investment vehicles are also within the scope of the present invention.

In certain embodiments, the investment vehicle is a collective trust, to obtain benefits of scale when investing assets. A preferred embodiment provides a fund structure for investment, such that at least one class of investors deposits escrow liabilities in exchange for investment returns from assets purchased to offset those liabilities. An alternative embodiment may structure the investment vehicle as a total return swap to accomplish substantially the same result. The determination of the appropriate structure depends on an analysis of accounting and legal issues to ascertain which will best accomplish the goals of the parties to an M&A transaction.

These engines reside on a Server Device, and a user of the present invention uses a Client Device, which may be the same computer as the Server Device, to manage the pool of escrows.

Escrow management using preferred embodiments of the present invention relies on a computer model of the behavior of escrows, driven by actual data derived from completed escrows. The model combines historical data, using simulation, to provide a range of behaviors of an expected pool of escrows with certain known characteristics. The model dynamically adjusts the anticipated behavior as the characteristics of the pool change. For example, as the weighted average maturity of the underlying assets, the incoming new deal flow, or the concentration of investments change, the model adjusts to allow an asset manager to modify the allocation of new capital into the pool. A preferred embodiment therefore predicts the anticipated behavior of a specific pool consisting of specific escrows rather than simply the anticipated behavior of a hypothetical general pool.

FIG. 1A shows one embodiment of a system in accordance with the present invention. The system 100 includes:

A Server Device 101 (also, referred to herein as a "processor") is attached to at least one data store, wherein some of the data resides in the Escrow History Database 140. Data about every transaction in a group of escrows is stored here. Every escrow which is completed is marked as such for use in analysis of aggregate data and simulations of possible future behaviors. Thus, this database provides summary information about a set of completed escrows 150. Each time an escrow is completed (all funds are paid out), Escrow History Database 140 is updated with transaction-level data (cash inflows and outflows) from that that Escrow. In this way, a complete history of completed escrows is maintained. In a preferred embodiment, the Escrow History Database also contains information on the stated terms of each cash flow in the escrow.

While managing a pool of escrows with the present invention, a database of all the escrows in the current pool is maintained in Escrow Pool Database 160. This repository includes escrows whose terms are not yet completed. Such escrows do not appear in Escrow History Database 140, because without cash inflows and outflows netting out to zero, these escrows are less suitable to use as examples for simulation and analysis.

While in some embodiments, Server Device 101 and one or more Client Device(s) 110 can reside on the same physical hardware, in most embodiments Server Device 101 and multiple Client Devices 110 will reside on separate hardware, communicating via Network 120. This Network 120 may be a local area network or a wide area network (the Internet, for example). A user of the present invention inputs data and modeling parameters via input channel 121. The Server Device 101 returns its analyses, such as the generation of investment criteria, including maturity metrics, via output channel 122.

In a preferred embodiment, Server Device 101 communicates with Client Device 110 using standard established protocols, such as TCP/IP and HTTPS, and using data interchange formats such as XML and JSON. However, any acceptable communications protocols and data formats may be substituted.

There may in fact be multiple instances of Client Device 110 connected to a single instance of the Server Device 101. In a preferred embodiment, communications between Server Device 101 and Client Device 110 are encrypted.

Client Device 110 is generally a device with significant computational ability. In a preferred embodiment, Client Device 110 runs the User Interface 111 code locally. In other embodiments, Client Device 110 may be a "thin" device, with most of the User Interface code being run in Application System 102. In the described embodiment, User Interface 111 code comprises a web browser interpreting HTML, JavaScript, and other code, based on the capabilities of the underlying browser.

Client Device 110 has a Display Device 112 and one or more Input Devices 113, such as keyboard or mouse. In some embodiments, the Display Device 112 and Input Device 113 may be the same, as in the case of a touch-screen on a tablet computer.

The Server Device 101 processes input from the user communicated over input channel 121, utilizing the pool transactions in the Escrow Pool Database 160, plus data in the Escrow History Database 140 and the Simulation Database to model the range of future escrow pool performance, to generate a set of investment criteria, such as a profile of asset allocations that match the predicted liability and cash flow profile of the escrow pool, and to provide additional investment criteria in the form of assessments of the risk of a given asset profile. These functions are provided by Simulation Engine 104, Portfolio Engine 103, and Risk Engine 102.

One preferred embodiment of the present invention first creates models of the potential future cash inflows and outflows of the escrow pool. It then processes the output of this model to select the investment criteria such as the profile of assets to match the risk tolerance and expected cash flows of a pool of escrows stored in Escrow Pool Database 160. This database stores the current deposit amounts of the escrows in the pool, as well as the stated terms governing the release of each deposit and any pending claims made on the deposits.

The modeling component begins with the Simulation Engine 104. Modeling the potential future cash flows of an escrow pool is a complex task for a number of reasons (merger transactions will be used as an example):

1. Escrows vary in duration. In merger transactions, for example, durations typically range from 12 to 36 months, but variations outside this range are not uncommon.
2. Escrows vary in size. The size of the escrow is typically a fraction of the merger consideration, and so is dependent on the size of the deal and a number of other factors.
3. Escrows can vary significantly in structure. The structure of the escrow may include adjustments for accounting issues such as working capital adjustments, and indemnification for certain items such as representations and warranties. If there are known potential problems, such as patent infringement disputes, separate amounts might be set aside. There may be single or multiple scheduled release dates.
4. Claims against the escrow can alter the planned cash outflows. If claims are made early in the process, cash outflows can be earlier than planned. If claims are made late in the process, cash outflows can be delayed significantly.
5. The rate of cash inflows ("deal flow") may fluctuate in the future. Simulations need to deal with variance in this rate.
6. The risk tolerance of a given party can differ. For example, an insurance company may be willing to wrap a portfolio that is modeled to a one in a million futures worst case, but not a portfolio that is modeled to a one in a thousand futures worst case.
7. Market interest rates for various types of investments can change, impacting future inflows into the pool as investment alternatives become comparatively more or less attractive.

Figure 2:
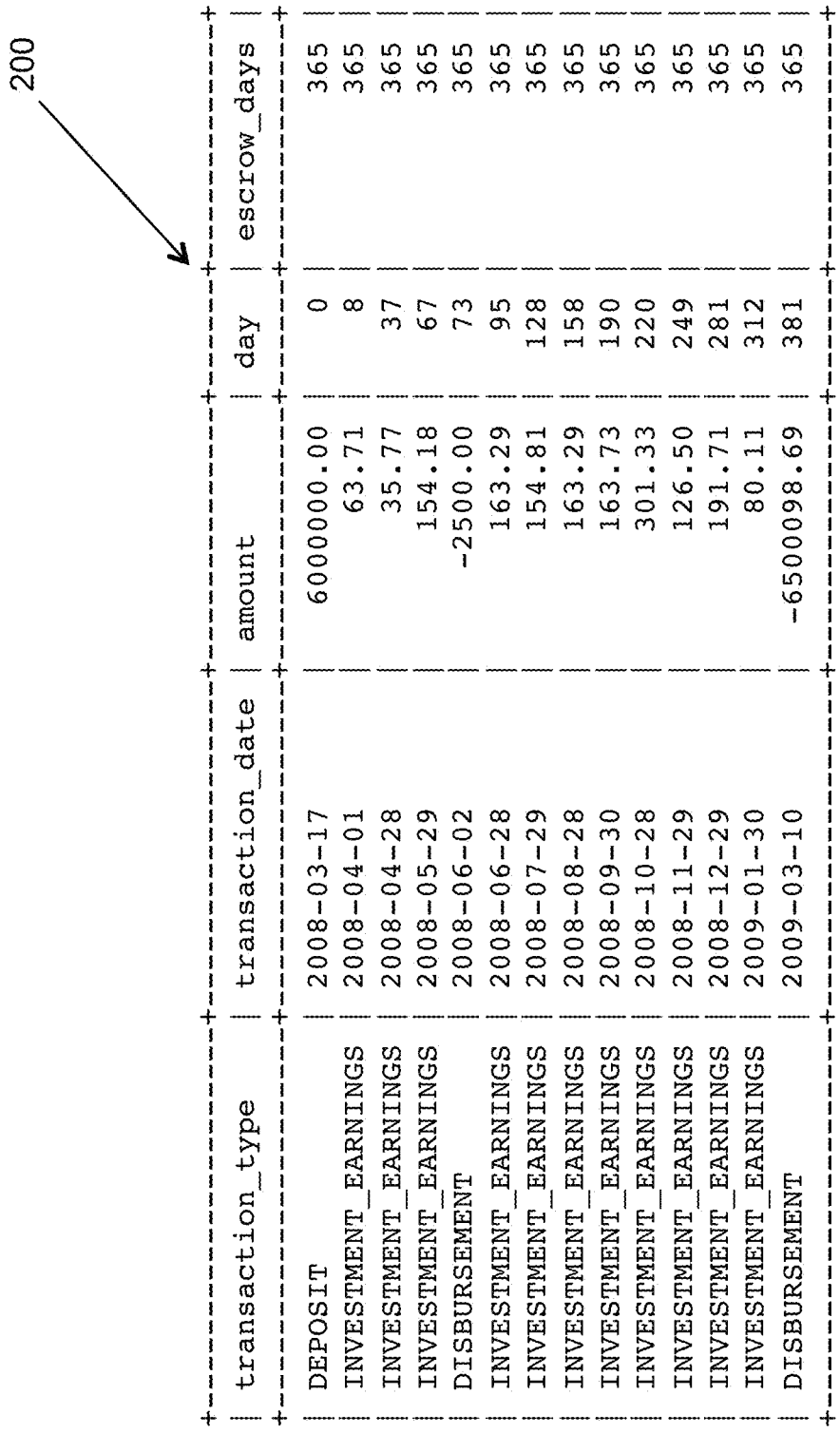
FIG. 2 shows the transactions of one historical escrow account.
Figure 3:
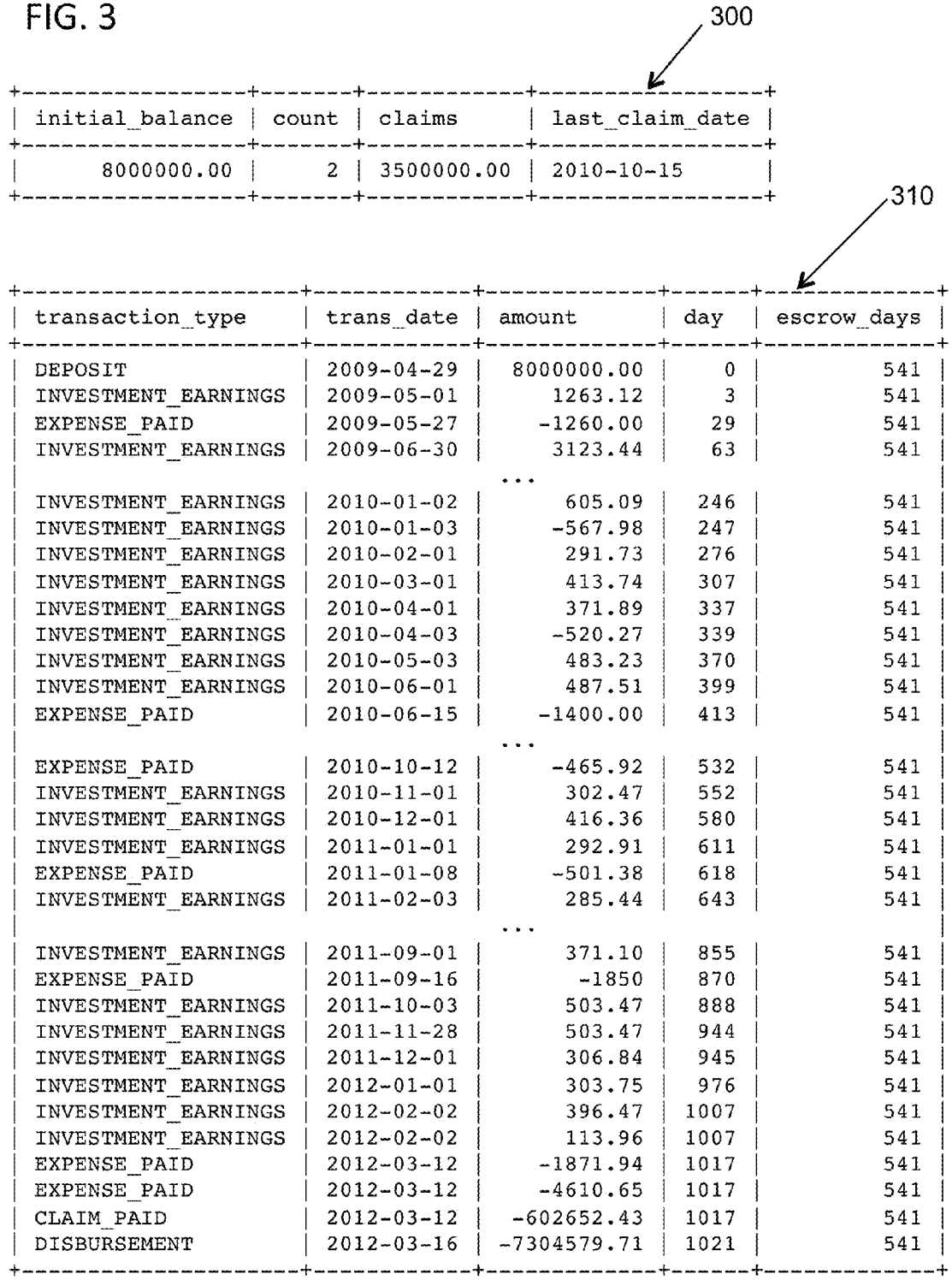
FIG. 3 shows the transaction of another historical escrow account in which claims have been made against the escrow.

FIG. 2 and FIG. 3 illustrate the above issues. In FIG. 2, database query output 200 shows the cash flows for a single escrow (of 365 days nominal duration), where there are no claims. In this particular case, outside of investment earnings, the only cash flows were the initial deposit (the escrow size), a small disbursement 73 days into the escrow, and the final disbursement at 381 days. It is not unusual for a final disbursement to occur a month or so past the escrow nominal duration.

FIG. 3 illustrates a case where claims were made against the escrow. Database query output 310 shows that the nominal duration of the escrow was 541 days, or 18 months. Several smaller interest payments are elided in order to make FIG. 3 more readable. A deposit was made on day 0, and small expenses were paid on days 29, 413, and 532. At this point, the escrow would normally be complete. However, two claims were made, as shown in database query output 300. This resulted in the delay of final payments until resolution of the claims, with final disbursement payments being made in days 1017 through 1021.

Each set of cash flows, for FIG. 2 and FIG. 3, depict a single escrow's transactions from the Escrow History Database 140 of FIG. 1A. The transactions of FIG. 2 are from one escrow in Completed Escrows 150. The transactions of FIG. 3 are from another escrow in Completed Escrows 150. Apart from the claim payment information, Escrow History Database 140 may also contain the reason for the claim (e.g., fraud, breach of contract, intellectual property infringement) as well as the means by which it was resolved (mutual agreement, arbitration, lawsuit).

Figure 4A:
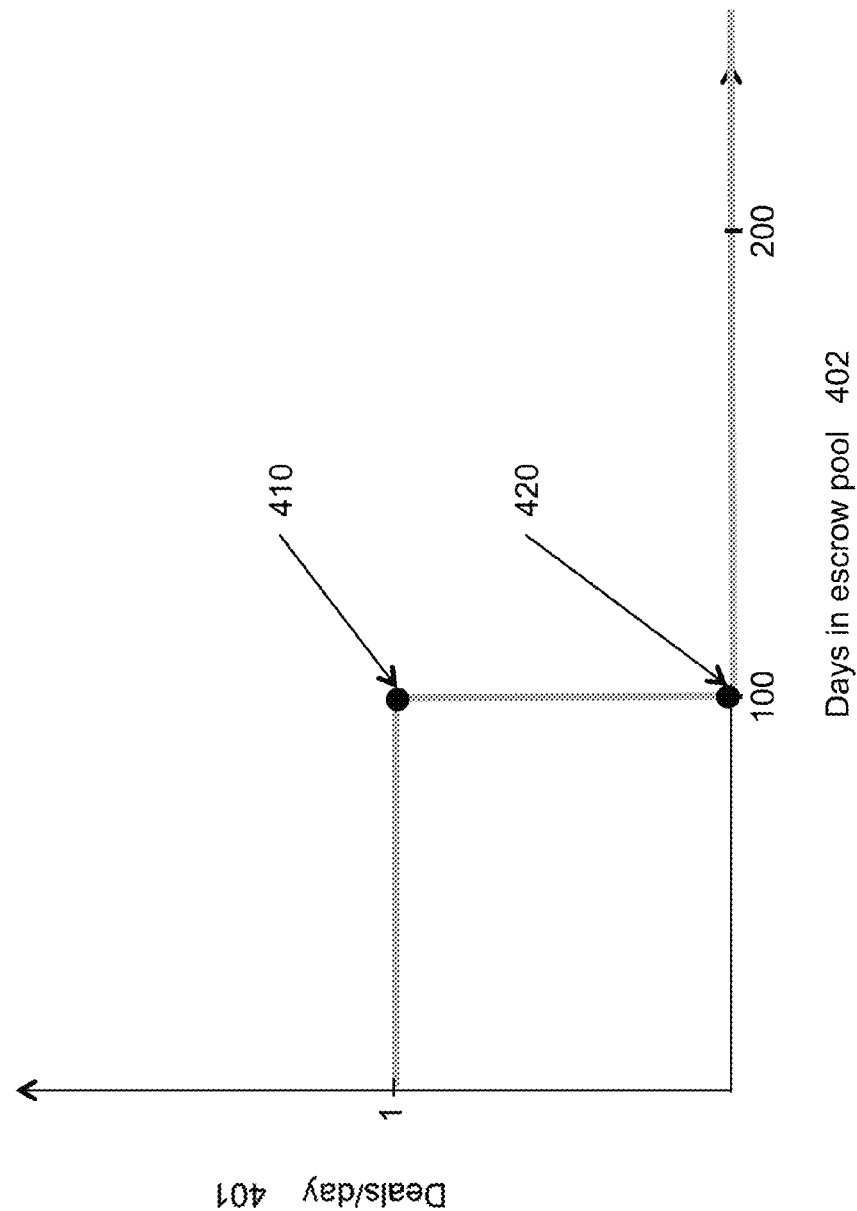
FIG. 4A shows a graph of deal flow as a function of average deals/day vs. days in escrow pool.
Figure 4B:
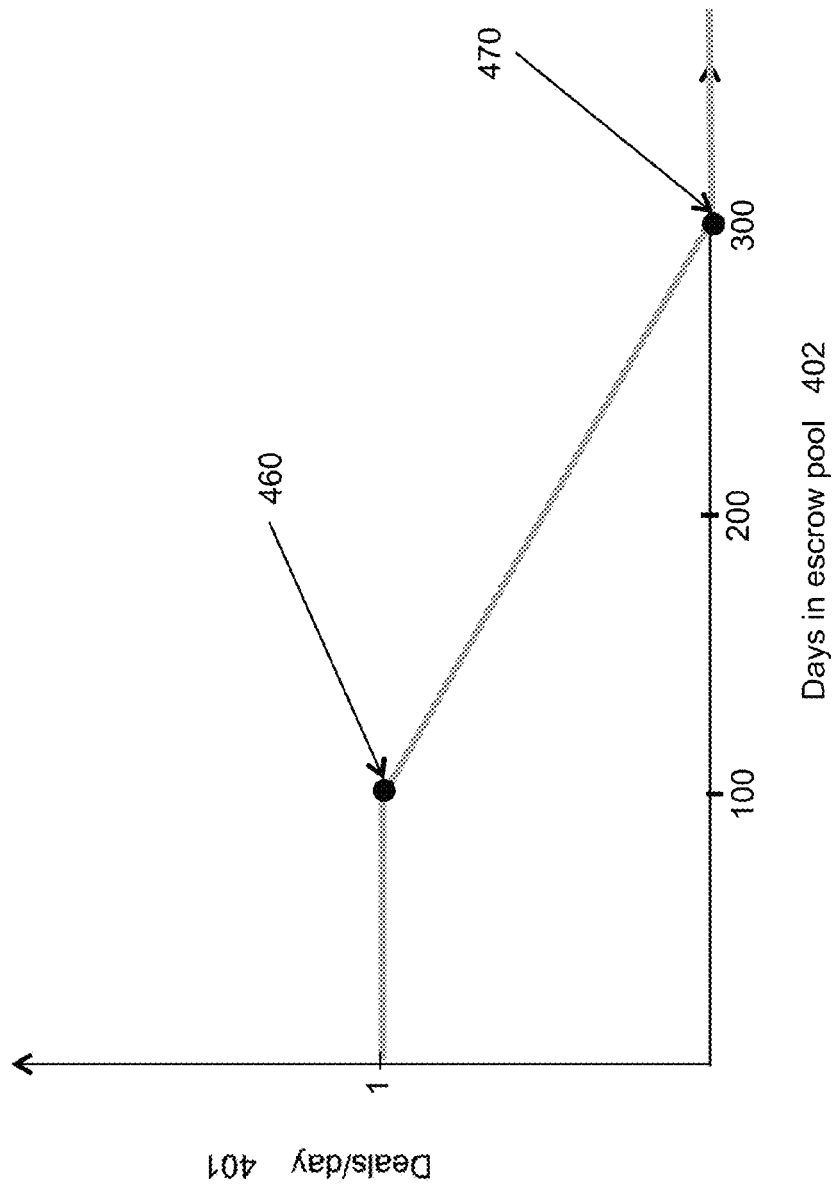
FIG. 4B shows another graph of deal flow as a function of average deals/day vs. days in escrow pool.

FIG. 4A and FIG. 4B illustrate two potential ways to model a fall-off in deal flow, for worst-case modeling purposes. This is critical to understanding the potential worst-case scenario risks of investments in the pool and the potential level of risk being assumed by the merger parties or by an independent third-party insurer or guarantor. These two methods are by way of example only, and it will be understood by one skilled in the art that many other variants may be used.

FIG. 4A shows an input graph 400 for a simulation process, depicting the rate of deal flow over the life of an escrow pool to be used for the simulation. Horizontal axis 402 represents the number of days since the beginning of the escrow pool. Vertical axis 401 represents the number of deals per day on average. In input graph 400, the deals/day value is fixed at 1, and continues until day 100 of the escrow pool, show as point 410. It then drops to zero (point 420), reflecting the instantaneous cutoff of all future deals. This is the modeling situation for a complete cessation of new business.

In contrast to the scenario in FIG. 4A, input graph 450 of FIG. 4B depicts a constant flow of deals at an average rate of 1 deal/day until 100 days into the escrow pool's life, at point 460. But in input graph 450, deal flow does not cut off instantly, but rather slows from an average of 1 deal/day to zero deals/day over a period of 200 days, to point 470. This, in many business scenarios, may be a more plausible method of modeling the decline of a business.

In a preferred embodiment, the average deals per day are modeled as a stochastic process. For example, the Poisson process allows for a varying number of arrivals in a given interval of time. Where e is Euler's number, and r is the rate of arrival, the probability of n arrivals in one interval P(n) is:

$$P(n) = \frac{e^r \cdot r^n}{n!} \quad (1)$$

The following Java code provides for a function get Poisson( ) that takes as its argument a real-valued rate and returns as a result an integer per interval such that the average of the integers over a sufficiently long series of intervals converges on the rate:

```
private static double poisson (int num, double rate) {
    return Math.exp(-rate)*Math.pow(rate, num) / factorial(num);
}
private static int factorial (int n) {
    if (n<=1) {return 1;}
    return n*factorial(n-1);
}
// given a rate, returns a number of occurrences such that
// the occurrences over many calls average out to the rate
public static int getPoisson (double rate) {
    double prob = rand.nextDouble( );
    int max = (int) Math.floor(100*rate); // should never be reached
    double cumulative = 0;
    for (int i=0; i<=max; i++) {
        double p = poisson(i, rate);
        cumulative += p;
        if (cumulative>=prob) {
            return i;
        }
    }
    return max;
}
```

The function of this code is apparent to one of skill. While strictly not required, the variable max in the function get Poisson( ) is used only to guarantee termination of the code. It should not be reached with the exception of infinitesimally probable values or issues with the random number generator. Variations on this code will be apparent to the skilled practitioner. An existing historical series of cash flows can be modeled exactly as transpired in the history. However a future series of cash flows is modeled in a preferred embodiment as a function of the average deal rate, using the Poisson generator embodied in the code describe above.

Simulation Engine

With the basic building blocks described above (a set of completed escrow transaction histories, an input graph for deal rate over time, and a method for generating probabilities of deals for each day in a simulated future), Simulation Engine 104 shows the possible futures of a pool of escrows with some existing makeup as of the current moment, but with an unknown future potential set of inflows and outflows, dependent upon deal flow rates, subsequent claims, and variations from escrow to escrow.

It will be apparent to one skilled in the art that many possible types of simulators can be built. It is tempting to perform a purely analytic "simulation," using, for example, average values for escrow length and treating the variation among escrow lengths using a Gaussian distribution. In such a world, it might be possible to derive analytic formulas to describe the evolution of an escrow pool over time, thus avoiding the complexity and time-consuming nature of more complex stochastic simulation.

While computationally attractive, the above method is flawed because, in practice, certain variable distributions, such as the duration of escrows, are not normal. Instead, they are multimodal. For example, the nominal length of escrows does not vary smoothly in duration about an average. Instead, the length clusters around specific periods: 12 months, 18 months, 24 months, 36 months.

The distribution of claims presentment vs. escrow life is also non-normal, tending to cluster mostly toward the beginning or the end of the escrow period, or the end of a specific representation or warranty survival period.

Another issue is decoupling claims behavior from the variation in escrow duration. In any simulation starting with a set of actual escrows in the middle of their management, two things must be done to simulate the escrow pool's evolution:
1. Alter the claims currently posted, or add claims to, a fraction of the existing escrows, in accordance with claims data in Escrow History Database 140.
2. Add new simulated escrows, with a combination of planned releases and releases altered by making a claim, with the ratio in accordance with historical data in Escrow History Database 140.

Because of the aforementioned issues, one preferred embodiment employs a Monte Carlo simulator (a kind of stochastic simulator) to suggest possible future values of an escrow pool. In a Monte Carlo simulator, past escrow behaviors are selected randomly with replacement to create a potentially infinite pool of model escrows, which are then selected randomly, and whose events can be placed in a simulator.

A repeat of a given simulation (e.g., with parameters of N deals per day on average, with the simulation lasting D days) leads to a different result, because the exact start days of escrows, as well as their inflows and outflows, are selected randomly. Repetition of thousands or even millions of simulations creates a map of outcomes and probabilities of those outcomes for a range of potential escrow futures. In accordance with the Central Limit Theorem of probability, the distribution will approach a Gaussian, or normal, distribution of projected inflows and outflows.

Figure 5A:
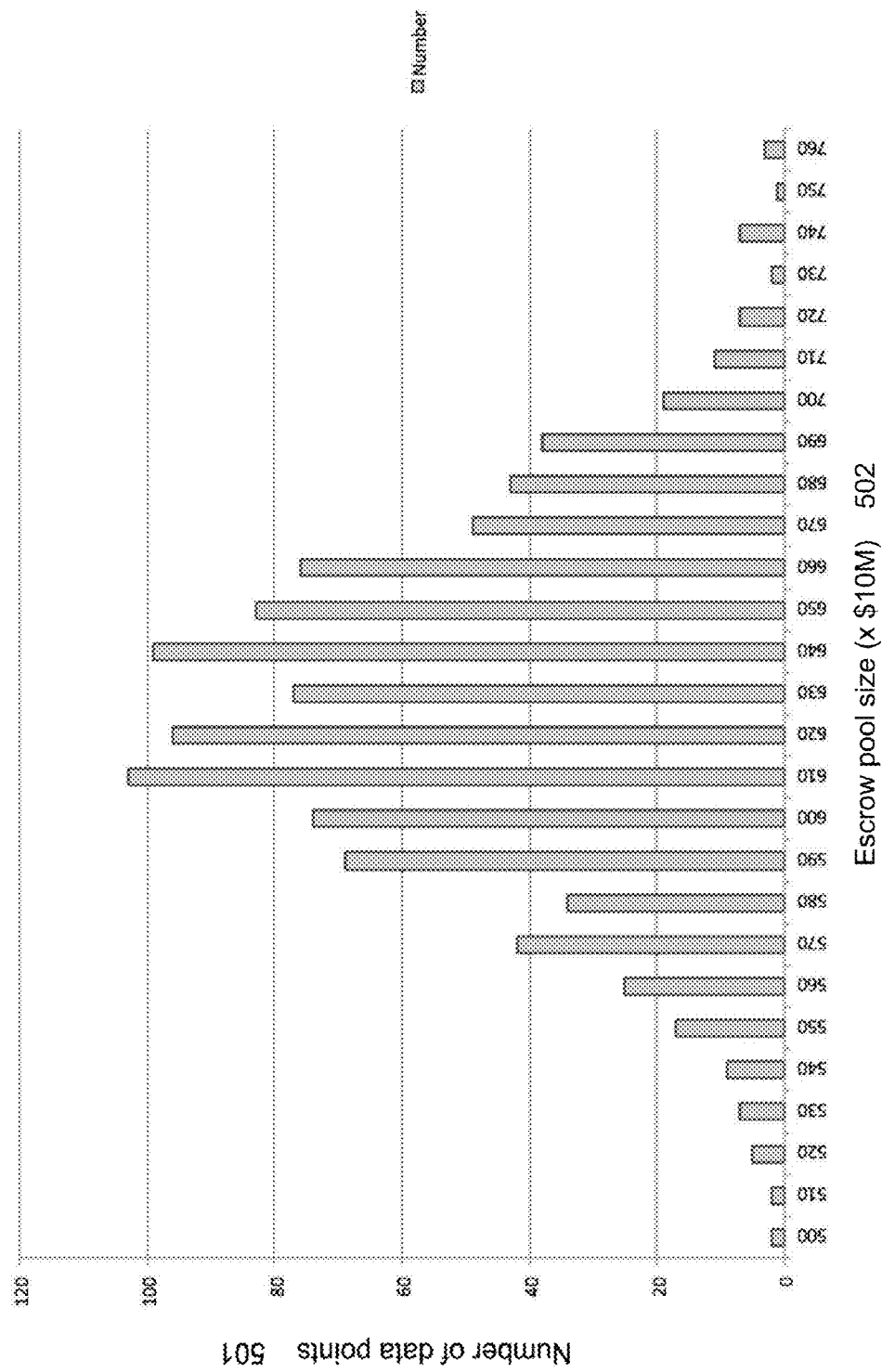
FIG. 5A shows the distribution of data points for escrow pool size after 1000 iterations of a simulation.
Figure 5B:
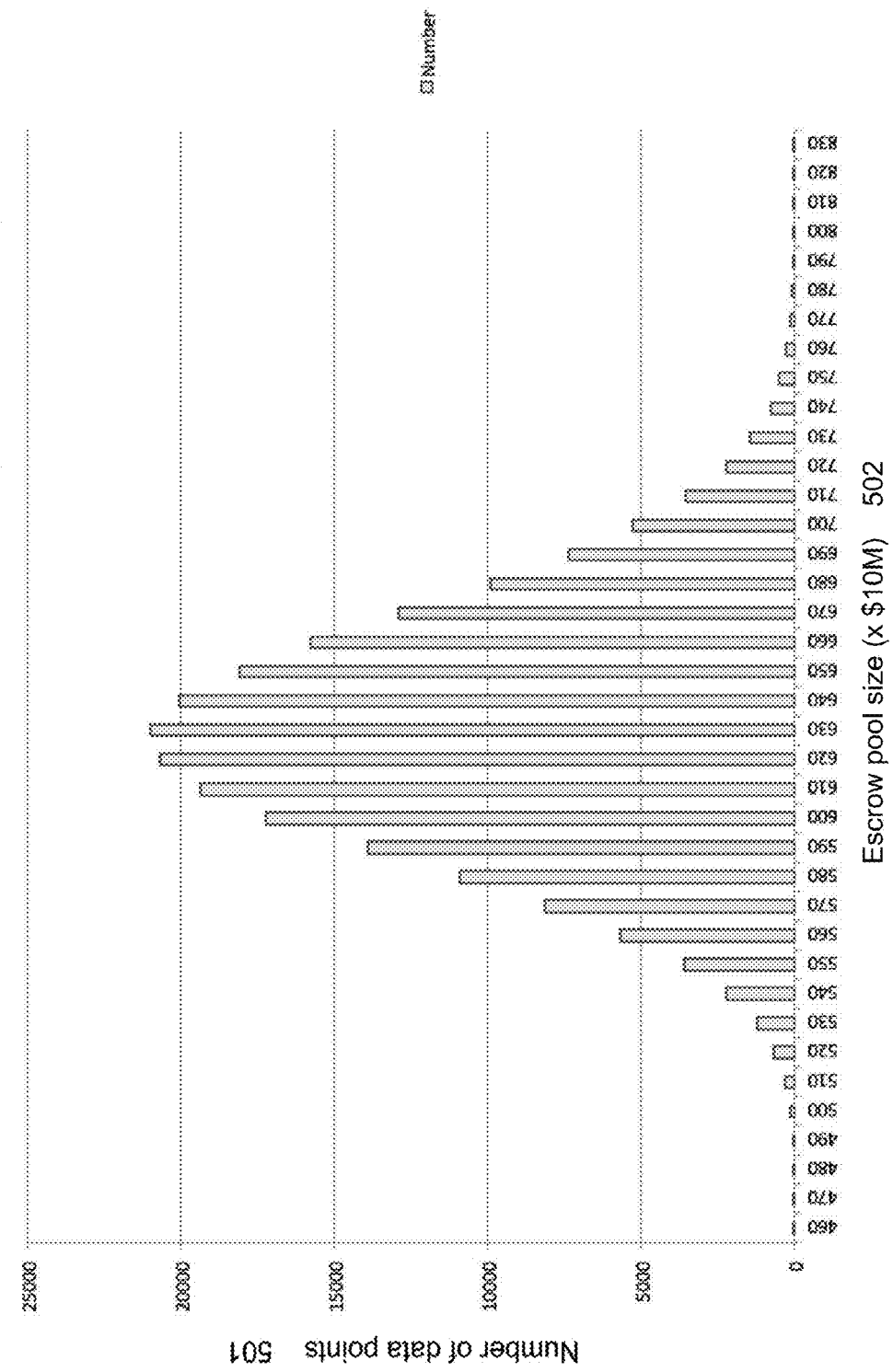
FIG. 5B shows the distribution of data points for escrow pool size after 225,000 iterations of a simulation

FIG. 5A shows the distribution of counts for escrow pools within $10M buckets. The number of data points (axis 501) vs. the number of buckets (axis 502) begins to approach a Gaussian distribution. In FIG. 5B, the Gaussian is very well defined after 225,000 iterations. Once the Gaussian's parameters are fitted with sufficient accuracy, there is no need to continue simulation any further. The probability of any event is then derived from the fitted Gaussian.

To fit the Gaussian accurately enough to extrapolate predictions of behavior, approximately 10,000 iterations is often quite adequate. A number of iterations may be arrived at dynamically via statistical analysis of the parameters describing the Gaussian, halting iterations when the parameters have converged sufficiently. Thus, to predict one in a million events, it is not necessary to do one million simulations.

Event based simulation is an efficient means of performing the calculations required to reach the Gaussian fit. In such a simulator, events are placed into a queue, and then processed as the simulation date moves into the future. In some embodiments, the event queue resides in the simulator's memory. In other embodiments, it is implemented as a temporary table in Simulation Transaction 130. The tradeoffs for implementation choices are apparent to a skilled practitioner.

Figure 6:
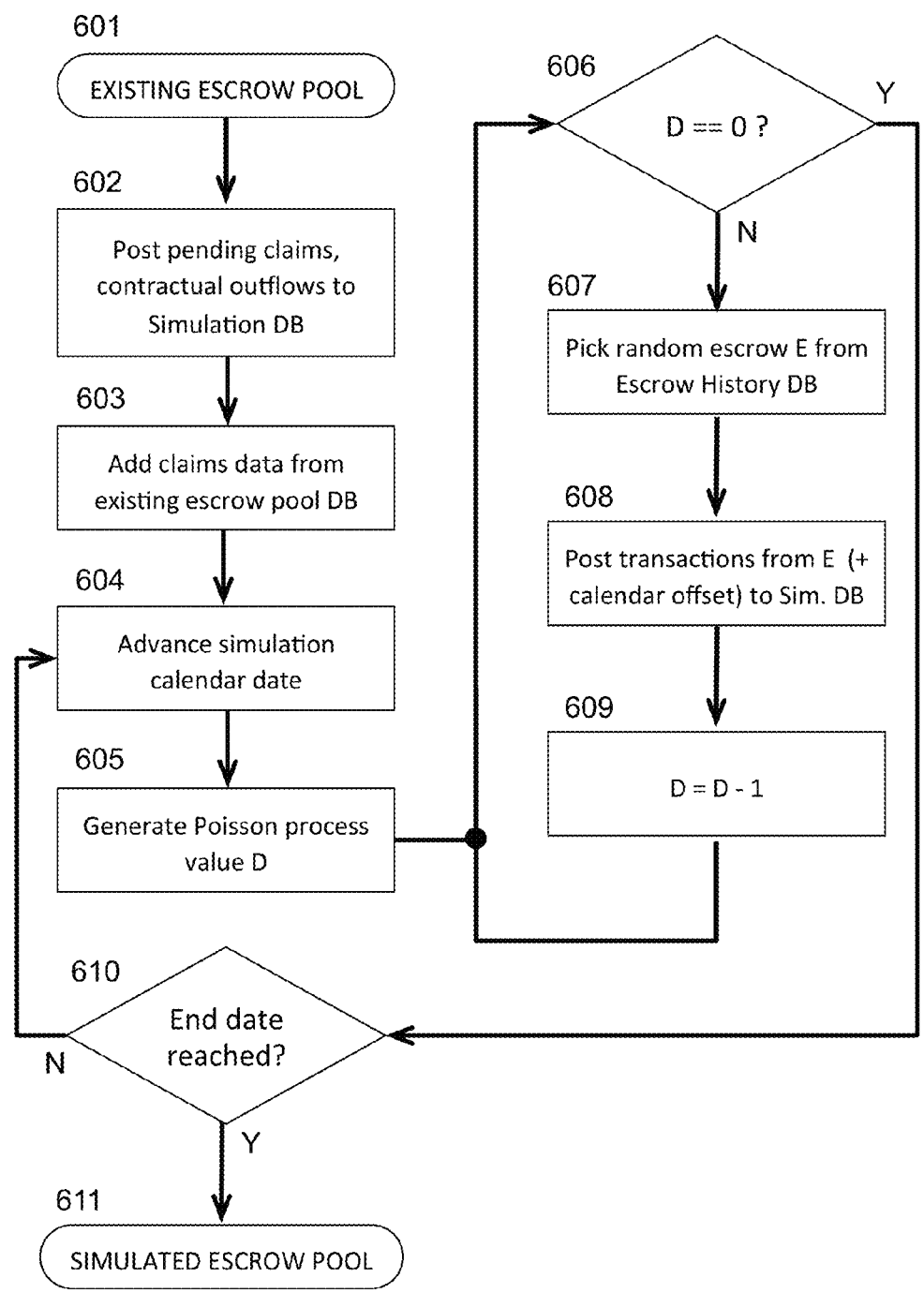
FIG. 6 is a flowchart depicting one embodiment of the Simulation Engine as a Monte Carlo simulator that uses data from the database of completed escrows.

FIG. 9 and FIG. 10 provide Java code for an in-memory, HashMap-based implementation of an event queue and a simulation event. These form the basis of an event-based simulator, described as follows:

FIG. 6 depicts this process in Flowchart 600. In start 601 of the flowchart, there is an existing pool of escrows, each with its own history of inflows/outflows and its own schedule of future escrow expiration dates. This pool may have zero or more members at the start state 601.

Status of individual escrows may reflect the planned behavior, or the escrows may have amounts set aside for claims that have been made or are reasonably anticipated. All such inflows/outflows are posted to the simulator's event queue in state 602. They can then be processed as the simulator's calendar advances.

Some of the escrows in the pool may have unanticipated outflows, for example due to claims that have yet to be made or were not anticipated. For every cash flow in an escrow, a probability is assigned to that cash flow of a claim being made against it on a particular day. These probabilities are calculated using ratios of exceptional escrows to normal escrows in Escrow History Database 140.

FIG. 7 provides the definition of the EscrowTransaction database table used in Escrow History Database 140. Transactions are referenced via days_from_close, rather than actual calendar dates. As will be shown, this facilitates use of this data in the simulator.

Once all planned data and potential future claims are recorded in the simulator, the simulation can proceed. The main loop is depicted in states 604 through 610 of Flowchart 600.

In state 604, the calendar day of the simulator is advanced. Generally, this will be done for every day, not just for days with pending events, as new simulated escrows are added to the pool.

The number of new simulated escrows added to the escrow pool on a given calendar day is determined via state 605. In this state, a Poisson variable is calculated based on the average deal arrival rate. The generated variable D is an integer value with a probability distribution such that the average value of D over a large number of calendar days approaches the deal arrival rate. For example, with a deal arrival rate of one deal per day, D could take on values of 0, 1, or 2 with relatively high frequency, and values of 3, 4, 5, . . . with increasingly lower probability. A value of 10, for example, would be exceedingly rare. Poisson processes accurately model the distribution of certain real-world events, included among them deal arrivals.

In state 606, the value of D is checked to see if it is zero. If so, all events for this day have been added, so the simulator moves to state 610 to check if the simulation end date has been reached. If not, the simulator returns to state 604 and the calendar date is advanced again. If the end date has been reached, the simulator completes in state 611.

If, in state 606, Poisson variable D is greater than zero, an escrow must be added to the simulation database. Thus, the simulator moves to state 607. In this state, a set of simulated transactions is created. These transactions are posted to the event queue in state 608.

The quality of the set of simulated transactions determines the predictive value of the escrow pool simulation. If the behavior of the transactions of an individual escrow does not match real-world behavior, then the simulations of composite escrow pool will not be accurate. While it is possible to posit a set of hypothetical escrows and their associated transactions, using real historical data of actual completed escrows is preferable.

Thus, in a preferred embodiment, the simulator chooses an escrow from a database of actual completed escrows in Escrow History Database 140. The use of the database of actual escrows has advantages over simulated data:

1. As the history of actual escrows grows, the transactions within the database become an ever more accurate model of true escrow behavior, as compared to approximations using random data and normal distributions. Thus, factors such as skew and kurtosis of the distribution are automatically factored in.
2. Because the database of completed escrows includes not only those that concluded normally, but also the exceptional cases where claims were made, the historical database automatically accounts for the rate of claims and the distribution of their timings.

When a random escrow is picked in state 607, the transactions are referenced from the start date of the escrow, with the initial cash inflow being labeled day 0. In this way, if the current simulator's calendar is at day X, the escrow's initial deposit will be posted to the event queue in state 608 at day X. If an outflow is at day N with respect to initial deposit, it will be posted to the simulator's event queue on day X+N. The simulator uses the in-memory EventQueue and SimEvent classes of FIG. 9 and FIG. 10, but could also use, for example, database-resident versions.

If a complete record of all simulation transactions is required, the simulation transactions are stored in the SimulationTransaction table 800 of FIG. 8, which resides in Simulation Transaction Database 130 of FIG. 1A. If a detailed record is not required, only the cash flows of the entire pool need be recorded, in SimulationLedger table 820 of FIG. 8, which also resides in Simulation Transaction Database 130 of FIG. 1A.

Once that escrow has been processed completely, Poisson variable D is decremented. Control then returns to state 606. If D is zero, the simulator moves to state 610, and from there branches to either state 604, which advances the simulation calendar date, generates a new Poisson variable, and enters loop 606-609 again; or the simulator branches to state 611, indicating the target calendar date has been reached and the simulation has completed.

It will be appreciated by one skilled in the art that there are many variations on this basic simulation model. For example, a simulation may be done with a constant deal arrival rate, or a rate that ramps up or down, or varies in any fashion.

FIG. 6 summarizes the steps required for a single simulation. A full Monte Carlo simulation set, encompassing multiple simulations, is required to determine the range of possible future escrow behaviors. This process is illustrated in Flowchart 1100 of FIG. 11, and comprises the Simulation Engine 104 of FIG. 1. The simulation set begins in start state 1101. The first substantive state 1102 requires a user of the Simulation Engine to input a simulation name, plus parameters to be used, such as deal arrival rate, the weighted average maturity of the pool or the concentration of deposits, and the total number of iterations to be performed.

In state 1102, iteration variable i is set to zero to initialize the simulation set. In state 1103, this is incremented, and in state 1104, the value is check to see if it exceeds the maximum desired number of iterations, or whether the parameters of the Gaussian distribution of simulation values are accurate enough (simulations beyond this point provide little or no new information). If so, the simulation is complete at state 1106. Otherwise, control flows to state 1105, which runs a single simulation in accordance with Flowchart 600. Then the iteration variable i is incremented again, and the process repeats until the maximum number of iterations is reached.

Once the steps of Flowchart 1100 are completed, the SimulationLedger table in the Simulation Transaction Database 130 contains all the daily cash flows across each iteration of the simulation set. To extract summary statistics from this table, the Stored Procedure 1200 of FIG. 12 is defined. This creates summary statistics such as the minimum, average, and maximum escrow pool balances over the simulation period and the weighted average maturity of the pool at any given time.

With this procedure defined, simple SQL queries are used to extract the information for subsequent use. For example, in order to graph the output, the code 1300 of FIG. 13 exports the data in comma-separated value (CSV) format.

Figure 14:
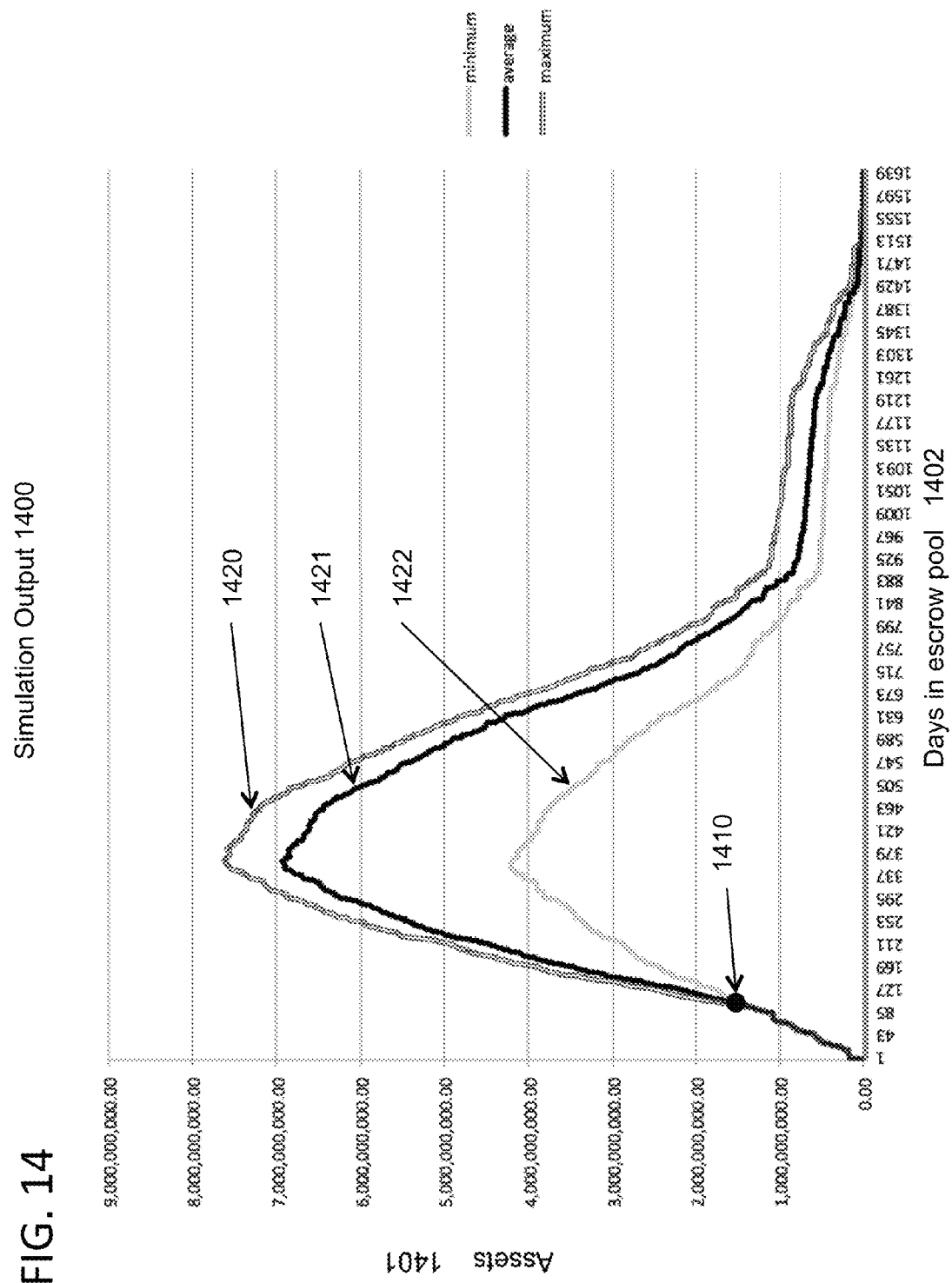
FIG. 14 depicts one output of a Simulation Engine, showing low-water, average, and high-water marks for a simulation with a constant stream of escrow inflows, followed by an immediate drop in deals/day from an average of D down to zero (i.e., an immediate cessation of escrow inflows).

FIG. 14 shows the output of a simulation set graphically, for the case of a simulation of 1000 possible futures. Simulation Output 1400 graphs assets (axis 1401) vs. the number of days in the escrow pool. In 1400, the first 100 days comprise known escrows currently in the pool, so the data for minimum 1422, maximum 1420, and average 1421 are identical. At point 1410, after the escrow pool has been operating for 100 days, the minimum, maximum, and average values begin to diverge, based on the range of escrows being added to the various simulations.

Simulation output 1400 shows a characteristic shape for a pool of escrows, as an inverted "V" with a trailing rightward tail. The rise in assets from point 1410 stems from a deal arrival rate beginning with an average of 1 deal/day, followed by a linear fall off to zero over the next 200 days. The peak asset value in the escrow pool is approximately $7.5 B, and is reached during the period of decline of deal flow from a constant rate down to zero. The trailing rightward tail, which begins at around day 890 to 920 (depending on whether one looks at average, minimum, or maximum) is largely due to the approximately 13% of escrow monies that are held beyond their stated term because of disputes. This simulation set summarizes 1000 separate Monte Carlo simulations.

Figure 15:
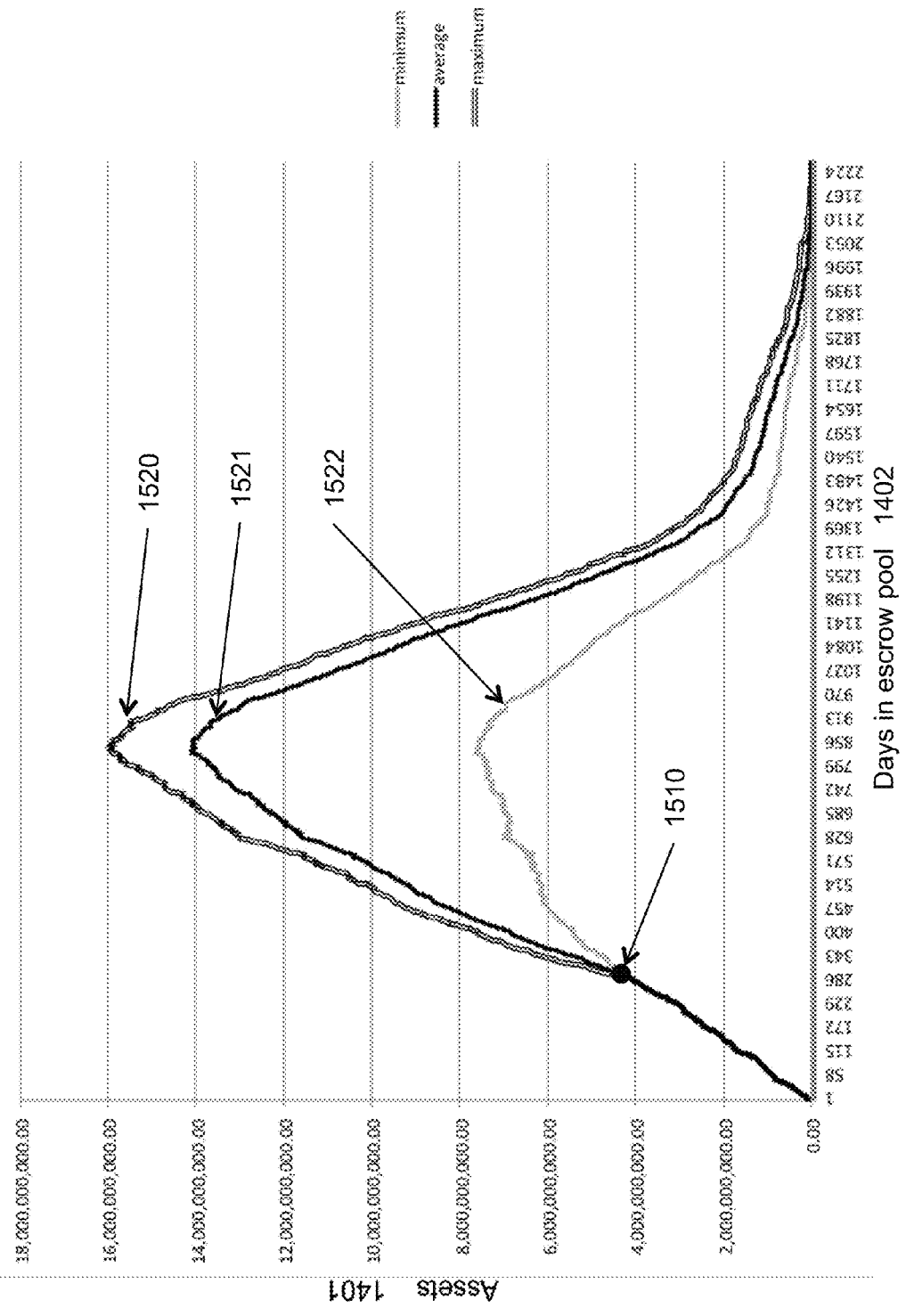
FIG. 15 shows another output of the Simulation Engine, showing low-water, average, and high-water marks for a simulation with a constant stream of escrow inflows, followed by a linear decline to zero inflows over time.

Simulation output 1500 in FIG. 15 provides a similar graph, this time for the start of simulation 1510 beginning 300 days after the commencement of the escrow pool. In this simulation, there are 500 days during which the average deal rate is 1 deal/day. From day 800 to day 1000, deal flow slows linearly from 1 deal/day to zero. From day 1000 onward, deal flow is zero and the pool winds down. Simulation output 1500 also summaries 1000 individual Monte Carlo simulations.

Characteristics of this simulation set include a much lower slope for the worst case, minimum curve 1522. This is due to deal flow decreasing over a longer time frame in simulation 1500 than in simulation output 1400. There is also a larger spread between minimum escrow pool size 1522 and the average 1521, when compared to the spread between average 1521 and maximum 1520.

It is readily apparent to a skilled practitioner that these are extremely valuable for determining expected behavior of an escrow pool over a variety of circumstances. Key uses include constructing an optimal portfolio of assets to manage, in the face of uncertainty of future cash inflows/outflows, and determining the need for and pricing of any related insurance or guarantee.

By varying the number of simulations in Flowchart 1100, the Simulation Engine is used to model exceedingly rare events. In accordance with the example shown in FIG. 5A and FIG. 5B, the Central Limit Theorem applies to the simulation distributions. Once the parameters of the probability distribution (e.g., mean, standard deviation, skew, and kurtosis) are well defined, the probability of a given event is determined by reference to the Gaussian, rather than to the raw data.

A meta-simulation may be done with multiple simulation sets varying the iteration values to determine the incremental behavior of the escrow pool curve as the number of iterations increases, and hence the fit of the Gaussian.

The Simulation Engine is used to quantify the risks associated with such items as concentration risk (a concentration metric) and diversification risk (a diversification metric). For example, simulations may be done where no escrow comprises more than 2% of the portfolio, compared to others where concentration may reach 5% of the portfolio. Similarly, different simulations may be done to show the effects of, for example, concentration of escrows from life sciences transactions vs. a broader range of industries.

Portfolio Engine

Portfolio Engine 103 of FIG. 1 uses the output of Simulation Engine 104 to construct investment criteria for the management of a portfolio of assets, such that the pool of assets is appropriately matched or otherwise linked to the pool of escrow outflows. An example simulation analysis to do such portfolio management is illustrated via FIG. 16A-FIG. 22.

FIG. 16A shows (in simulation output 1600) the same simulation output of FIG. 14, but only depicts the minimum value of the set of simulations. This "low water mark" of the simulation is a worst-case analysis of the projected future cash flows. The scale of FIG. 16A differs from that of FIG. 14, but the data values are the same.

Point 1610 is the current point in time, line 1630 delineates past from future time, and line 1640 delineates cash in the escrow from projected future cash. Shaded area 1650 depicts the projected durations required of the assets currently in the escrow pool. Diagonally hatched area 1620 depicts the projected durations of assets projected to enter the escrow if deal flow linearly decreases from 1 deal/day to zero over the next 200 days. These are the same assumptions as the simulation of FIG. 14. Deal sizes and durations are estimated from historic escrows.

The centroid of shaded area 1650 represents the weighted average length of the liabilities in the simulated pool of escrows, including any new escrows added in accordance with the simulation. In accordance with Flowchart 600 of FIG. 6, this simulation includes adjustments for historical claims rates on the real escrows, and historical claims data for all future projected escrows, and so does not need to be adjusted for claims. This models sensitivity of asset selection to predicted rates of continuing escrow cash inflows.

The diagonally hatched area 1620 represents the escrow liabilities and maturities if future deal flow matched the simulated values. In FIG. 16A, the deal rate at point 1610 is assumed to gradually decrease to zero over 200 days. In most realistic simulations of runoffs from the pool of escrows, a gradual decrease in inflows, rather than a catastrophic end, is reasonable. It should be noted that deal flow is being used as an example and is only one of the variables that can impact the performance and cash flow needs of the pool.

Figure 16B:
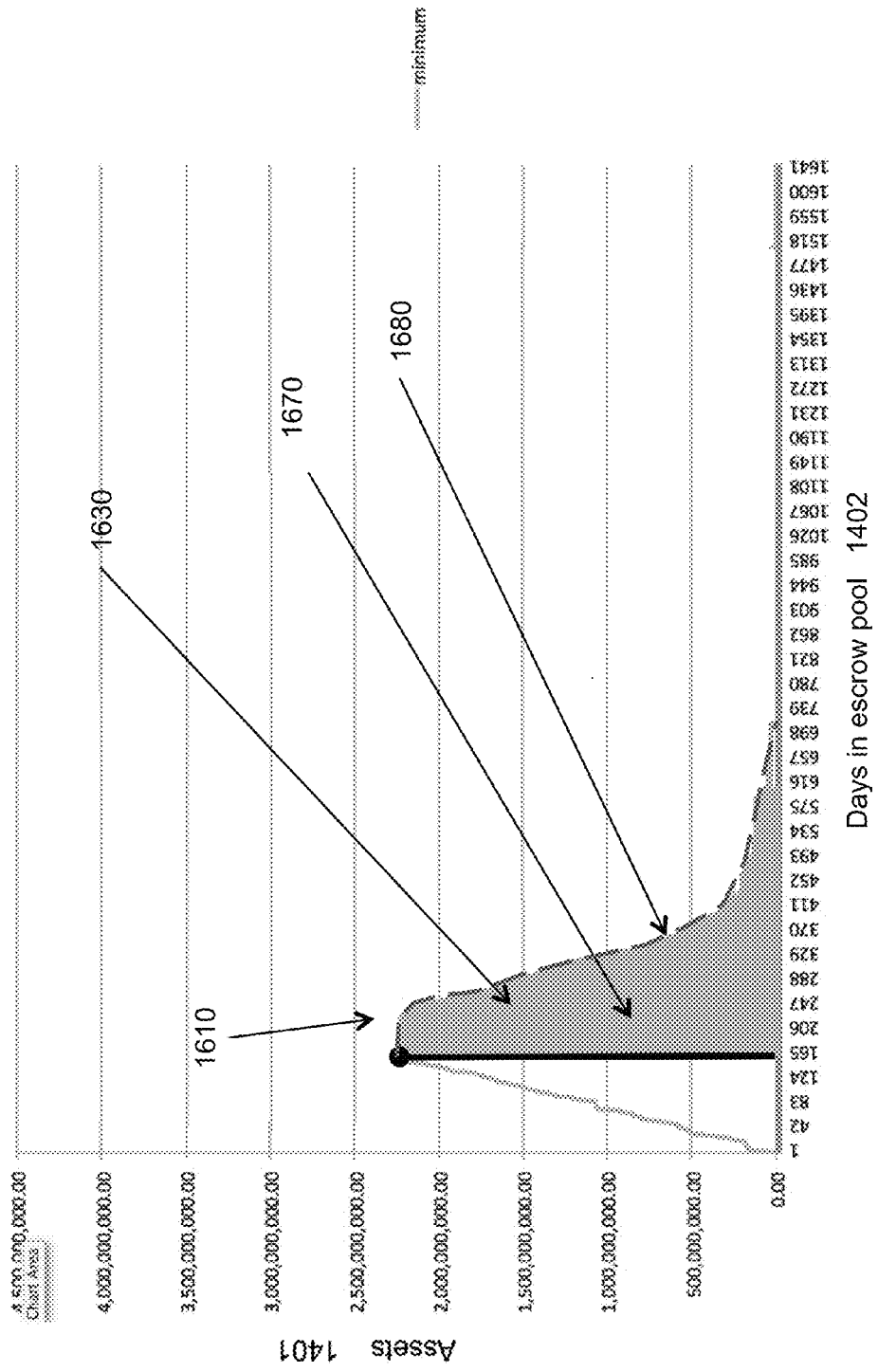
FIG. 16B illustrates various features of simulation of FIG. 14 with an immediate cessation of deal flow.

For a catastrophic termination of the escrow pool, FIG. 16B shows (in simulation output 1601) the same data up to current point 1610, but assuming no future cash flows. Outflows are still subject to contractual agreements, so they do not occur immediately. The line 1630 in FIG. 16B delineates past from future time, exactly as in FIG. 16A. But in FIG. 16B, dashed line 1680 denotes the exact maturity remaining in each liability in the actual escrow pool, adjusted for historical expected claims rates, and the centroid of shaded area 1670 represents the weighted average length of the escrow liabilities.

It will be appreciated that FIG. 16A and FIG. 16B represent two views of the possible future of an actual escrow past point 1610 in both figures. FIG. 16A assumes deal flow, which had been steady at a rate of 1 deal/day, will decline linearly over a period of 200 days. This is similar to the simulation input deal arrival rate of FIG. 4B. In contrast, FIG. 16B assumes deal flow transitions from 1 deal/day to zero instantaneously, as in FIG. 4A. Either scenario is possible in the real world, but which one is more realistic depends on a host of factors, which an entity using the present invention can model. These include, but are not limited to: predictions from sales pipelines, extrapolations from moving averages of past deal flow, overlays of seasonal effects, and similar properties.

Figure 17:
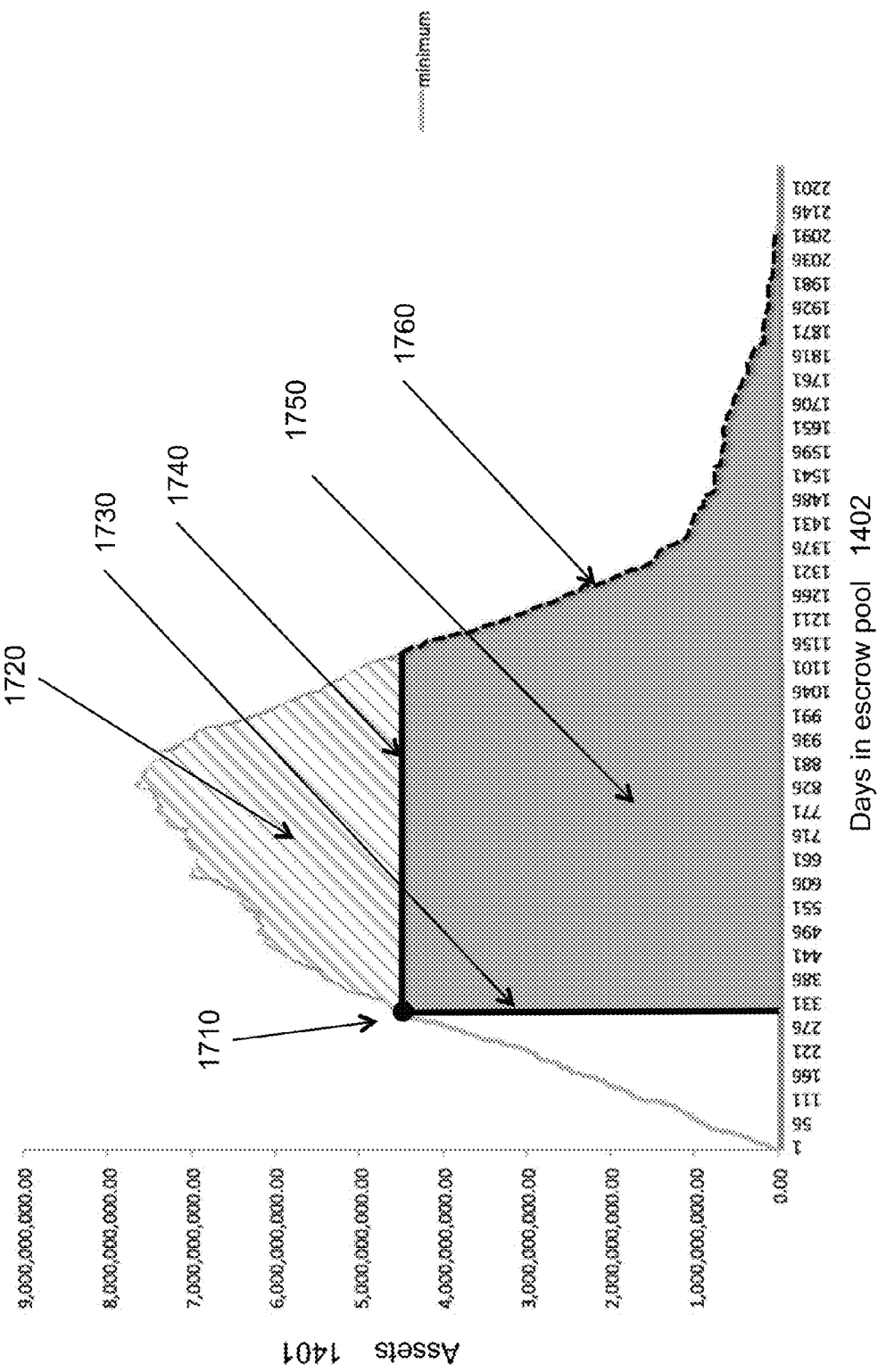
FIG. 17 illustrates various features of simulation of FIG. 15 with a linearly declining deal flow rate.

FIG. 17 depicts (in simulation output 1700) the same simulation output of FIG. 15, with more optimistic assumptions of deal flow in the future. FIGS. 16A, 16B, and 17 show that the range of behaviors depends on the assumptions of future deal flow rates, as well as the distribution in size and duration of the historical escrows in Escrow History Database 140 that are used in the Monte Carlo simulation.

The simulated portfolio of FIG. 17 shows how a specific set of assets may be chosen to match the portfolio duration profile. In FIG. 17, the distance from current time line 1730 to dashed line 1760 at the end of the simulation curve at any given point is the measure of time that an infinitesimally small amount of money is expected to stay in the portfolio under worst-case conditions (e.g., in FIG. 17, one in a thousand simulations).

Figure 18:
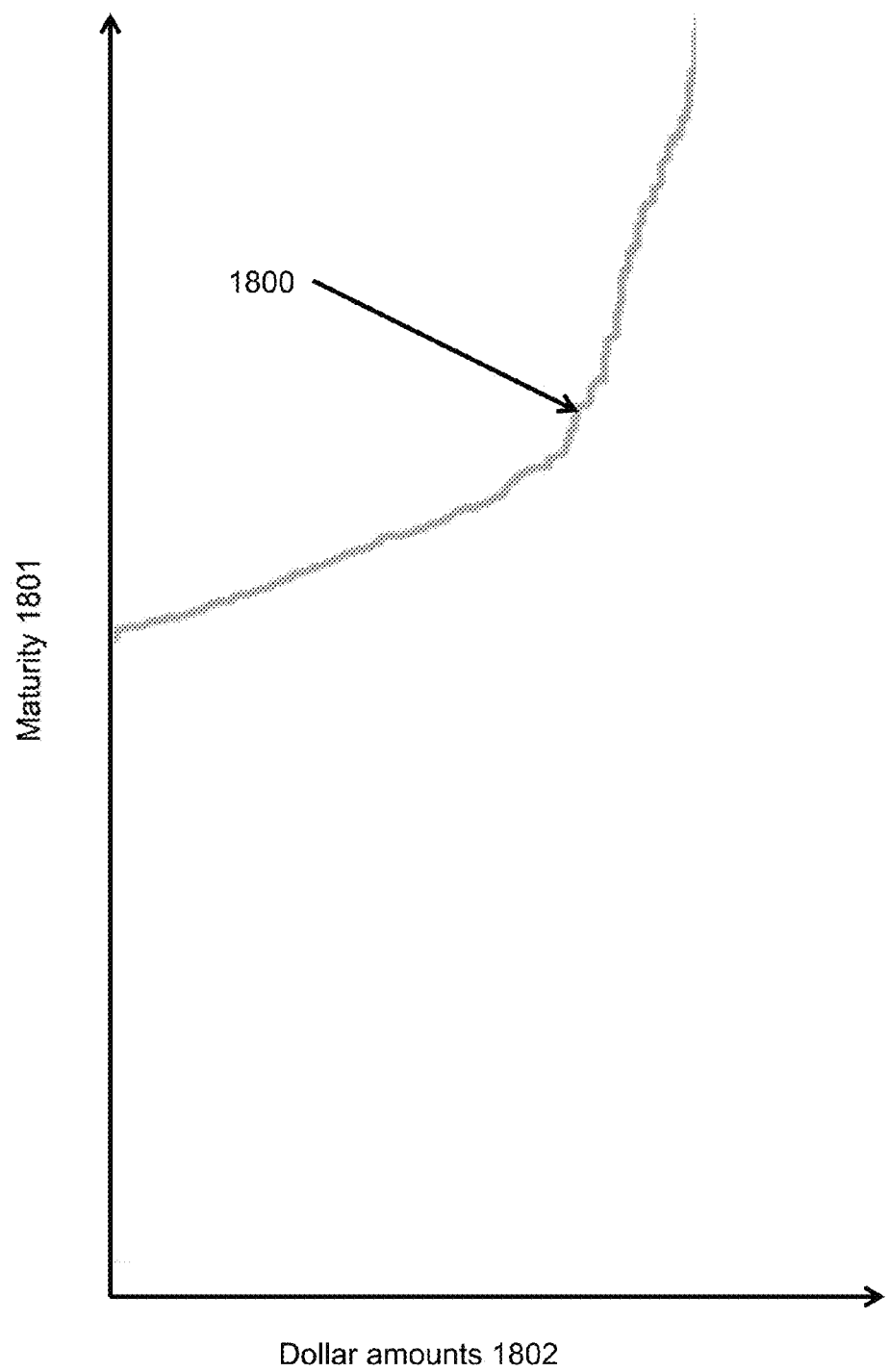
FIG. 18 shows a maturity distribution profile.

FIG. 18 shows the same data, but with the axes reversed. Curve 1800 is identical to dashed line 1760 of FIG. 17, but turned 90 degrees. Axis 1801 is labeled "Maturity" to indicate nominal maturity for an investment asset such as a bond. This axis is measured in days. Axis 1802 indicates the portfolio amounts. While this maturity distribution curve is continuous, it may be quantized into any number of discrete segments. The portfolio amounts axis 1802 may either be absolute (e.g., in dollars) or relative (e.g., in percentages). As will be seen below, there are advantages to using percentages.

Figure 19:
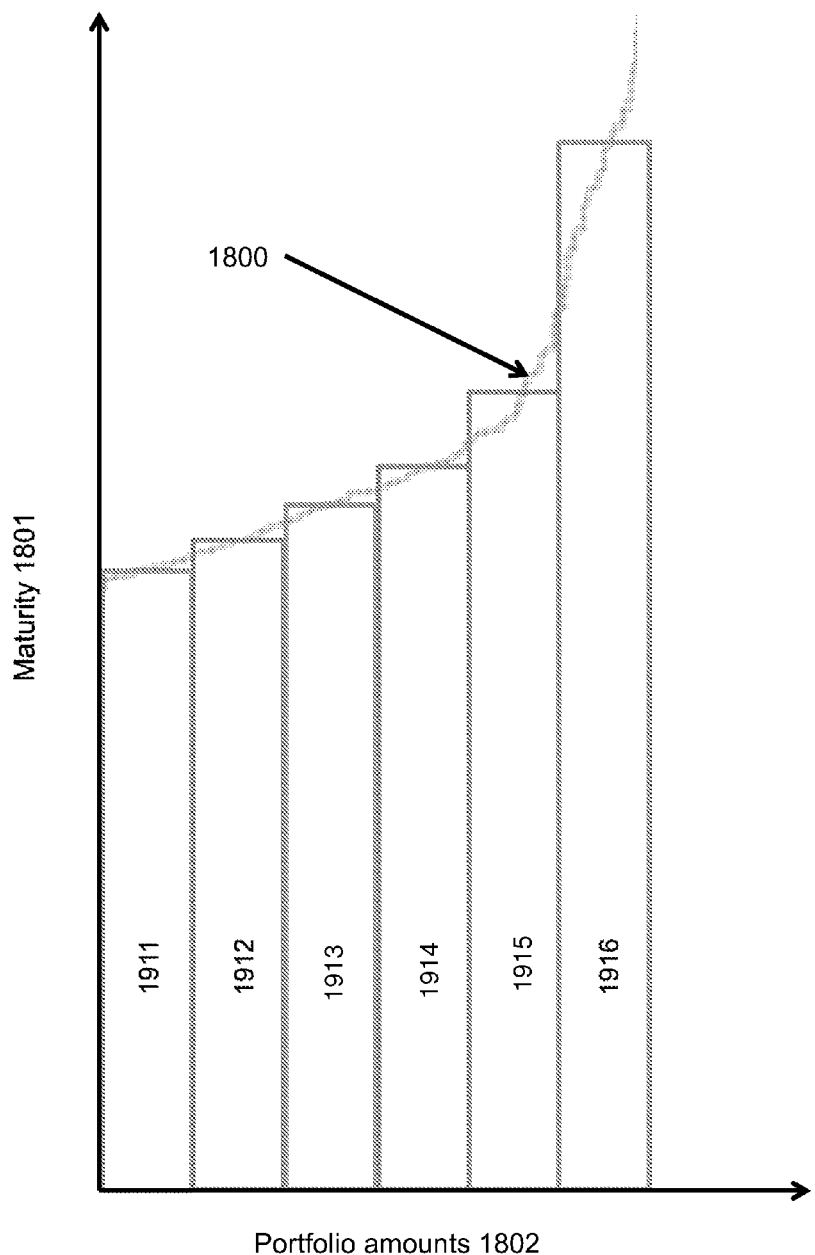
FIG. 19 depicts an allocation of asset maturities to match a maturity distribution profile.

FIG. 19 shows one such quantization, into 6 equal ranges. In other words, if the amount of money in the pool were $600M, each range would constitute $100M worth of assets, or 16.67% of the portfolio. The space under the curve is tiled with six rectangles 1911 through 1916, such that the area of the rectangle is approximately equal to the area under the curve traversing the rectangle. Each rectangle represents an investment asset class whose maturity is equal to the height of the rectangle. The distribution of these asset classes is a form of investment criteria called the Maturity Distribution Profile (MDP). The MDP may be specified in tabular form or, as in 1900, in graphical form.

It will be appreciated that the rectangles can be of arbitrary size and number. That is, there may be six ranges of equal width, 100 ranges of equal width, or 50 rectangles of varying width (i.e., one of $100M and another of $1M). In the limit of an infinite number of such rectangles, the MDP approaches the continuous curve 1800 of FIG. 18. Thus, depending on needs, an investment manager using the Portfolio Engine may construct a portfolio of assets that matches the durations of the liabilities in the escrow pool simulated to a given worst-case risk level (e.g., one in a million event).

It is also important to model the need for a certain amount of cash or near-cash reserves to address known or anticipated short-term claims such as working capital adjustments. This is achieved by analysis of the terms of new escrows in the pool compared against the historic database of completed escrow transactions in Escrow History Database 140.

Figure 20:
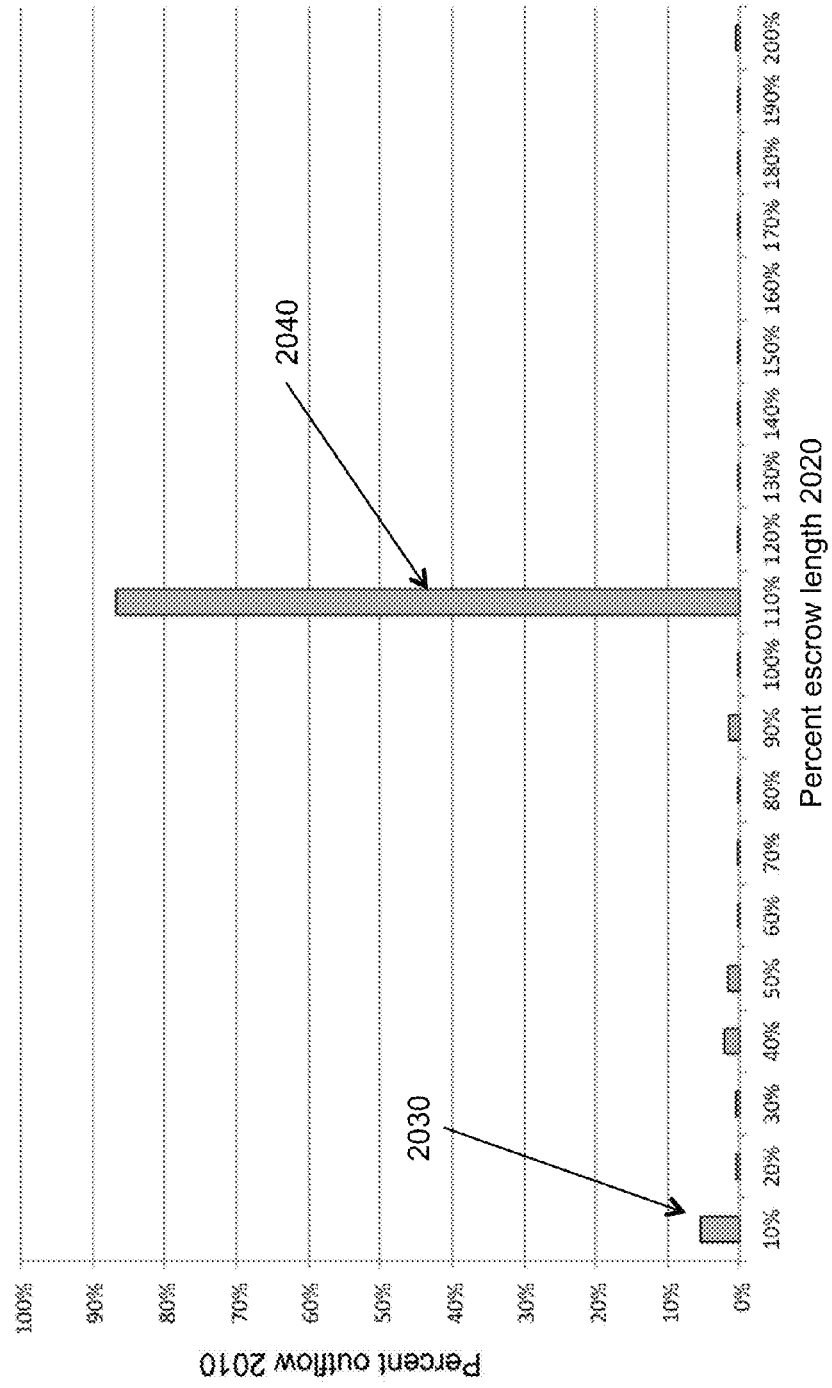
FIG. 20 shows a histogram of actual vs. planned outflows for a set of escrows.

FIG. 20 shows a histogram of cash outflows from escrows. Since the escrows vary significantly in length and size, the data in the histogram is normalized. Horizontal axis 2020 is quantized into buckets based on percentage of nominal escrow length, with each bucket representing a 10% slice of the escrow length. The vertical axis 2010 shows the percentage of cash disbursed in each of the buckets. As can be readily seen, about 5% on average of the escrow balance is disbursed in the first 10% of the escrow life. This is typically due to factors such as adjustments to the sale price based on revisions to the balance sheet in the first 45-60 days after the close of the deal or third-party indemnification claims triggered by the announcement of the transaction. About 87% of the total escrow amount, in the aggregate of the historical data, is released on schedule. Because of slight delays in the release, this shows up in the 110% bucket of the histogram. Amounts beyond the 110% bucket represent monies held back because of claims still unresolved as of the expiration date. If these claims have lengthy dispute resolution processes, such as arbitration or lawsuits, the monies may not be released for months or years.

Figure 21:
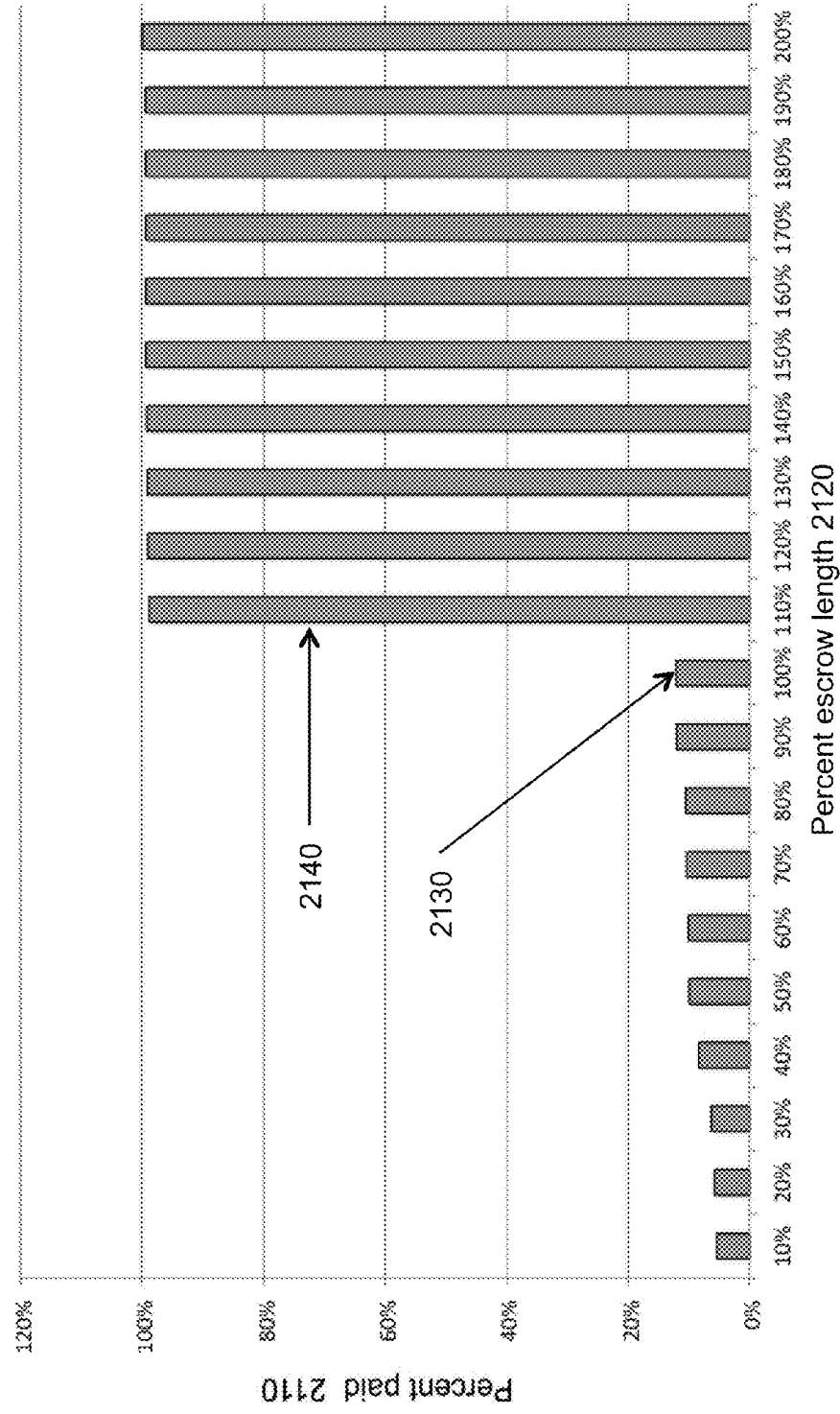
FIG. 21 shows the cumulative behavior of actual vs. planned outflows for a set of escrows.

FIG. 21 shows another way of looking at the data, summing the cumulative cash disbursed rather than per-bucket. The horizontal axis 2120 is still normalized to nominal escrow length, and the vertical axis 2110 is normalized to the percentage of escrow paid. Bar 2130 of this graph show that slightly less than 15% of the total escrow amount is paid in total prior to the nominal end of escrow. At the 110% mark, almost the entirety of the escrow is paid.

In addition, the historical data shows how long deposits are held when claims are made, i.e., how claims affect the timing of cash outflows. This is important because larger claims are more frequently complex and disputed and therefore can lead to deposits being held for longer periods of time, often in excess of the escrow period. Claims also are often made close to the end of the escrow, which all but guarantees that a portion of the deposits will be held longer than the escrow period. Preferred embodiments of the present invention use historical claims data, including disposition of the claim, means of settlement, and other factors to gain predictive advantage.

Figure 22:
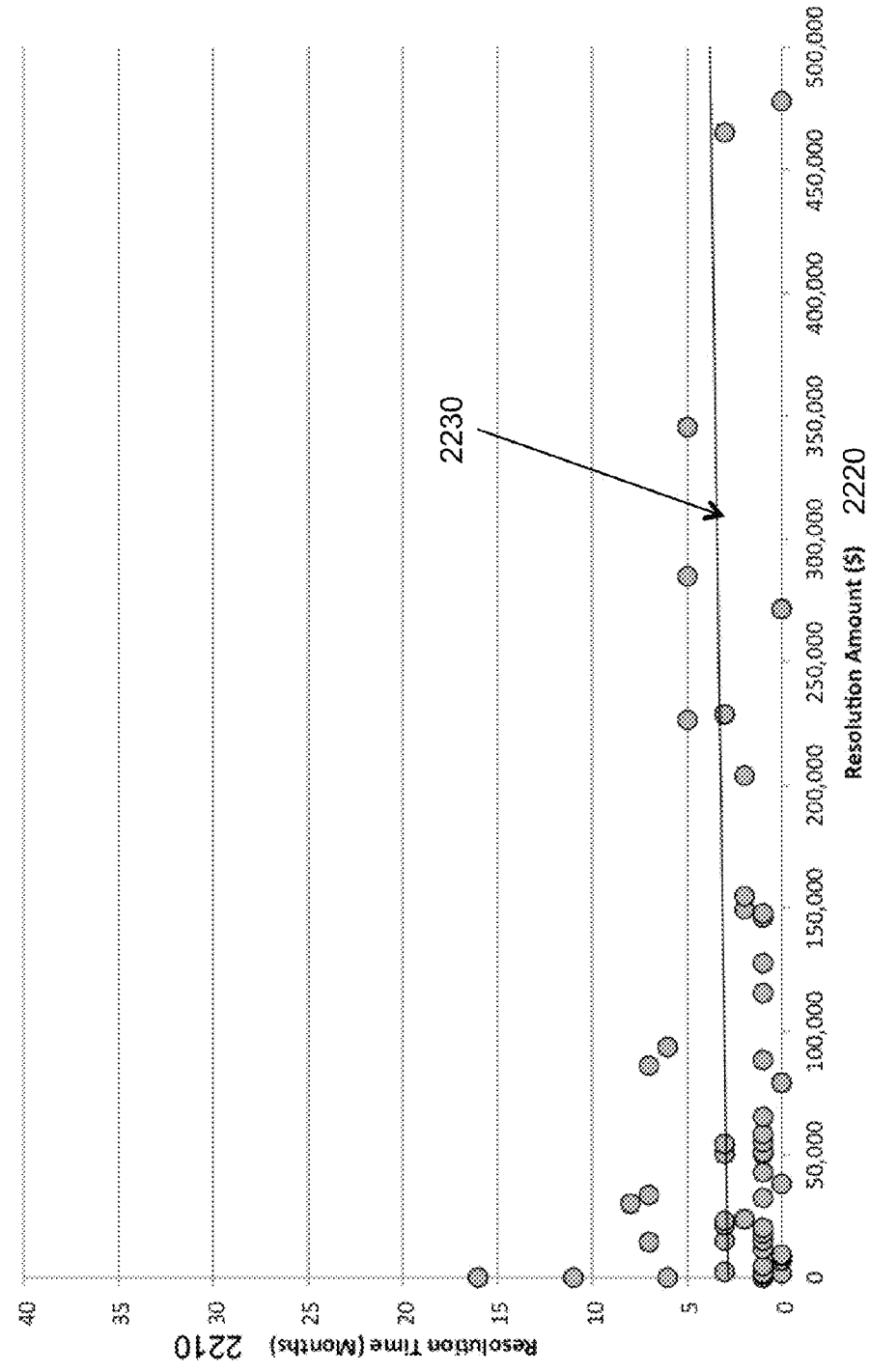
FIG. 22 shows a scatter plot of claim resolution time vs. resolution amount.
Figure 23:
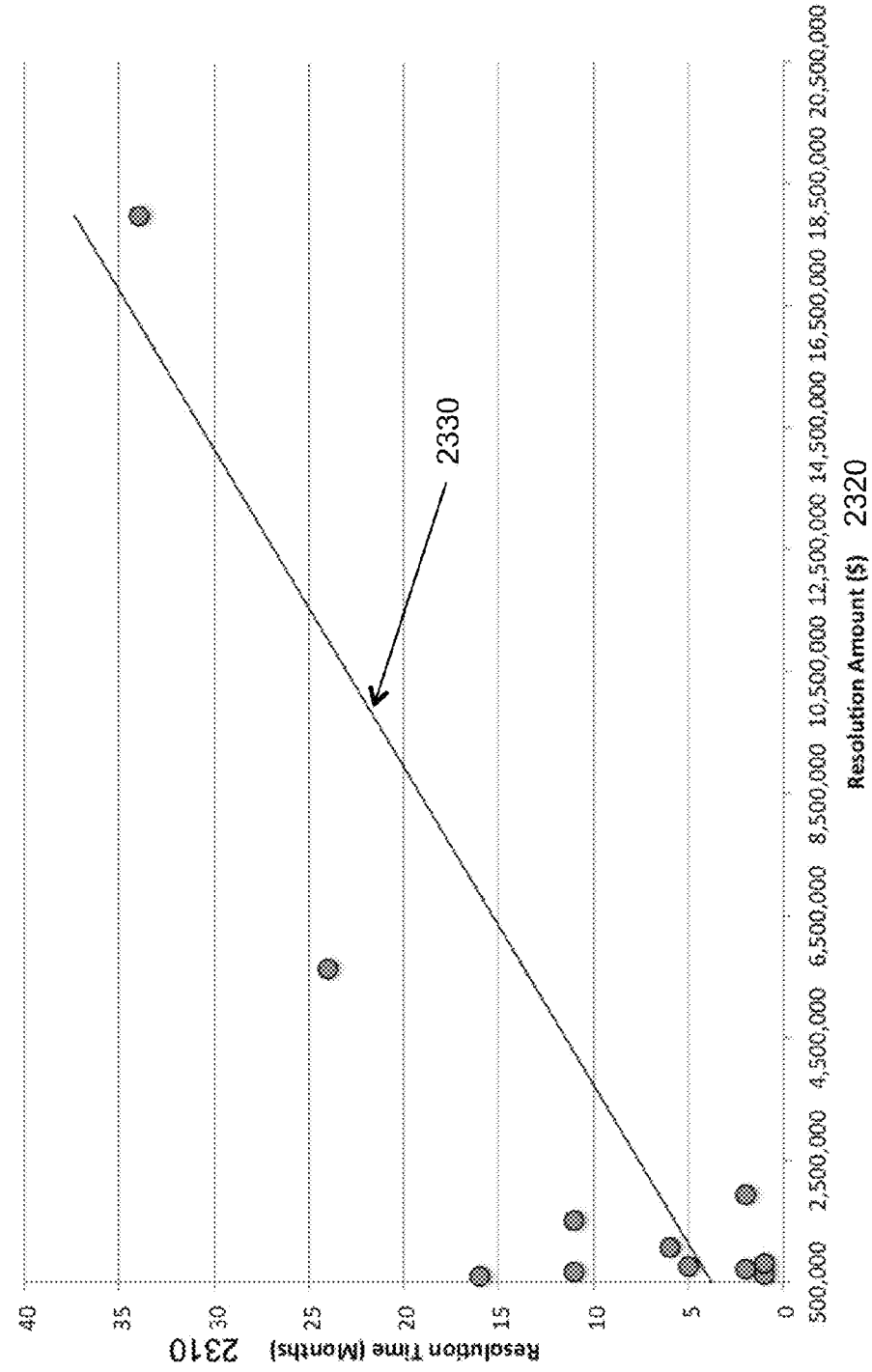
FIG. 23 shows another scatter plot of claim resolution time vs. resolution amount.

FIG. 22 shows that smaller claims (under $500K) are settled in a relatively constant period of about four months. FIG. 23 shows that for claims over $500K, the resolution time is linearly proportional to the claim size. Using the historic distribution of claims as a fraction of escrow size, this data is used to predict aggregate delays for a given escrow.

Figure 24:
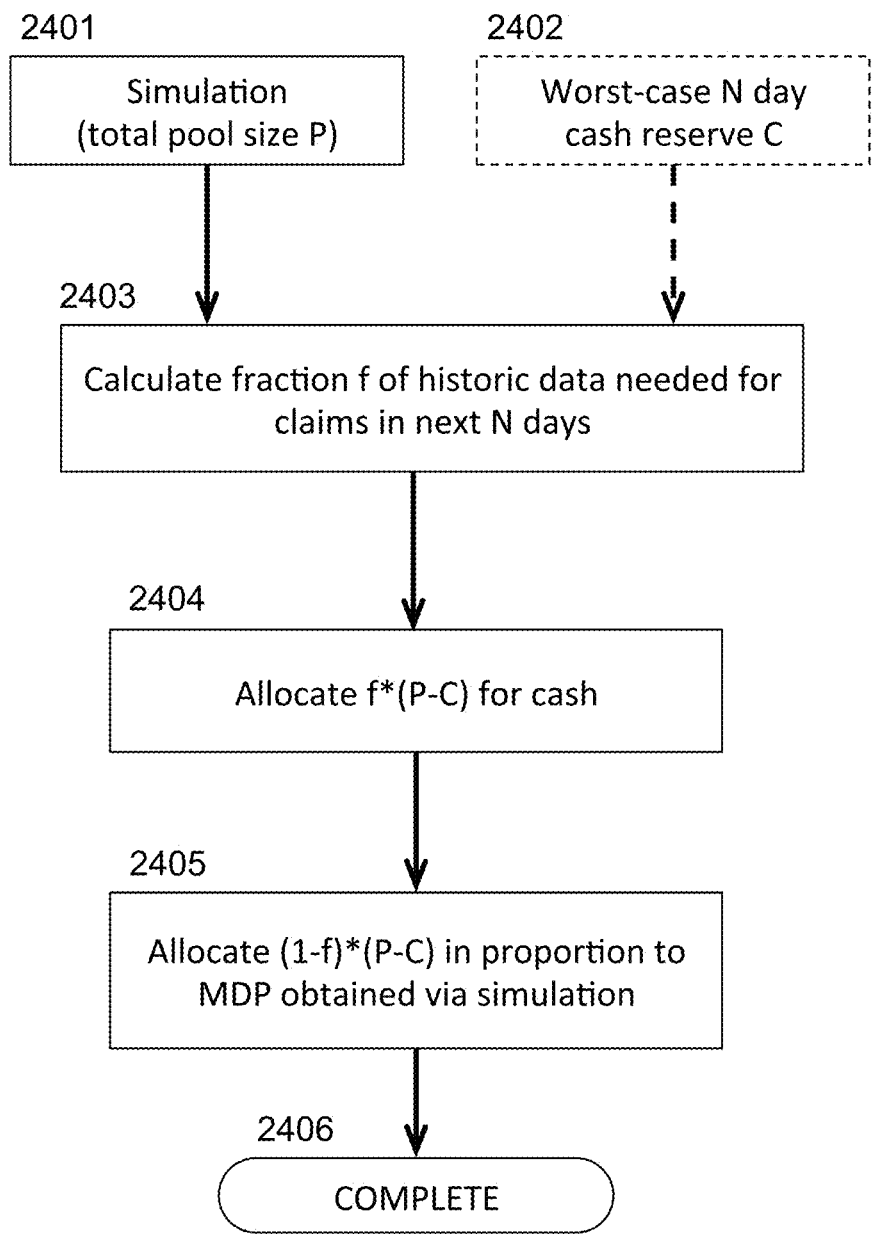
FIG. 24 provides a flowchart for allocating assets for a given escrow pool and optional parameters such as number of days of cash reserves required.

This historical data in histogram form shows the minimum percentage of assets that must be held in cash or near-cash, regardless of simulated performance. It also gives a rationale for the trailing rightward tail observed in FIG. 14 and FIG. 15, in terms of the delays experienced in the dispute process. This data is used in Flowchart 2400 of FIG. 24 to allocate all investments in the portfolio.

While in a simulation such as simulation output 1700 of FIG. 17 assumes continuing cash inflows (in diagonally hatched area 1720), a more conservative approach is to only invest the money actually in the pool (i.e., only the shaded area 1750). If deal flow behaves as predicted, then asset maturities in the long term will resemble the dotted line 1760 (or the graph of FIG. 18). Any deviations from the predicted deal flow will be accounted for, as shown shortly. But for the short term, a cash reserve is desired.

Flowchart 2400 provides an example how assets are allocated using a combination of the historical data on short-term cash needs, plus the simulation data from the Simulation Engine. One input to the flowchart is a simulation output 2401, which is a result of a simulation following Flowchart 1100 of FIG. 11.

A number of other inputs may or may not be used, depending on the risk management strategies employed. If the predicted future deal arrival rate is non-zero, and if a conservative estimate of cash inflows is desired, this may be computed in optional input 2402. While the deal arrival rate is an input to the simulation, in actuality in a given N day period, the actual deal flow may be below average. In addition, the size of each deal varies randomly, so a "low water mark" cash reserve C may be taken as the minimum value of cash inflows to the simulation over any N day period in simulation output 2401.

It will be understood that input 2402 is by way of example only, and that a variety of similar inputs such as escrow lengths, concentrations of deposits and other similar factors may be constructed using real or simulated data. Alternatively, no inputs beyond simulation output 2401 might be used. For the purposes of the discussion of Flowchart 2400, assume that input 2402 is used, and that value C will be used in the subsequent calculations.

Using the total escrow size and the historical claims data of FIG. 20 and FIG. 21, state 2403 calculates a cash reserve fraction f. In state 2404, both f and C are used to allocate the amount of the portfolio P to be kept in cash. This equals f*(P−C).

The remaining cash (1−f)*(P−C) is allocated in proportion to the maturity distribution profile. For example, the MDP 1800 of FIG. 18 is reduced to (1−f) its actual value, meaning each asset allocation rectangle 1911-1916 of FIG. 19 is reduced accordingly. The net result is a conservative asset allocation shown in FIG. 25, with cash in shaded rectangle 2510, and asset allocations as determined in rectangles 2511-2516.

This computation is performed either whenever a new escrow enters the pool, or an unanticipated cash outflow occurs, or in a preferred embodiment, on a periodic basis. The latter is preferred because in practice an asset manager of a mature pool might not rebalance the portfolio with each new escrow or cash outflow. The difference between the current asset allocation and the newly calculated optimal allocation provides the asset manager with the needed guidance to purchase new assets.

Figure 27:
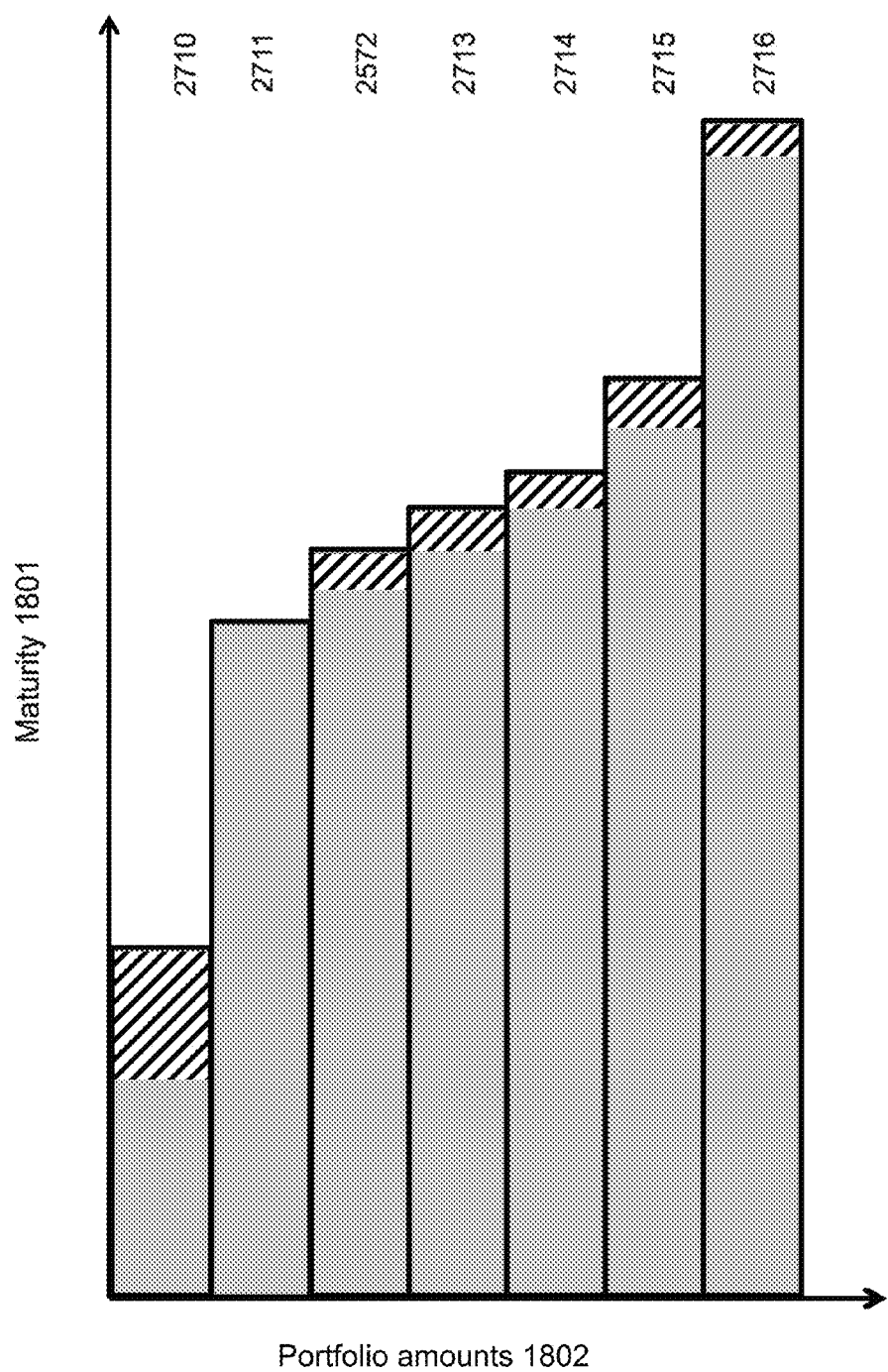
FIG. 27 shows the current asset allocation against a previous asset allocation.
Figure 28:
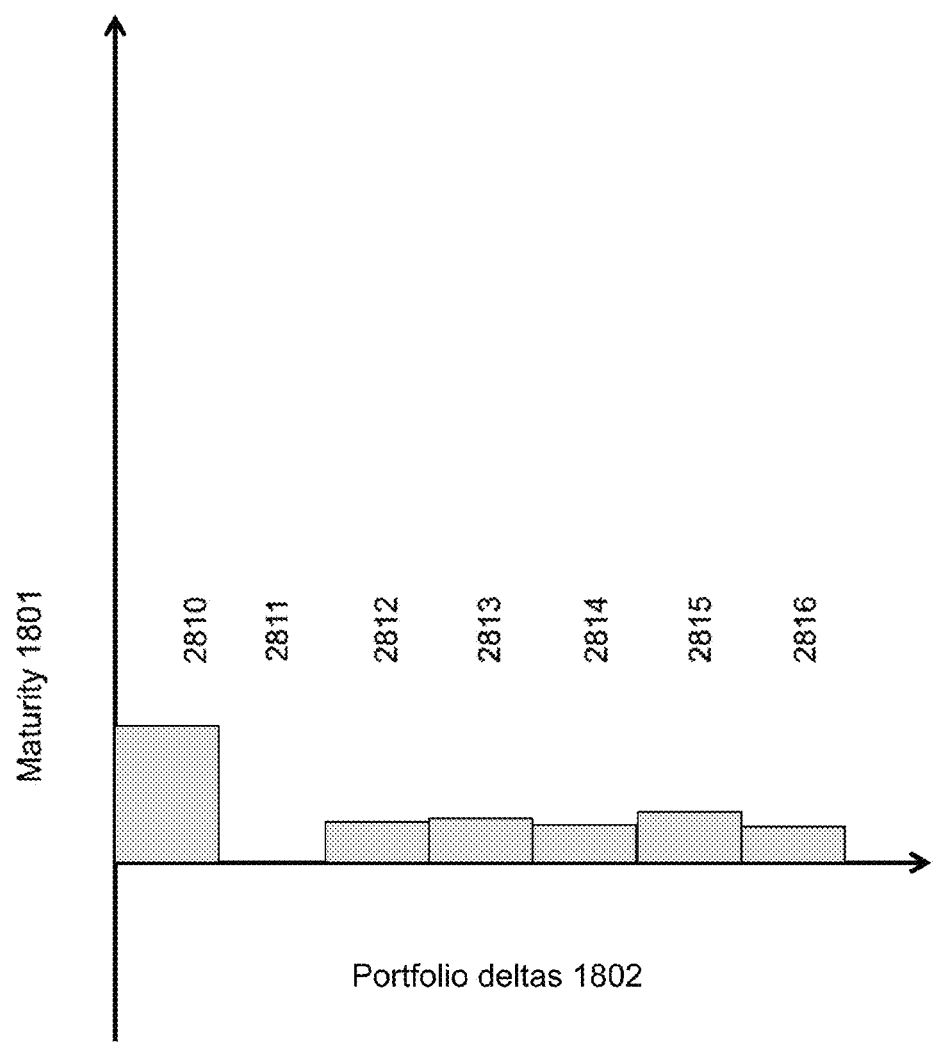
FIG. 28 illustrates the incremental purchases required to bring a previous asset allocation into conformance with a new asset allocation.

FIG. 27 and FIG. 28 illustrate this computation. In FIG. 27, the solid portions of columns 2710 through 2716 are the allocations of the asset portfolio prior to a re-computation of the maturity distribution profile 1800 in FIG. 18. The halftone shaded rectangles are the newly computed allocations in accordance with the method presented above. FIG. 28 simply shows the difference between the solid shaded and the halftone shaded allocations. This difference is the optimal mix of new assets to purchase to bring the portfolio back into balance with simulated predictions of the escrow pool's behavior taking into account the characteristics of the pool at such time.

If allocations are done as percentages of the portfolio, then the comparison of an escrow pool in FIG. 27, between the escrow pool of size $X and a later size of $Y, where X≠Y, is simplified, because the percentage bucket boundaries will line up with each other. If instead, the allocations are done in absolute dollars, then the asset bucket boundaries will not line up with each other, resulting in the sub-division of buckets into smaller buckets to get boundaries to line up. After a number of rounds of re-allocation, this scheme will lead to a large number of small buckets.

Figure 26:
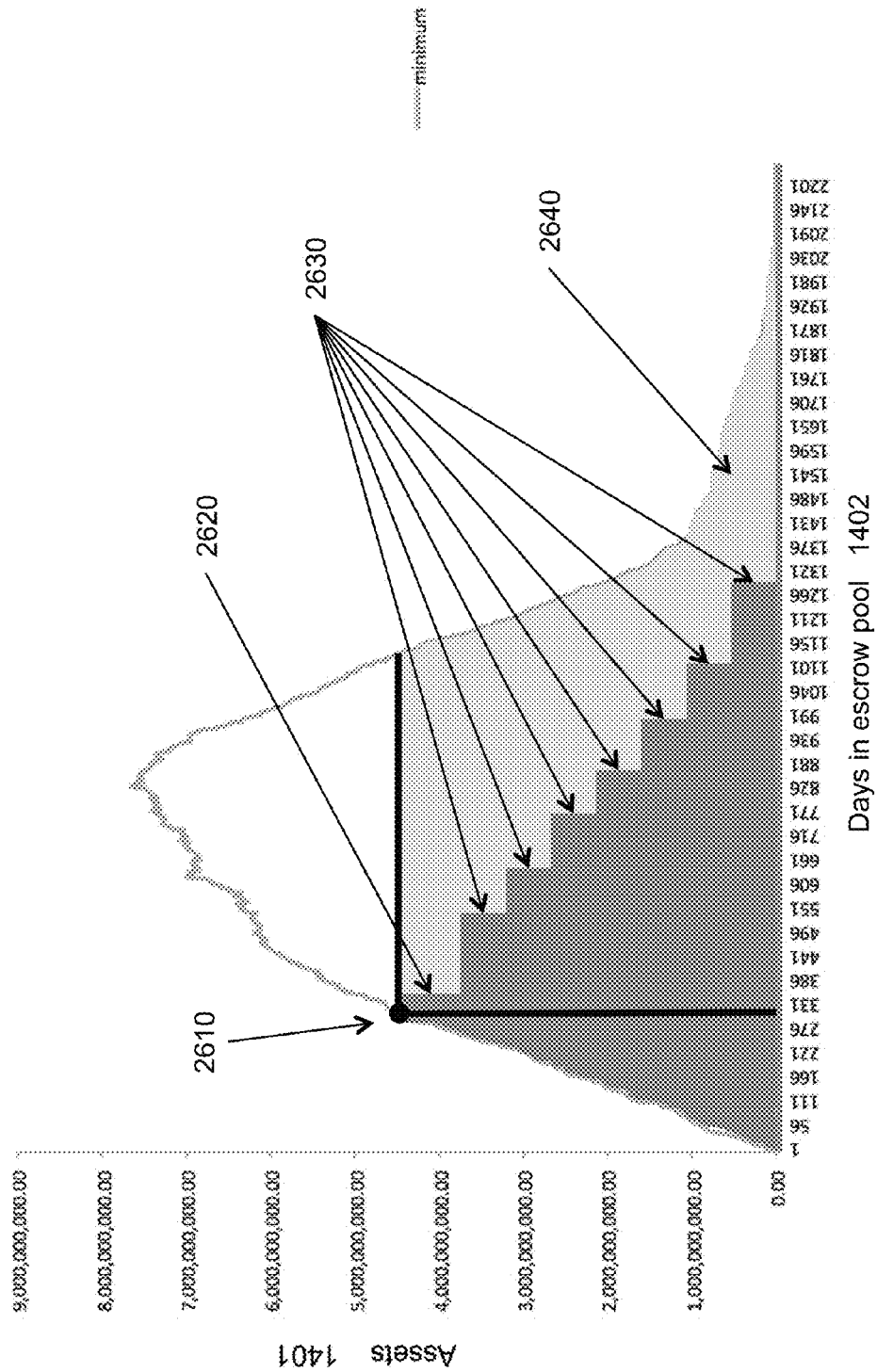
FIG. 26 shows the results of allocation for a given maturity distribution profile, laid out against the simulation of FIG. 15.

FIG. 26 shows similar information overlaid on a simulation output, depicted as Maturity Distribution Output 2600. As in FIG. 14, assets 1401 are graphed vs. days in the escrow pool 1402. In FIG. 26, point 2610 represents the current point in time. Gray rectangle 2620 shows the amount of money in short-term cash, while rectangles 2630 show different amounts of money in assets of different durations, proportional to the width of each gray box. Lighter shaded area 2650 shows the new maturity distribution profile to which the existing asset distributions will be adjusted.

The above discussions have made an implicit assumption about portfolio management, which is that the portfolio should mitigate risks associated with interest rate changes by explicitly matching the asset maturities with the escrow pool's projected future outflows (i.e., cash flow matching). For most purposes, cash flow matching is difficult to implement, but since escrows are governed by contract, it is practical in this situation with a high degree of confidence.

It should be noted that a portfolio manager may choose other management strategies, such as a bullet or a barbell portfolio composition. Each performs differently in periods of interest rate and/or yield curve change. This is described in, for example, "The Relative Performance of Yield Curve Strategies." Steven V. Mann and Pradipkumar Ramanlal. The Journal of Portfolio Management Summer 1997, Vol. 23, No. 4: pp. 64-70. The analysis provided by the present invention is equally applicable to asset managers using such alternative investment strategies because the asset manager still needs to determine how to meet the cash flow needs of the pool. In other words, generally and without limitation, the MDP provides the level of information required for decomposition into asset classes in cash flow matching, duration matching, and related portfolio management techniques.

When constructing non-term matched portfolios, the first derivative and the second derivative of the maturity distribution profile (MDP) provides measures of weighted asset maturity and convexity that can be fed into industry standard portfolio emulation tools, such as those available from Black-Rock Risk Solutions or Barra (Barra Optimizer from MSCI Inc.), to construct these alternative portfolios.

While the MDP provides the maximum asset maturities that allow the assets ordinarily to be held for their full term, an asset manager may invest in a set of assets that are shorter than the MDP would suggest. The MDP provides an upper limit for selecting assets that are managed to term, but it does not require that assets be equal to that upper limit. The decision on asset terms depends in part on risk management, including deal flow modeling, interest rate and yield curve behavior, and the like.

Risk Engine

Managing a pool of assets to maximize returns entails some financial risks. The models generated from the Simulation Engine and Portfolio Engine as described above are able to eliminate most of the anticipated risk because they anticipate what is expected to occur within the pool with a high degree of statistical accuracy, but unexpected outcomes, while unlikely, are still possible. As described above, this effectively prevents most escrows from being invested in a pool vehicle such as that contemplated with the present invention, because the merger parties usually will not be willing to assume this risk of loss. The Risk Engine described herein provides the model to allow a third-party insurer or guarantor to provide protection against the residual remaining risk, thereby making the pool an acceptable investment alternative for the applicable escrows. Perhaps the largest risk metric is market value to book value risk (MV/BV risk), also called market risk. If the pool's cash outflows unexpectedly increase concurrently with a rise in interest rates, then the market value of the pool's assets can drop below the book value, and principal amounts can be at risk. The worst case would a complete runoff with no further inflows, as in FIG. 16B, while interest rates are rising. However, such an event is highly unlikely with proper modeling and monitoring.

The use of a contract such as an insurance policy or guaranty on the portfolio can eliminate nearly all risk associated with the pooled investment product. Such contractual terms can protect investors against, for example, loss of principal. Doing this requires:

1. An investment strategy with a low risk of loss;
2. An ability to quantify the remaining risk; and,
3. Contractual terms such as insurance or a guaranty to eliminate that remaining risk.

The method and process of preferred embodiments of the present invention enable satisfaction of these requirements. The Simulation Engine provides a means of determining likely future balances given a specified deal flow rate. Managing asset terms to the worst-case cash outflow rate of a large set of Monte Carlo simulations results in a low-risk investment strategy, with optimal allocation provided by the Portfolio Engine. The Risk Engine described below quantifies the remaining risk, allowing a third party, such as an insurer or guarantor to take on that risk in a principled fashion.

Preferred embodiments of the present invention utilize contractual protection as described above to mitigate downside risk for investors.

Aside from quantifying the risks, careful monitoring of behavior vs. assumptions allows for compensative measures to be taken to minimize compounding of any risk. For example, the behavior of the deal arrival rate is key to determining the optimal mix of investment assets. Absent any further information about how deals arrive, post facto analysis of trends in deal arrival rate is obtained using smoothing techniques such as moving averages. This is illustrated in FIG. 29 and FIG. 30.

Figure 29:
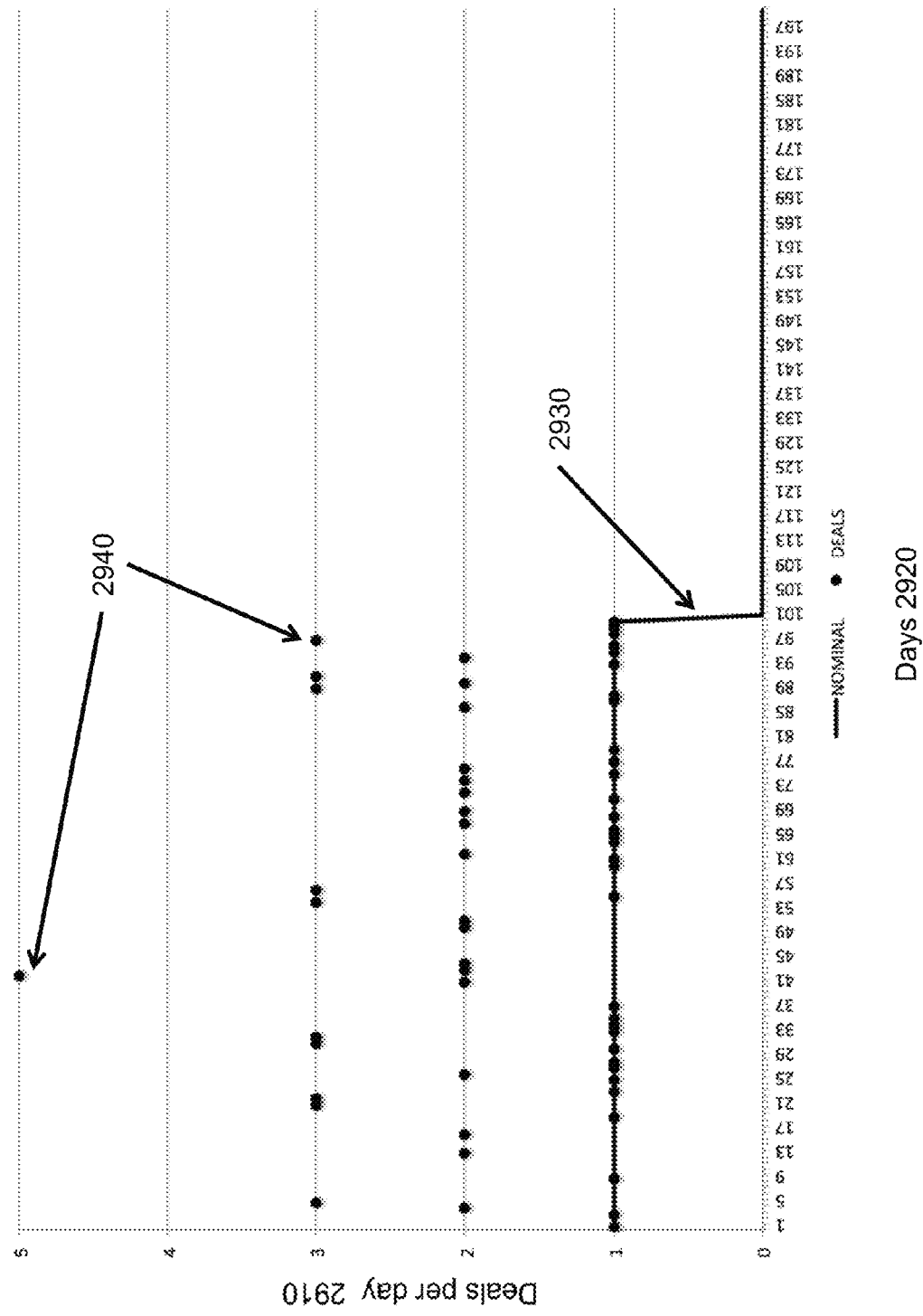
FIG. 29 illustrates deal arrivals conforming to a nominal rate

FIG. 29 depicts a nominal deal arrival rate, showing vertical axis deals per day 2910 vs. the number of days 2920. A nominal rate of one deal per day for days 1 through 100, followed by zero deals per day from day 101 onwards. This nominal rate is shown as line 2930. The Poisson process equation (1) and its corresponding getPoisson( ) function were used to create a series of data points using the nominal deal arrival rate. Some of these points 2940 are highlighted. Values of zero deals per day are not shown, so as to not clutter the x axis of the graph. The complete set of these points include numbers as high as five deals per day, but as low as zero deals per day. The property of the Poisson distribution is that, as the number of days increases, the average value of all deals per day, up to and including the final day, approaches the nominal deal arrival rate.

Figure 30:
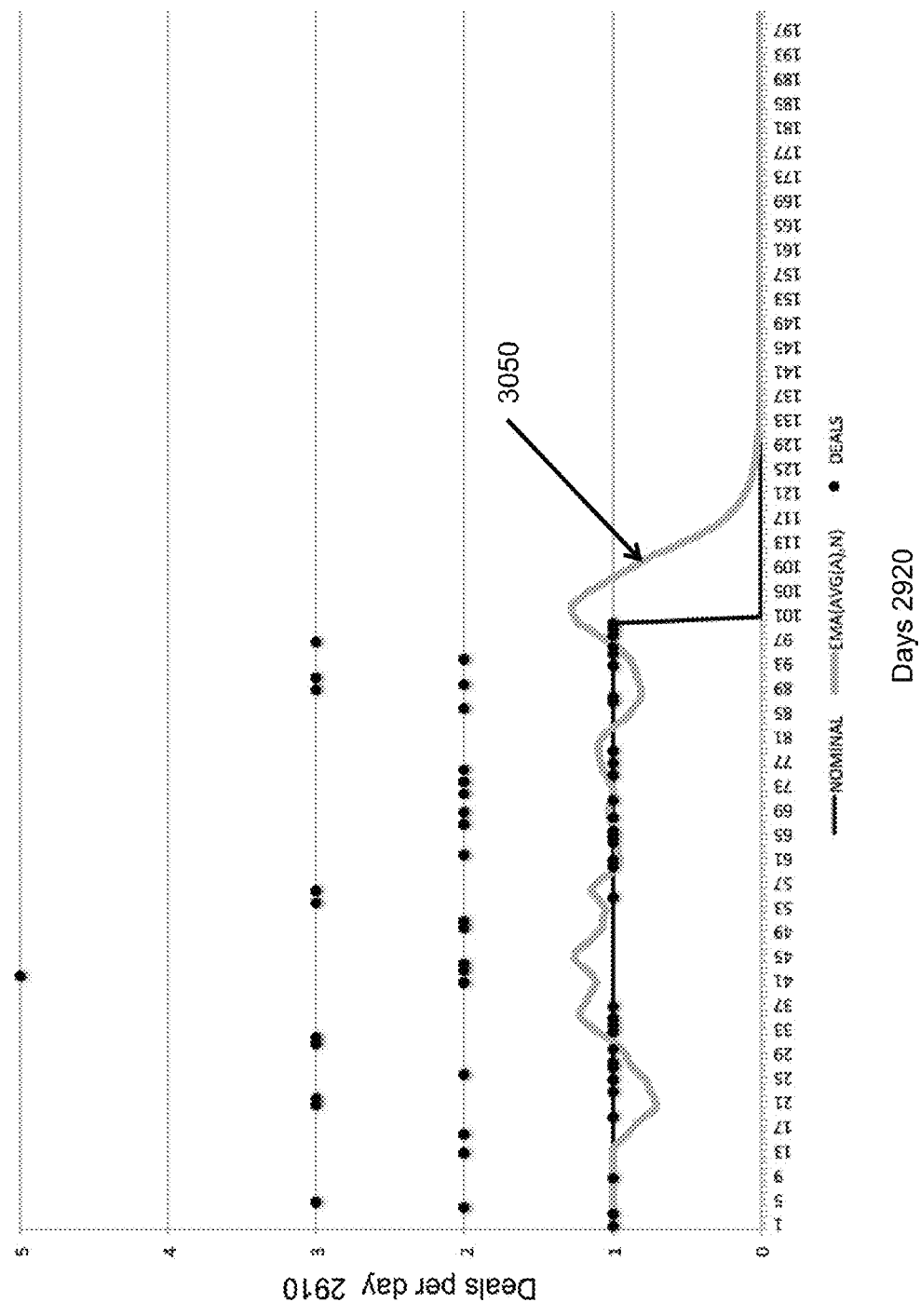
FIG. 30 depicts a smoothing function applied to actual deal arrivals

This generated data is used in FIG. 30 to illustrate one method of using moving averages to recover an approximation of the deal arrival rate, if only the deals per day points are known. In this example, a simple moving average (SMA) of the deals per day is taken, to smooth out the wide variance in values, and then an exponential moving average (EMA) of the SMA further smooths the SMA values. Curve 3050 of FIG. 30 is computed using the equation:

$$V = EMA(SMA(dealsPerDay,15),10) \qquad (2)$$

Here, the SMA is smoothed over a 15-day period, and the EMA uses a 10-day period.

A moving average is necessarily a lagging indicator, rather than a leading indicator. That is to say, the value V will rise or decline after the actual events occur. Absent an explicit model of the factors that affect the deal arrival rate, such measures are the best available indicators of how the deal arrival rate is expected to move. It is preferable to have some leading indicator for the deal arrival rate, but that requires a model of how escrow deals are sourced and funded.

Figure 31:
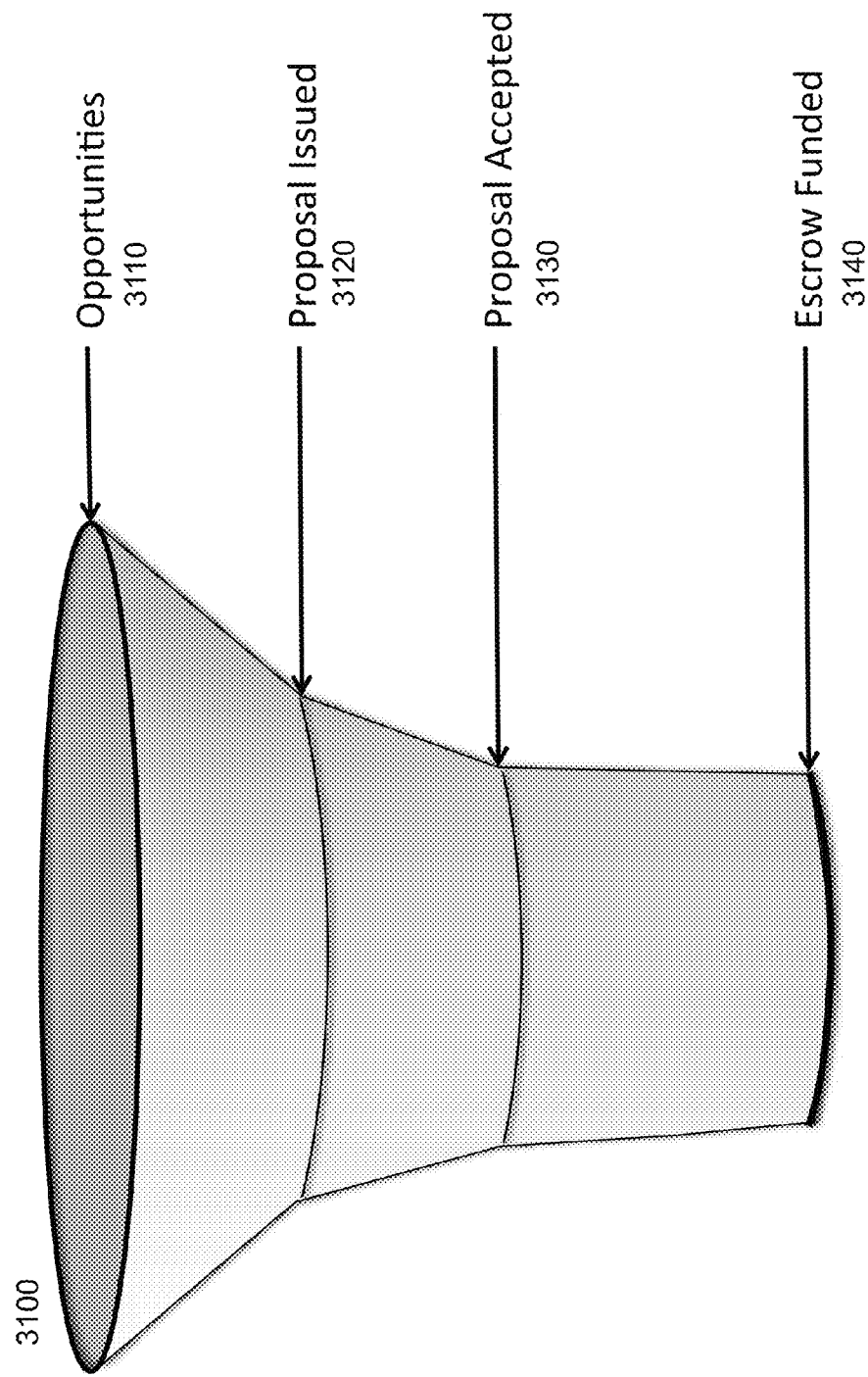
FIG. 31 illustrates the process of deal pipeline analysis.

Thus, in a preferred embodiment, the rate of deal flow is monitored via a sales pipeline analysis, as shown in FIG. 31, and compared to the deal arrival rate posited in simulations of future escrow behavior. In FIG. 31, the process from sales to escrow closing is portrayed as a funnel 3100, with a fraction of the deals in each stage progressing to the next.

The first stage, 3110 Opportunities, represents the broadest set of possible prospects for new escrows. A fraction of these move on to stage Proposal Issued 3120, where a proposal to qualify the escrow for the escrow pool is presented. A fraction of those are accepted in stage Proposal Accepted 3130. From this point there can still be some attrition, but the vast majority of accepted proposals do become funded escrows in stage Escrow Funded 2940. Since historically, the fractional reduction from stage 3110 to 3120, stage 3120 to 3130, etc., is known, it is possible to predict new cash inflows some period into the future.

For example, consider the case where the typical elapsed time from Proposal Issued 3120 to Proposal Accepted 3130 averages 10 days, with a 50% conversion rate, and the elapsed time from Proposal Accepted 3130 to Escrow Funded 3140 averages 30 days, with a conversion rate of 90% between the two stages. Then, a predictor of escrow arrivals in the pool is that 45% of escrows in Proposal Issued 3120 will be funded in an average of 40 days. Thus, compared to the lagging indicator of FIG. 30, the sales pipeline analysis of FIG. 31 provides a 40-day leading indicator of escrow pool arrivals.

The Portfolio Engine allows for optimal allocation for term matching of escrow liabilities and assets under management, or for passing investment criteria, such as maturity metrics including weighted average maturity, convexity, and maturity distribution profile, to portfolio emulation tools to construct desired portfolios. Therefore, as long as there are sufficient cash inflows, the portfolio can be adjusted for the revised anticipated cash flow rate.

The only case where assets need to be sold before maturity is when cash inflows are insufficient to offset unanticipated outflows so that the portfolio cannot be adjusted using just the new inflows. In that case, rebalancing requires the sale of some assets to purchase others of shorter duration. When interest rates are rising at the same time, it is possible that the MV/BV ratio may drop below 1.0, causing an accounting loss to participants in the escrow pool. Actual losses may be offset by gains in other periods by use of a crediting rate formula as described below. Provided the portfolio is managed with respect to assumptions about factors such as the deal arrival rate and with regard to macroeconomic indicators, careful monitoring gives early warning of deviations from expected values. Therefore, MV/BV variance can be minimized.

Figure 32:
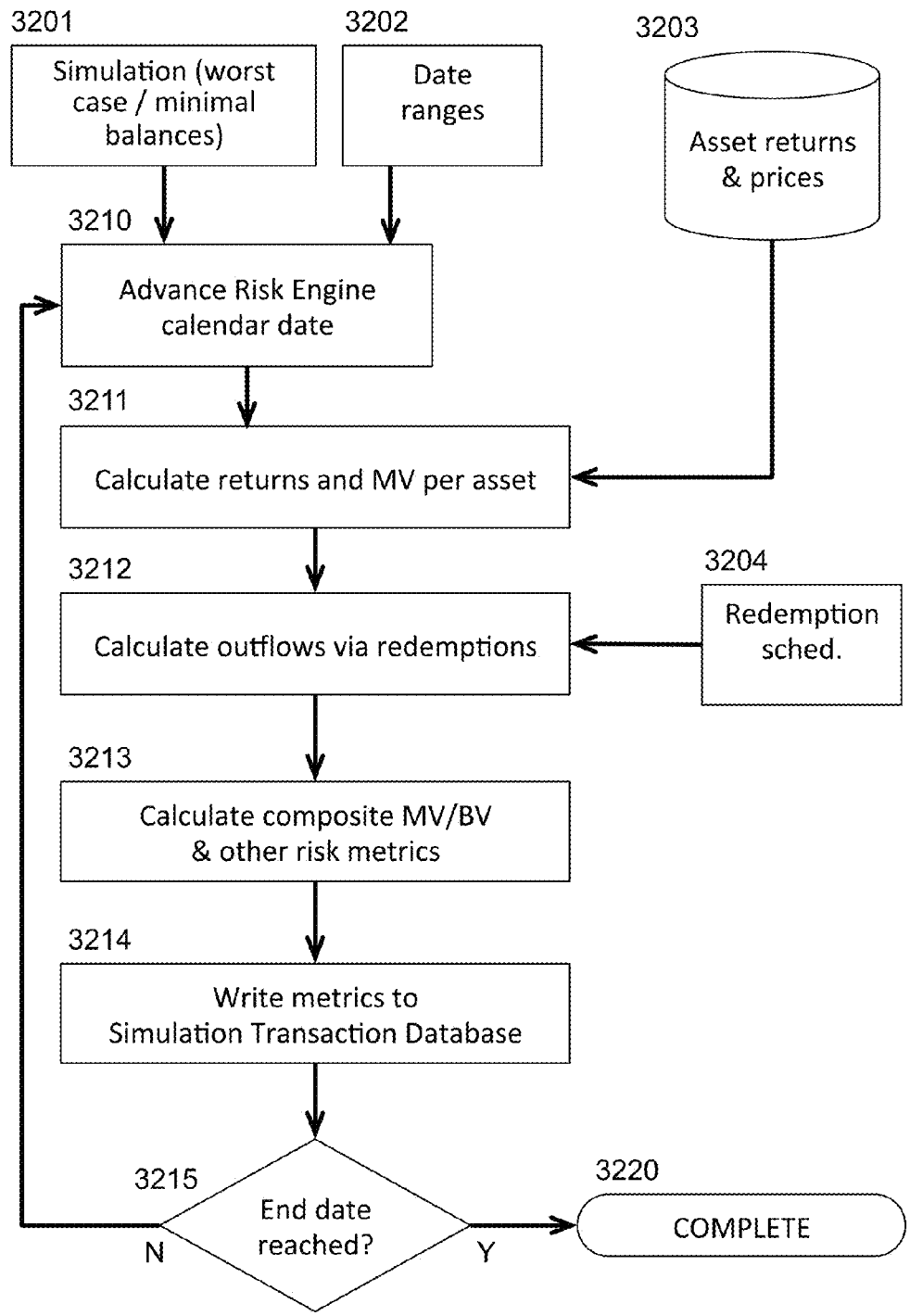
FIG. 32 provides a flowchart for calculating market value to book value risk based on a historical database of bond rates and prices, plus output from the Simulation Engine.

Sensitivity of asset selection to interest rates is modeled using the logic of Flowchart 3200 in FIG. 32. For a given simulation output 3201 and specific date ranges 3202, this flowchart uses an external historical database 3203 of asset returns and prices to calculate the MV/BV ratio on all dates of the simulation. This allows charting of MV/BV vs. time in a variety of interest rate scenarios, such as rapidly rising or rapidly falling, using actual historic data. In the case where the escrow pool is implemented as an investment vehicle from which redemptions may be made, another external input 3204 allows for inputting hypothetical rates of redemption as a schedule that may vary over time.

In step 3210, the Risk Engine advances its calendar date. In step 3211, using the external database of asset returns and prices 3203, the MV of each asset or asset class is calculated. In step 3212, the redemption schedule 3204 is used to simulate some fraction of the monies leaving the investment vehicle.

In Step 3213, the composite MV for the entire portfolio is calculated. Any additional desired metrics, such as portfolio convexity, are calculated in this step. If an investment vehicle holding the escrows uses a crediting rate formula, such calculation is also performed in this step. In Step 3214, the metric data is written to Simulation Transaction Database 130 of FIG. 1A, allowing later retrieval, analysis, and report writing. In Step 3215, the analysis is checked to see if the end date specified in date range 3202 has been reached. If so, the analysis completes in step 3220. Otherwise, the flow loops back to step 3210, advancing the calendar and continuing the analysis.

It will be appreciated that many variants on the above scheme are apparent to one of skill. For example, if MV/BV risk is mitigated in a rising interest rate environment by duration shortening, the following scheme is employed:
1. Calculate worst-case futures in accordance with Flowchart 600.
2. Add another input to 2403 of Flowchart 2400, specifying the additional fraction of funds to be placed in short-term investments as a function of the current MV/BV ratio.
3. Allocate the relative portions of funds to be placed in asset classes as specified in FIG. 25.

If portfolio emulation is used to create an approximate portfolio with, for example, fewer asset classes or different convexity, then the maturity distribution profile is used as input.

Any remaining risk may be mitigated by the use of contractual protection such as insurance or guarantees, similar to those utilized by stable value funds (SVFs) which emerged in the early 1990s, which focused on consumer deposits into retirement plans. The present invention uses the lexicon derived from the creation of SVFs. However, managing a pool of escrows differs significantly from dealing with retail depositors, and while the lexicon is similar, the risk factors are significantly different.

As discussed above, consumers may take money out of an investment product at any time (sometimes subject to penalties), leading to herd behavior at times of widespread financial changes in the markets. Escrow withdrawals, in contrast, are subject to contract, and therefore cannot be withdrawn at arbitrary times. On the other hand, escrow funds have specified expiration dates, whereas SVF deposits can be held indefinitely. This makes modeling the cash flow needs of a pool of escrows substantially different, and in many ways more complex.

Fluctuations in the MV/BV ratio can be smoothed out over time via the use of a crediting rate, similar to what is used in SVFs. The crediting rate allows amortization of investment gains and losses over an appropriate timeframe, typically the average duration of the portfolio, to provide time for the market value and the book value to converge. A typical crediting rate formula is:

$$CR = \left(\frac{MV}{BV}\right)^{\frac{1}{D}} \cdot (1+Y) - 1 \qquad (3)$$

Here, CR is the crediting rate, MV is the market value, BV is the book value, D is the duration of the portfolio, and Y is the annualized yield. It will be appreciated that there are many variations on this basic equation. For example, the duration D can be calculated for the entire portfolio, with the crediting rate calculated using this average duration. Alternatively, the crediting rate can be calculated individually for each asset duration 2510-2516 in FIG. 25, and then summed. Other crediting rate formulas may allow building a larger MV/BV buffer under a broader range of circumstances. For examples of other crediting rate formulas, see U.S. Pat. No. 8,170,944 (Kruk et al.), which is incorporated by reference herein.

A conservative crediting rate builds a buffer of cash in flat- or declining-interest rate environments, thereby providing reserves for when rates rise. Because the crediting rate formula causes MV and BV to converge in the long term, it is possible to utilize book value accounting when reporting to shareholders, provided an insurance policy is obtained to cover situations where the two values have not converged.

Flowchart 3200 is used iteratively, with different dates and redemption schedules as well as with different crediting rate formulas, to assess the risk of loss in both normally occurring and highly unlikely situations. This information is of substantial interest to third-party guarantors. In this manner, the Risk Engine is used to provide metrics of market risk to allow a guarantor to price insurance properly.

Insurance or guaranty risk is further mitigated by understanding the sensitivities of the escrow pool to varying parameters of the escrow pool. Some sensitivities are computed by extracting latent parameters of a simulation set, while others require explicit changes to the parameters over the course of many simulations.

Figure 33:
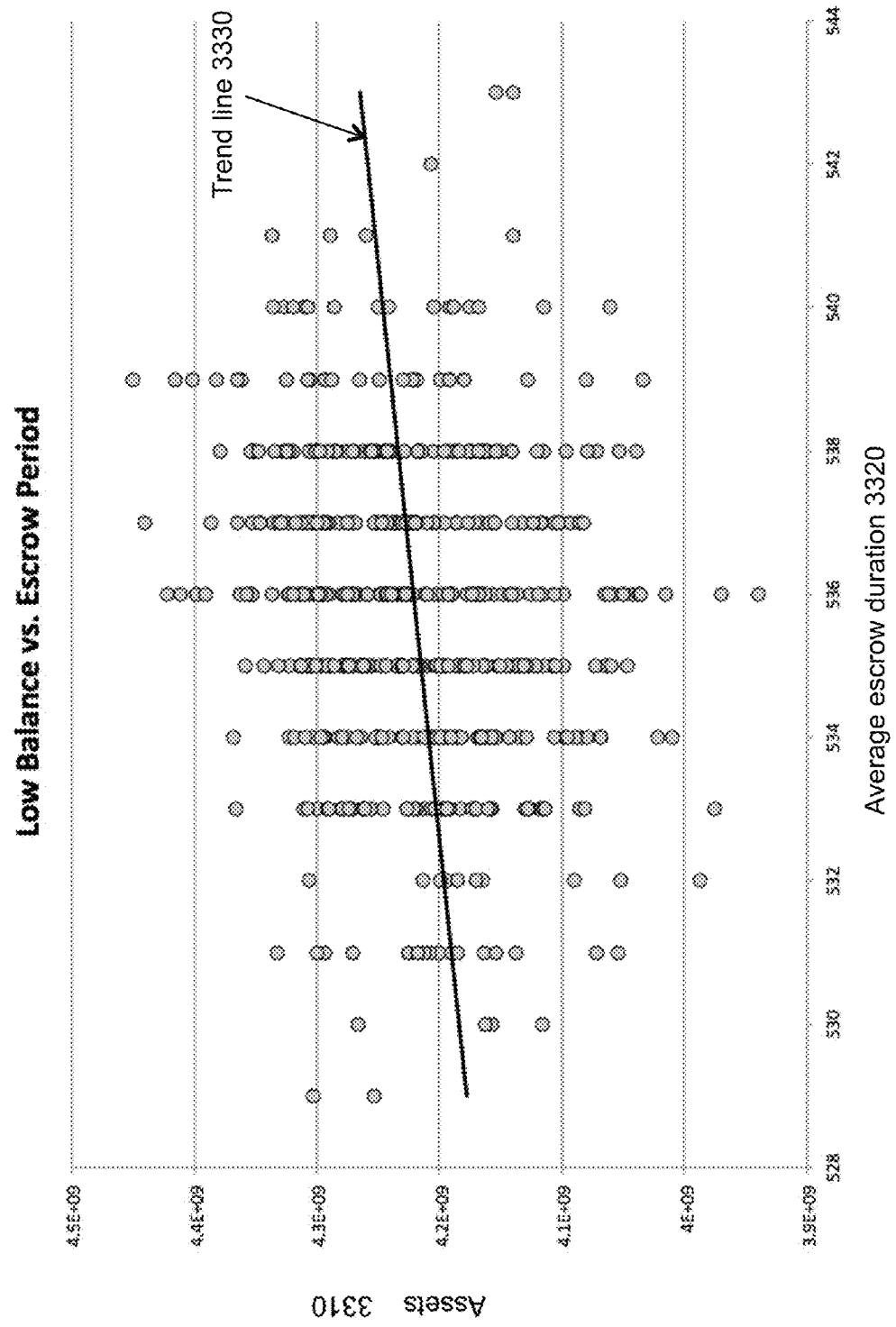
FIG. 33 shows a sensitivity analysis of escrow pool size vs. average escrow duration.

As an example of latent parameter extraction, one can illustrate determining how escrow length (duration) affects the size of the escrow pool. This partial derivative cannot be evaluated symbolically, but it can be estimated via Monte Carlo simulation. Each escrow in a simulation set has a different average escrow length, because those lengths are selected randomly from historical data in Escrow History Database 140. FIG. 33 shows one such scatter plot and linear trend line. Vertical axis 3310 is the maximum low balance reached during the simulation, and horizontal axis 3320 is the average escrow duration in a simulation. The trend line 3330 is computed for all the data points. Additional statistics, such as the adjusted $R^2$ fit of the line, are also computed. This models sensitivity of asset selection to escrow duration.

Over time, since new escrows are added to the database of escrow transactions used for simulation, the escrow length will naturally extend or contract with changes in the makeup of the pool. But analyses such as the above, from the Risk Engine toolkit, provide a means of understanding the sensitivities to take more immediate action in response to potential insurance or guaranty risks.

The other form of sensitivity analysis requires running simulations with an explicit parameter change between each simulation. An example of this is determining the sensitivity of the escrow balance to the deal arrival rate. Various values of the deal arrival rate are used as the basis for simulation sets derived via Flowchart 1100. Then a linear fit of, for example, maximum low balance vs. the deal flow rate generates a partial derivative:

$$\frac{\partial B}{\partial D} \quad (4)$$

Here, B is the maximum low balance, and D is the deal arrival rate. Such partial derivatives are required as inputs to well-known linear and non-linear numerical optimization techniques such as Newton-Raphson and Levenberg-Marquardt (described in "Numerical Recipes in C: The Art of Scientific Computing, 2nd Edition." William H. Press, Brian P. Flannery, Saul A. Teukolsky, William T. Vetterling, 1993).

From a risk management perspective, it is generally the low balance of a simulation set that is of importance to an insurer or guarantor, as it represents the highest level of MV/BV risk. Running sensitivity analysis on factors influenced by deal flow rate also allows determining the minimum level of deal flow required to have reasonable certainty that cash inflows alone (rather selling assets) are adequate for portfolio duration adjustments.

The Risk Engine's toolkits allow an insurer or guarantor to explore a variety of contingent scenarios to determine the terms of providing contractual protection against risk of loss on the pool's assets. Major forms of risk that can be modeled include:

1. Term mismatch risk (a form of MV/BV risk, as described above). If assets are held to term, then this risk is minimal, but unexpected outflows can lead to a mismatch and potentially principal loss.
2. Escrow pool inflow risk (as described above). If inflows drop below certain levels, inflows are no longer adequate for the task of portfolio rebalancing. This critical inflow level is a function of existing escrow size and the escrow pool's composition.
3. Opportunity risk. While term matching of assets and liabilities removes most of the MV/BV risk, because assets are not sold before maturity, it introduces other risks. In particular, if asset durations are long but interest rates are rising, the performance of the escrow pool could lag short-term financial products, such as money markets, in performance. Large differences in performance could cause escrow account holders to not place money into the escrow pool, instead choosing shorter-term investments. Simulations using the Risk Engine 102 provide a means to explore the trade offs and select a position on the risk curve.

Risks that must be modeled by means other than the Risk Engine 102 include:

1. Credit risk. The risk of default for various asset classes is well understood and is modeled adequately by existing tools.
2. Modeling risk. This is a meta-risk that the modeling provided by the Simulation Engine 104, Portfolio Engine 103, and Risk Engine 102 is inadequate or inaccurate in some way.

Excluding the above two risks, the Risk Engine 102 provides new and useful tools to help a third party determine the risks in managing a pool of escrows and to determine the terms of contractual protection appropriately. The Risk Engine provides a number of metrics useful for reducing risk when managing a pool of escrows: a measure of market risk (MV/BV risk) for a variety of interest rate environments; and, sensitivities (in the form of partial derivatives) that allow minimizing other forms of risk using established numerical optimization techniques.

Using these tools, contractual terms providing, for example, for a guarantee against loss on principal amounts of all escrows, may be provided. This makes an escrow in the pool especially attractive, since it has both a higher projected return than the alternatives and a guarantee of principal that in many instances may be mandatory to allow investment of escrows in a pool such as that contemplated by the present invention.

For an asset manager, the Risk Engine 102 has utility because it translates mandates from an insurance provider or guarantor into actionable criteria for making investments. If the contractual protection is explicitly covering one-in-a-million events as determined by the system and method described above, for example, the asset manager can manage to that specification.

For an insurance provider or guarantor, the Risk Engine 102 provides a means of accurately assessing risk in a given escrow pool management strategy, allowing for accurate determination of the terms of providing the contemplated contractual protections against loss.

Illustrative Example

An example is now described to illustrate how an asset manager uses the investment criteria provided by one preferred embodiment of the present invention to select a set of investment assets to maximize return while meeting the outflow needs of the escrow pool contained within the investment vehicle. The generated investment criteria may be used on a daily basis, used whenever interest rates change significantly, employed whenever a new escrow is added to the pool, or used on a periodic basis, such as every 30 days, to deploy new cash inflows.

Many of these use cases do not lend themselves easily to illustration. In order to simplify the example and to make the changes in the escrow pool's makeup more apparent, the following simplifying assumptions and portfolio management strategies are employed (for ease of illustration only):

1. Assets classes are term-matched (laddered) to meet aggregate escrow outflow behavior, rather than using a bullet or barbell strategy. A total of three asset classes are used to quantize the maturity distribution profile. Each of these "buckets" comprises 30% of the portfolio. The remaining 10% of the assets are invested in cash or short-term cash equivalents, to meet short-term escrow obligations (such as small claims and working capital adjustments), in accordance with the cash outflow histogram in FIG. 20. This strategy can result in a degree of immunity to interest rate changes (see Portfolio Design and the Goal of Immunization. Gloria M. Soto and M. Asunción Prats, 2003).
2. To make it easier to illustrate changes in the escrow pool's change in size, this example uses the assumption that escrow composition is changed every 100 days. In reality, the escrow's asset composition might be changed every month, every week, or even with each new escrow added to the pool.
3. To make it easier to see the changes, all simulations performed assume this escrow pool's deals per day rate slows from one deal per day (at the current simulation's time) to zero deals per day over the course of 500 days. This is similar to the deal arrival rate in FIG. 4B, but with point 460 occurring at day 0 and point 470 occurring at day 500.
4. The percentage each asset class contributes to the total asset mix remains fixed, and the specific assets in the class are altered to make each asset class's weighted average maturity (WAM) match the target amount. Assets may be purchased (or sold if need be) to alter the WAM for the class. Assets need not be new issues, and may be purchased with arbitrary tenor.
5. In order to simplify the example, it is assumed that all assets are in cash before day 300, and for this example, one re-allocation of the portfolio is done at day 400. It will be understood that, in practice, assets would be allocated on a more frequent basis (for example, every 5 or 10 days).
6. A conservative portfolio management style is used. Even though there is a rightward tail of assets extending further out because of future claims behavior anticipated in the aggregate via simulation, this money is not allocated for investment, but rather set aside as a "cushion" to mitigate some of the MV/BV risk that might occur.

Figure 34:
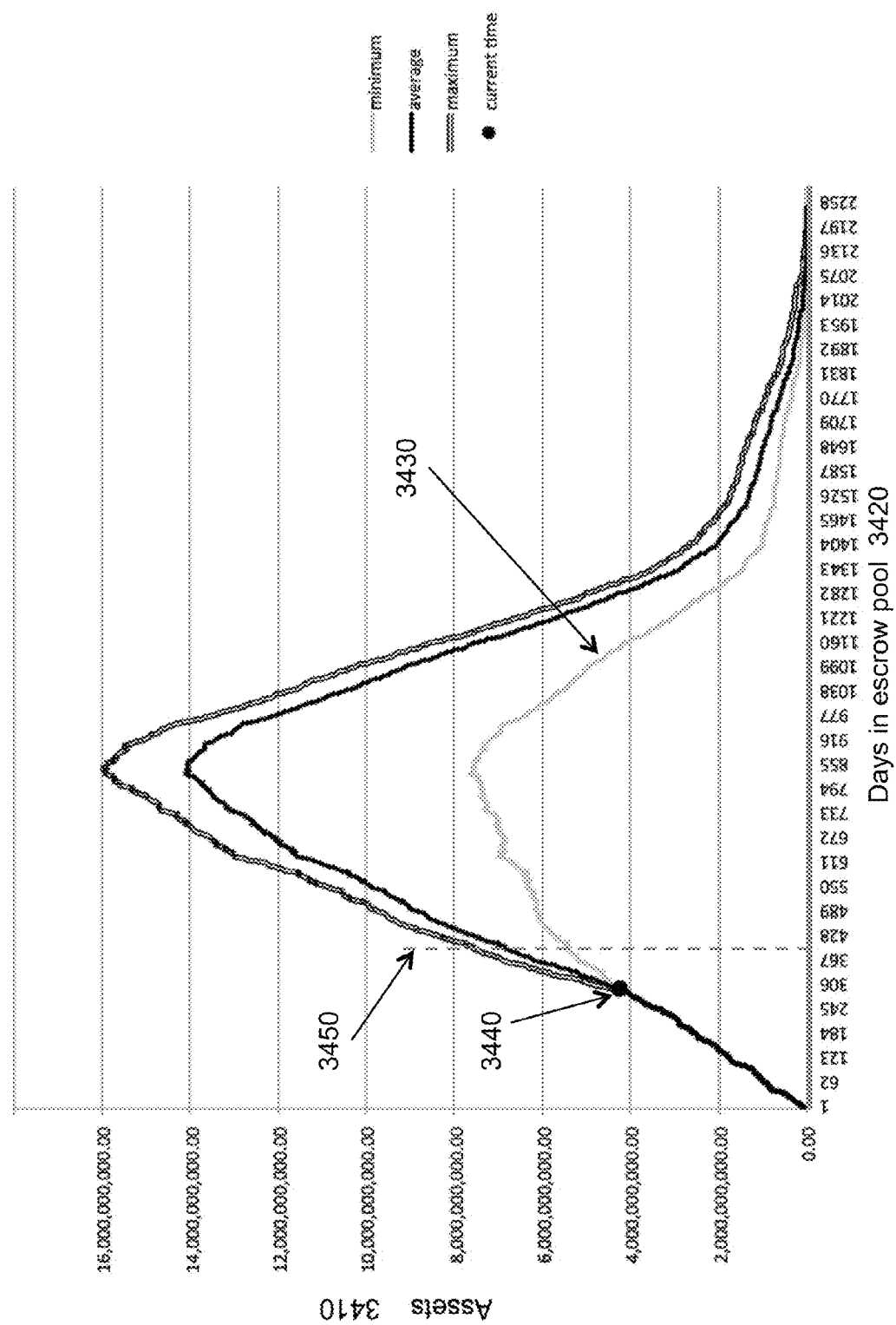
FIG. 34 illustrates a simulation forward from a given point in time for a specific escrow pool.

FIG. 34 illustrates a pool of escrows where the current value is $4.2 B at day 300, indicated by point 3440. In order to perform the initial allocation of assets using a preferred embodiment of the present invention, the Simulation Engine 104 of FIG. 1A is first used to provide bounds on the best case and worst case behavior of a portfolio of escrows, under the assumptions that future escrows deposited into the pool will resemble past escrows in size and term. That is, the historical transactions in Escrow History Database 140 of FIG. 1A resemble the current transactions in Escrow Pool Database 160.

Figure 11:
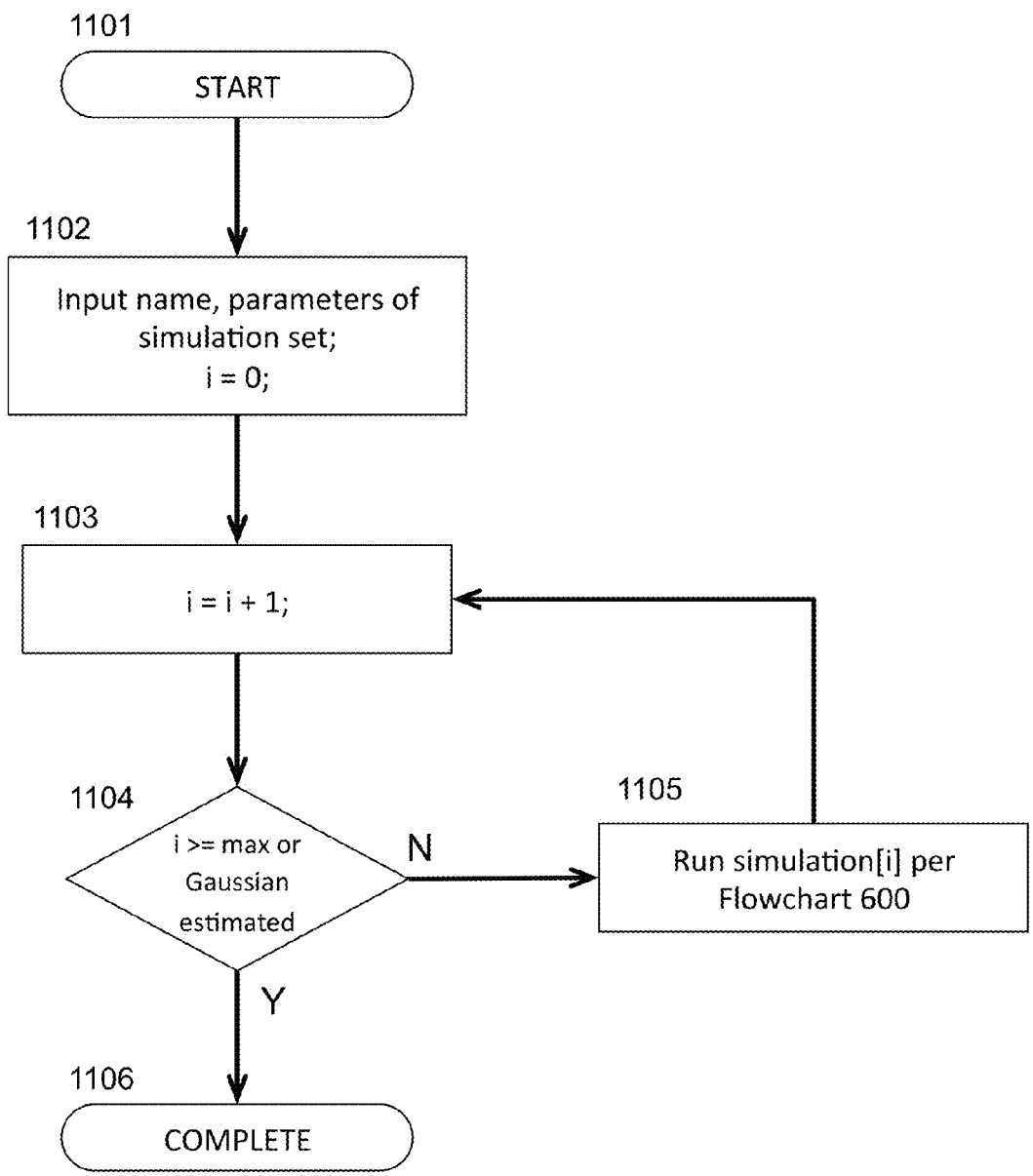
FIG. 11 depicts a flowchart for performing a set of related simulations.

The Simulation Engine performs a set of simulations in accordance with the Flowchart 1100 of FIG. 11, which in turn repeatedly runs the logic of Flowchart 600 of FIG. 6 until such time as accurate probability distributions are obtained. Here, the example assumes that the sales pipeline, as summarized in FIG. 31, is still predicting 1 deal per day on average. To be more conservative, the simulation decreases the deal rate from one deal per day to zero over the course of 500 days. Additionally, any pending claims on escrows are factored into the simulations in accordance with step 603 of Flowchart 600.

Figure 25:
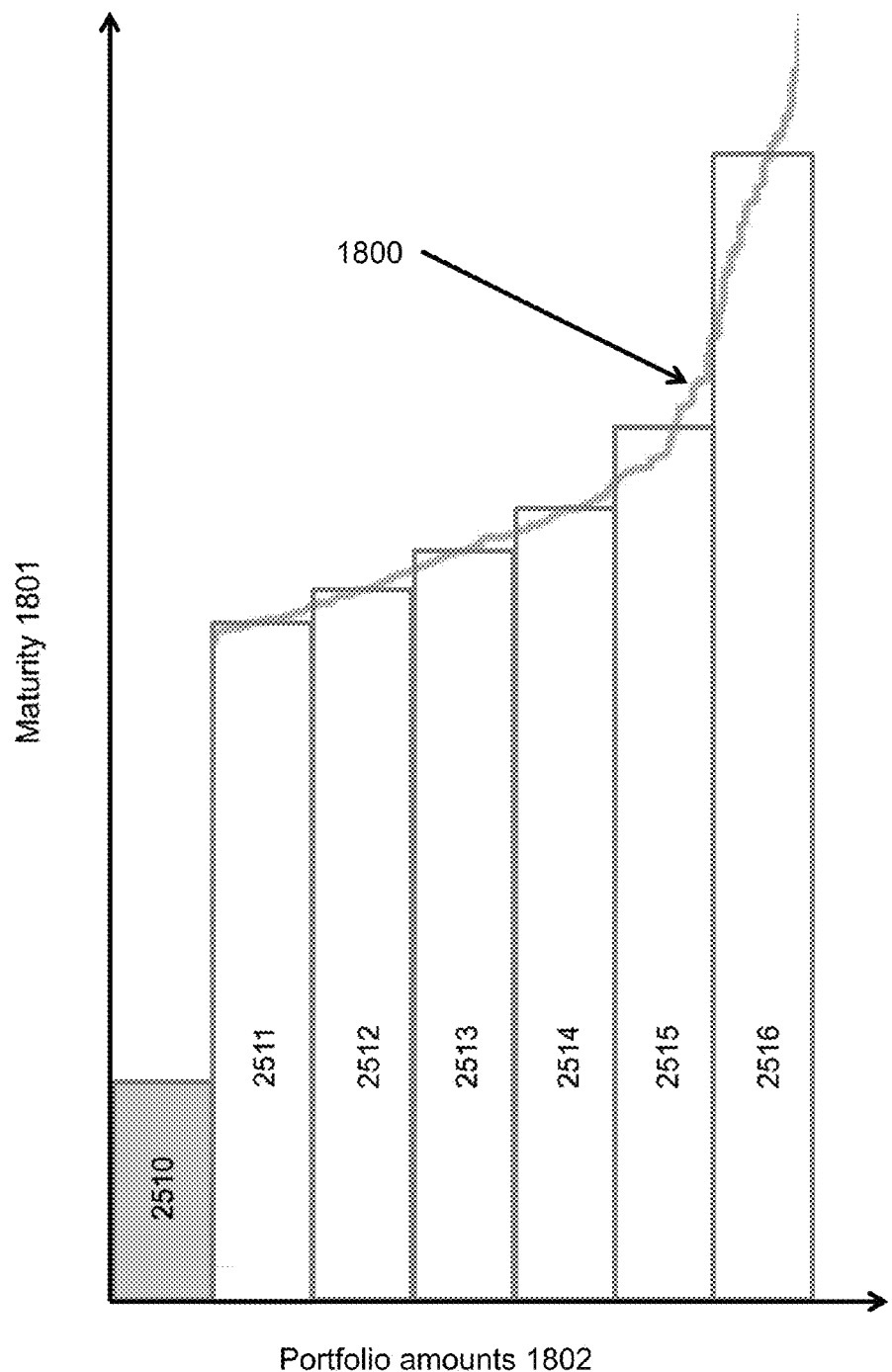
FIG. 25 depicts an allocation of asset maturities to match a maturity distribution profile taking into account short-term cash needs.

Next, the Portfolio Engine 103 of FIG. 1A is used to specify the allocation of assets into asset classes, as shown in FIG. 25. Ten percent of the assets will go in cash (shaded area 2510), as stated in this example's assumptions. The remaining assets in this example will go into three buckets (Note that FIG. 25 provides six buckets 2511-2516, but for simplicity this example uses three buckets). The three buckets are shown overlaid on the simulation output in FIG. 35 as boxes 3550, 3551, and 3552. While each of these boxes covers one third of the maturity distribution profile (MDP), each is reduced to 30% of the MDP so as to accommodate the requirement that 10% of the portfolio to be kept in cash.

Note that box 3550 does not partially overlap the MDP, like boxes 3551 and 3552 do. As per assumption #6 of the example assumptions, the monies of the rightward tail of the simulations are held in reserved for offsetting potential future MV/BV losses. If the monies in 3550 were invested to more closely align with the MDP, the WAM would be closer to 1600 days.

Thus, for the $4.2 B in the escrow pool at day 300, the investment criteria specifying the allocation of assets is as follows:

1. $420M (10%) in cash or near-cash
2. $1.26 B (30%) in a set of assets with a WAM of 1060 days
3. $1.26M (30%) in a set of assets with a WAM of 990 days
4. $1.26M (30%) in a set of assets with a WAM of 900 days Each of these asset classes is managed by purchasing a variety of assets with tenors near the asset class's WAM. Some variation of the tenor of assets around the target WAM allow for future adjustment by varying the exact mix of the assets.

The Risk Engine 102 is used to compare the performance of this portfolio in various interest rate environments and with various outflows. Using Flowchart 3200 of FIG. 32, a range of possible MV/BV values, accumulated cushion from the crediting rate, and other metrics are calculated. Flowchart 3200 may be used repeatedly with variations:

1. Asset types can be changed to see, for example, the effects of switching between government-backed or corporate debt instruments in different interest rate environments.
2. Redemption rates can be altered to see if adequate cushion exists in the accumulated crediting rate.

If an investment vehicle managing the escrow pool has a stated investment strategy, the Risk Engine 102 provides, among other risk metrics, a measure of the worst losses under scenarios that an insurance company or guarantor may use to determine the terms of contractual protection against loss for the pool. In fact, the Risk Engine 102 provides both:

1. A means for a third party to determine risk exposure of providing contractual protection for a given investment strategy; and
2. A means for an investment vehicle to invest in a manner consistent with such third party's specification of risk. For example, "Invest in a manner that has a 95% or greater probability of limiting notional losses to 1% of total value using the specified model."

In this example, a third party providing contractual protection against risk of loss using the Risk Engine sets the price at 25 basis points per year for insurance or similar protection guaranteeing payment of all principal; the rationale for this pricing is based on the following logic:

1. The third party has a comfort level with a one-in-a-million risk based on its assessment of the types of escrows, macroeconomic climate, or any other number of factors. This reasoning process occurs independently of the present invention.

2. Given the above comfort level, the third party runs a simulation set using the logic of Flowchart 1100 of FIG. 11 (which in turn repeated calls Flowchart 600 of FIG. 6), to get the minimum escrow pool profile and maturity distribution profile.

3. With the MDP, the third party then runs the Risk Engine using Flowchart 3200 of FIG. 32, repeating the analysis with a variety of interest rate and runoff scenarios; in those analyses, maximum losses were 1%

4. The third party is willing to risk four years of premiums, but no more. Therefore, the 1% loss divided by four years is 25 basis points.

In this example, the fund managers decide to purchase contractual protection at this price, and agree to manage the fund by always investing assets using a maturity distribution profile corresponding to the million simulation worst case level.

Dotted line 3450 of FIG. 34 shows the 400 day mark, which will be the next time the portfolio is re-allocated, including investing new cash inflows. The simulations show a range of possible values for the portfolio at the expected deal rate, ranging from $5.4 B to $7.7 B with an average predicted value of $6.6 B.

Figure 36:
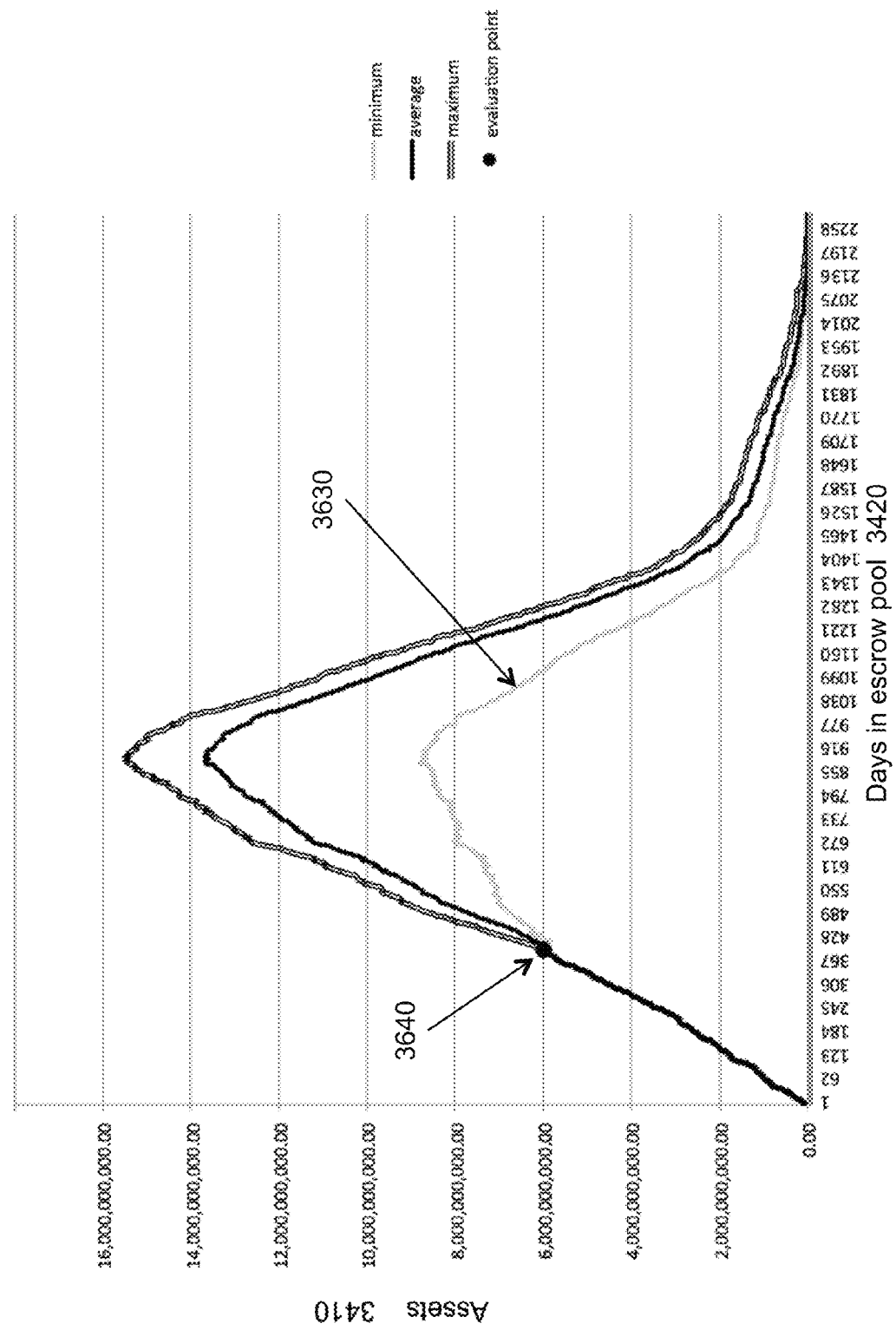
FIG. 36 shows a simulation forward from another point in time for the escrow pool of FIG. 34.

As this example continues, one finds that in actuality at day 400 the investment vehicle hits the $6 B mark, due to additional inflows. This is shown in FIG. 36 at point 3640. It is below the average simulated value of $6.6 B, so one would intuitively expect the average maturity of the portfolio as a whole would be shortened at this point. As a reality check, the $6 B value is well within the bounds of the simulation and therefore consistent with the assumptions that were made at day 300 regarding the portfolio.

Once again, the Simulation Engine is used to predict the minimum pool values (curve 3630 in FIG. 36), as well as an average and a maximum. From day 400, the simulation again decreases the deal rate from one deal per day to zero over the course of 500 days, to simulate a gradual tailing off of new investments, followed by managing the investment vehicle to the last dollar.

Since no new investments were purchased, at this point the investment vehicle has $2.22 B in cash (the $420M of cash as previously allocated, plus new inflows of $1.8 B).

Figure 37:
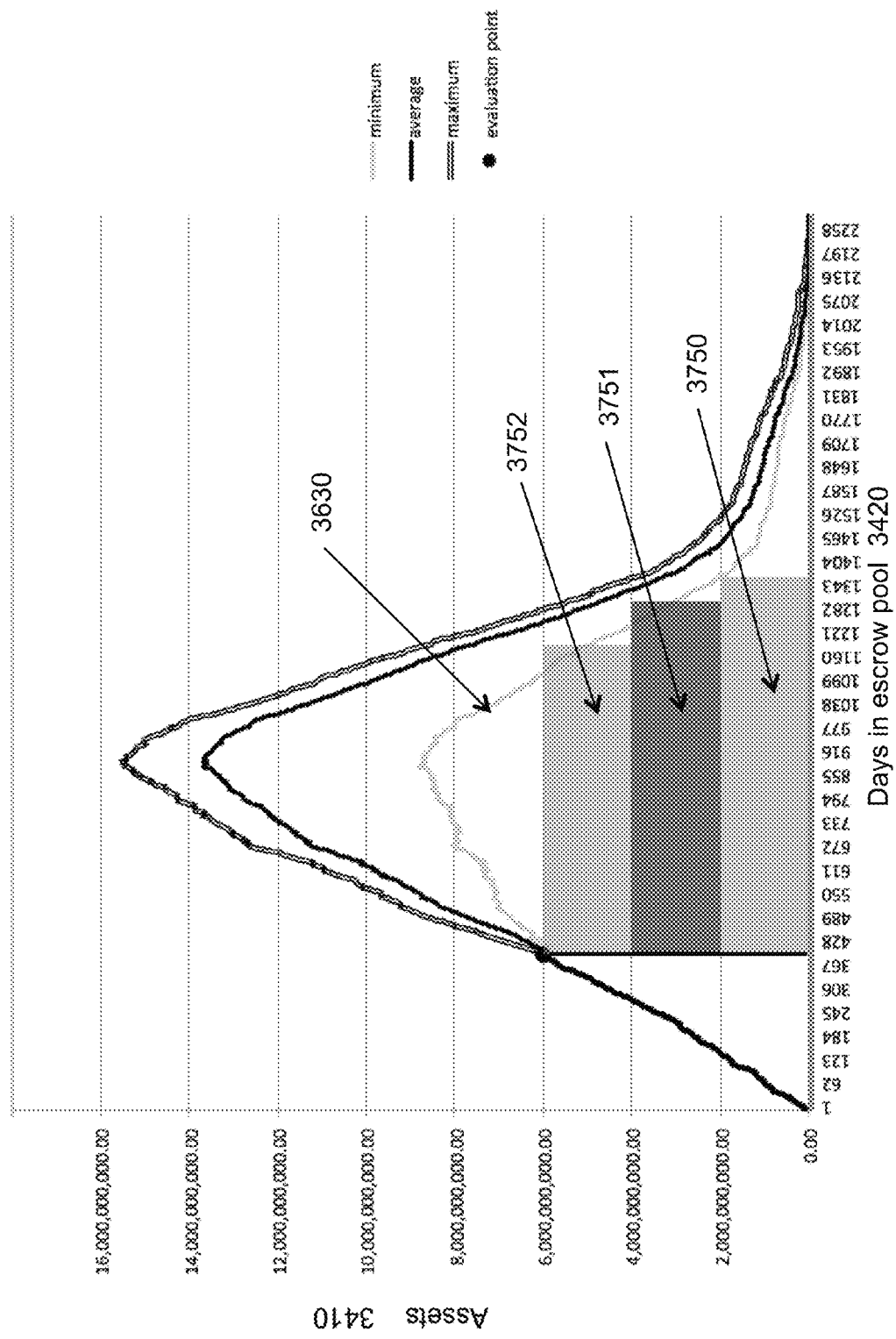
FIG. 37 illustrates an allocation of assets into three asset classes for the simulation of FIG. 36.

The Portfolio Engine is next used to calculate new values for the asset classes, shown in FIG. 37 as boxes 3750, 3751, and 3752, plus the 10% cash reserves. The investment criteria specifying the new values for the asset classes are:
1. $600M (10%) in cash or near-cash
2. $1.8 B (30%) in a set of assets with a WAM of 1050 days
3. $1.8M (30%) in a set of assets with a WAM of 990 days
4. $1.8M (30%) in a set of assets with a WAM of 880 days To re-allocate the assets in the portfolio, a subtraction of the asset classes, similar to FIG. 28, is performed, but on cash plus three asset classes. The net plan is:
1. Cash is reduced from $2.22 B to $600M
2. The asset class of box 3550 of FIG. 35 now has a WAM of approximately 960 days, due to aging of the assets over the last 100 days. Therefore, the $1.26 B in box 3550 is re-allocated to box 3751 of FIG. 37, and an additional $540M in assets are purchased, with tenors exceeding 990 days, such that the WAM of the asset class is 990 days and the total invested assets are $1.8 B.
3. The asset class of box 3551 of FIG. 35 now has a WAM of approximately 890 days. Therefore, the $1.26 B in box 3551 is re-allocated to box 3752, and an additional $540M in assets are purchased with tenors slightly less than 880 days, so as to bring the WAM to 880 days and the value to $1.8 B.
4. The asset class of box 3552 of FIG. 35 now has a WAM of approximately 800 days, but the remaining desired asset class has a target WAM of 1050 days. Courses of action can include:
   a. Buy an additional $540M of assets with a tenor slightly longer than 1050 days. If the length to maturity is too long, it would run the risk of the pool not being term-matched to the underlying outflows.
   b. Hold the remaining 800-day WAM assets to maturity and then buy new assets as per the re-allocation applicable at that time.
   c. Sell the 800-day WAM assets and buy new assets of $1.8 B with a WAM of 1050 days.

The selection of choice 4a, 4b, or 4c depends on the asset manager's assessment of the stability of cash inflows into the investment vehicle, views of macro-economic forces affecting interest rates, and so forth. In any event, the portfolio's average maturity is shortened, consistent with the intuitive view of what should happen.

It will be readily apparent to one skilled in the art that a portfolio re-evaluation period of 100 days sets unnecessarily large amounts of cash aside for long periods of time. Additionally, as can be seen in step 4 above, the change in asset tenor is too great between evaluations. More frequent re-evaluation and re-allocation, coupled with a larger number of asset class buckets, fixes these problems. This is the intended use of preferred embodiments of the present invention, but an example with such fine-grained control would be too lengthy for illustrative purposes here.

Additionally, were a shorter re-evaluation period carried out from the beginning of the portfolio formation, rather than at day 300 with assets of $4.2 B, the assets in the different asset classes would be substantially staggered in their maturity dates, leading to the ability to move them between asset classes to more closely approximate the desired WAM than in the example above.

With the ideal re-evaluation period, assets in one asset class simply cascade to become the assets of the next shorter asset class, owing to their decreased tenor. But the principal remains the same: new cash is used to buy assets to rebalance the portfolio so that the assets remain matched to the aggregate liabilities of the pool, such that runoff scenarios do not lead to undue MV/BV mismatches or other such risks.

Figure 35:
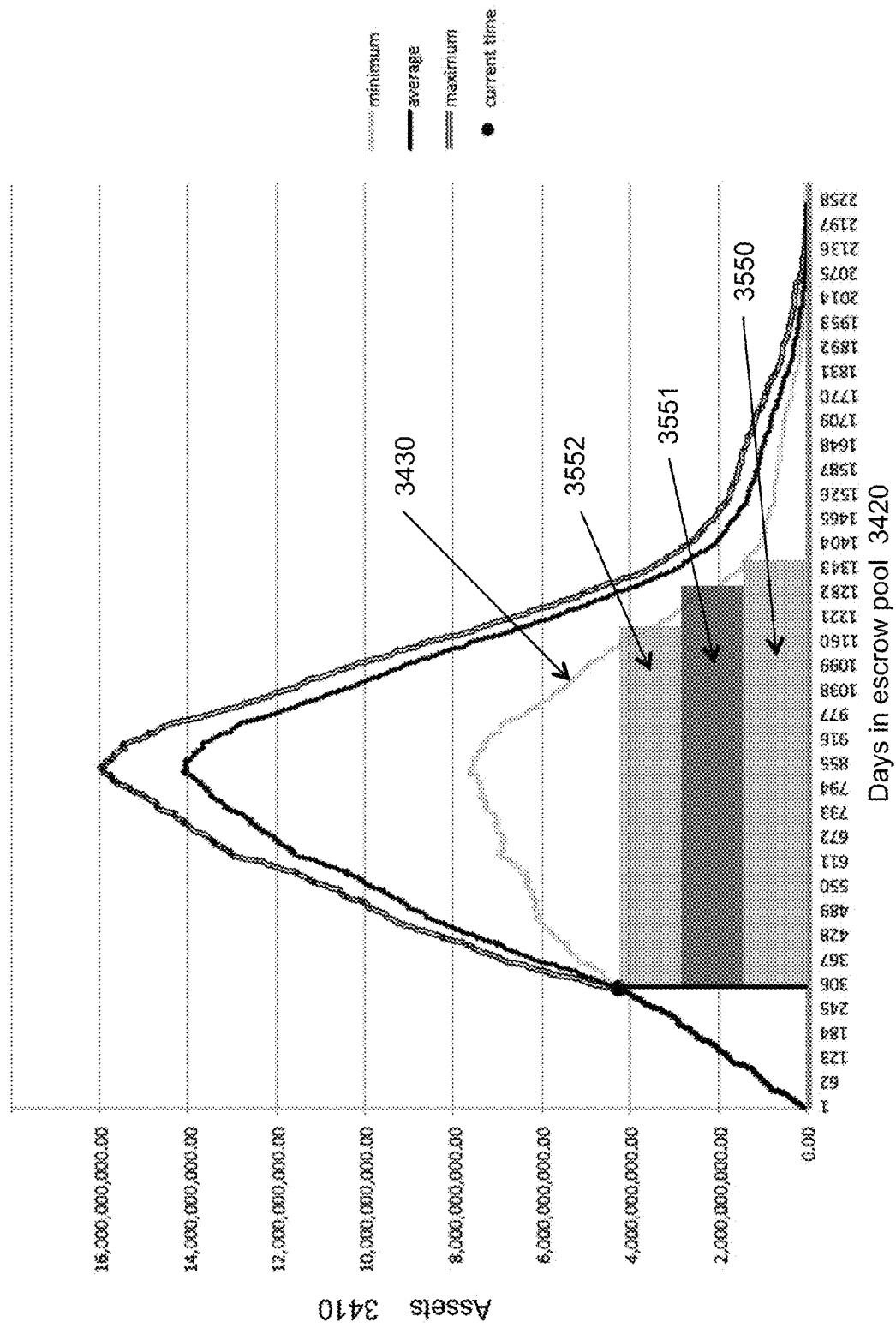
FIG. 35 illustrates an allocation of assets into three asset classes for the simulation of FIG. 34.

This example's assumption of a 500 day period for deal flow to taper to zero might be unrealistic in a great many situations, but again was chosen here for illustrative purposes, so that marked differences could be seen between FIGS. 34-35 and their counterparts, FIGS. 36-37 at 100 days later.

Finally, just because the asset allocation model allows for asset classes with WAMs in excess of 1000 days, it does not necessarily require the purchase of assets with such maturities. For example, in a rising interest rate environment, an asset manager may wish to be no further out on the yield curve than 12 or 18 months, to reduce MV/BV risk.

The above example was necessarily simple, involving two portfolio allocation dates that were sufficiently far apart to allow the illustrations of FIG. 34 through FIG. 37 to be sufficiently different visually to illustrate the use of the Simulation Engine, Portfolio Engine, and Risk Engine 102.

It should be clear to practitioners in the art that variation of the numbers of asset classes, re-evaluation periods, criteria on which to trigger re-allocation (e.g., by days, by change in portfolio value, per escrow, etc.) and the like are required to optimize portfolio performance. Such fine-tuning of the parameters of the disclosed systems and methods is to be expected and would be well-understood to an artisan.

Alternative Embodiments

The embodiment of the present invention as shown in FIG. 1A utilizes an Escrow History Database 140 that contains the raw data elements concerning a set of Completed Escrows 150. That is, the data for each cash inflow and outflow is stored. Additionally, information on claims, including initial claim amount, claim subject matter, claim resolution time, and claim resolution method, may be stored.

Consistent with this data, Flowchart 600 of FIG. 6 provides a method of selecting from the Escrow History Database 140 a random choice of escrow, with the cash flow transactions being added to the Simulation Database to be part of the escrow simulation.

Figure 1B:
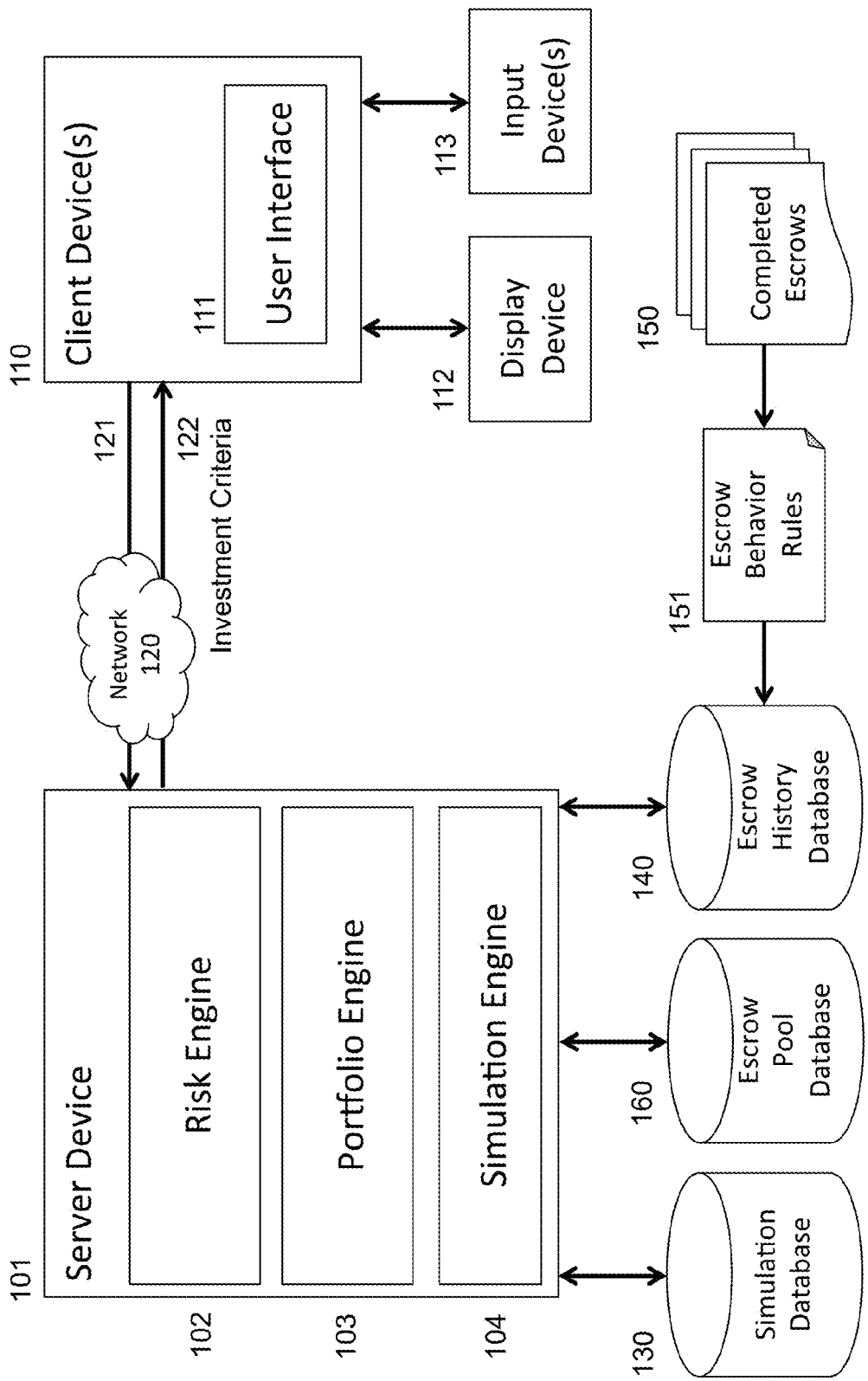
FIG. 1B shows a second preferred embodiment of a system in accordance with the present invention.

Alternative embodiments exist to this scheme. FIG. 1B depicts one alternative embodiment in which information about the completed escrows 150 is distilled into a set of Escrow Behavior Rules 151, which is stored in the Escrow History Database 140. Aside from this alteration, FIG. 1A and FIG. 1B are the same.

Figure 39:
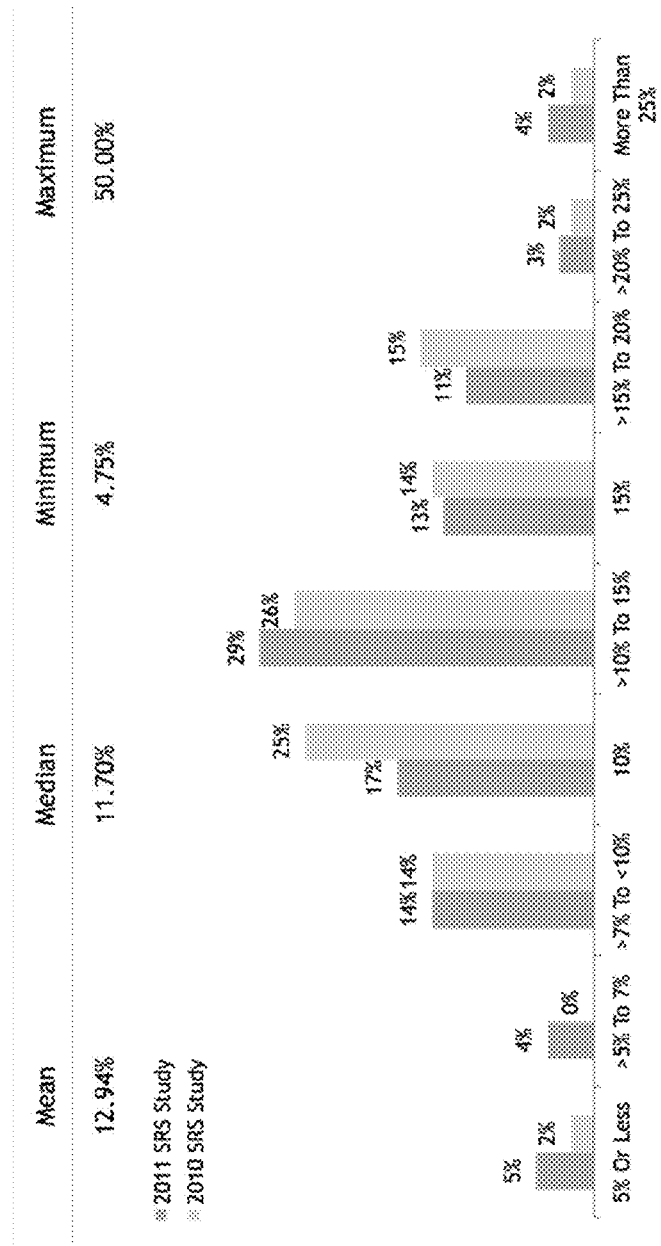
FIG. 39 presents data on escrow sizes as a function of the M&A transaction value.
Figure 40:
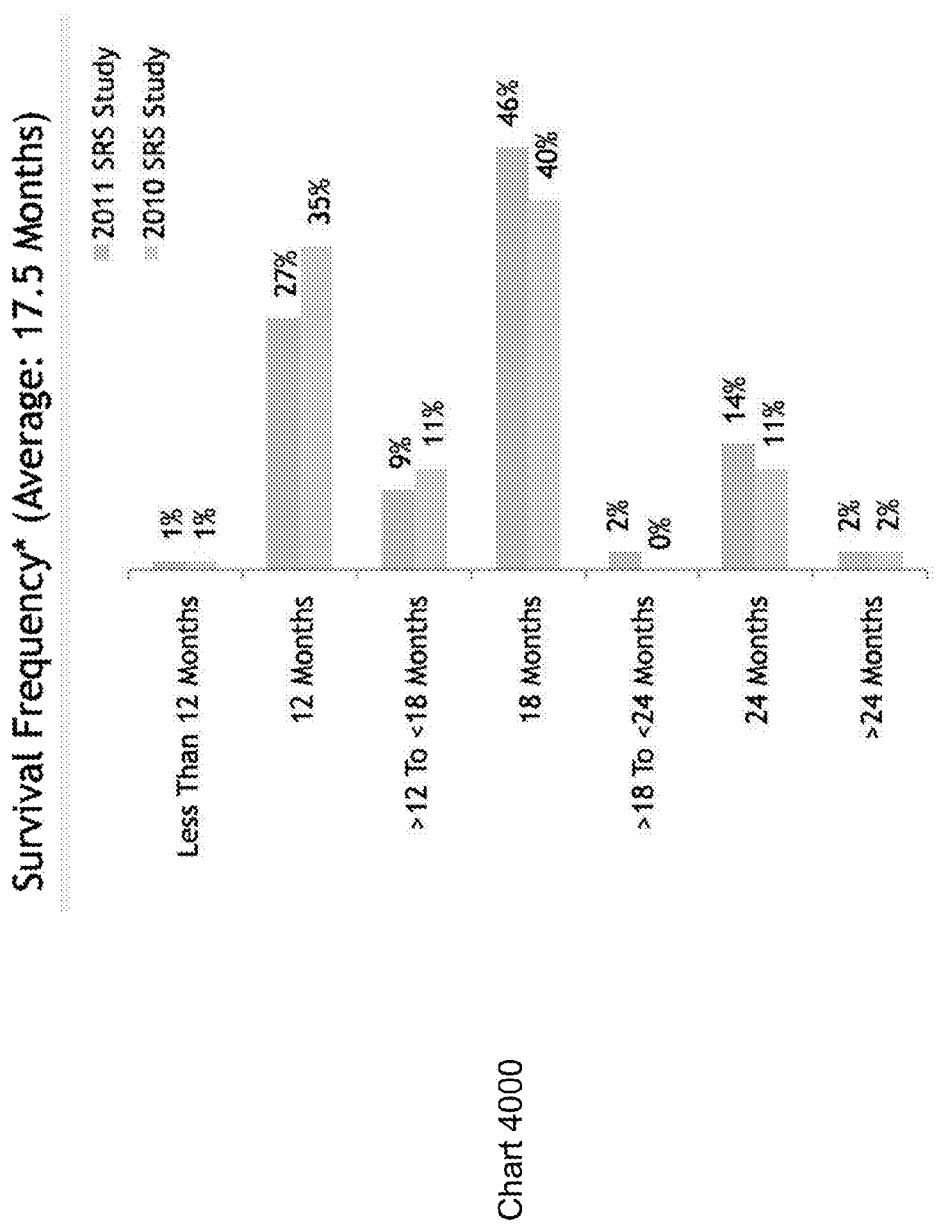
FIG. 40 presents data on escrow duration frequencies.

The Escrow Behavior Rules 151 are derived from the detailed escrow behaviors, summarized across a number of escrows. FIG. 39 and FIG. 40 present examples of such summary data. Chart 3900 of FIG. 39 shows the size of an escrow as a percentage of the M&A transaction value. As can be seen, the distribution of values has a mean value of approximately 13%. FIG. 40 provides the escrow duration (shown as the survival frequency) as a histogram broken out by year. This is a multimodal distribution, with peaks at 12, 18, and 24 months.

Figure 38:
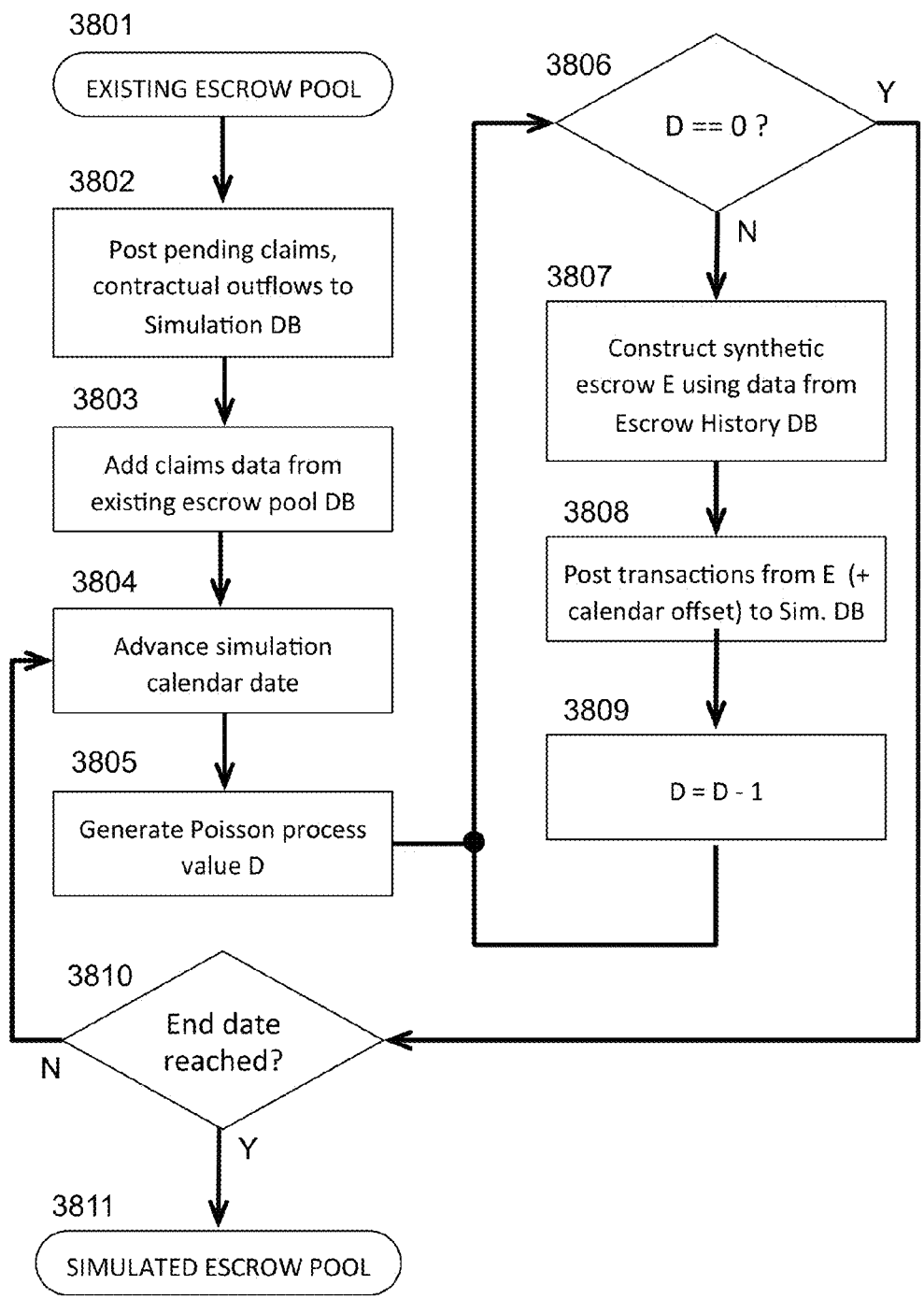
FIG. 38 shows a modification of Flowchart 600 of FIG. 6, allowing the construction of simulated escrow behavior using synthetic escrows.

Using this summary data, tasks such as simulation may now be carried out using synthetic escrows (ones constructed with properties chosen such that large numbers of synthetic escrows would have the same distributions over salient features as would actual historic escrows). FIG. 38 illustrates this process for a single Monte Carlo simulation. Flowchart 3800 is identical to Flowchart 600 of FIG. 6, with the exception of step 607 (mapped to step 3807 in Flowchart 3800). In step 607, an escrow E is chosen from a set of historic escrows, and its actual transactions are posted to the simulation database in step 608. In step 3807, the escrow is generated from the data in the database, but does not follow a pre-defined set of escrows. Instead, each parameter of the escrow is chosen randomly, but with the distribution of the parameters matching the summary data distilled from the behavior of historic escrows.

Figure 1C:
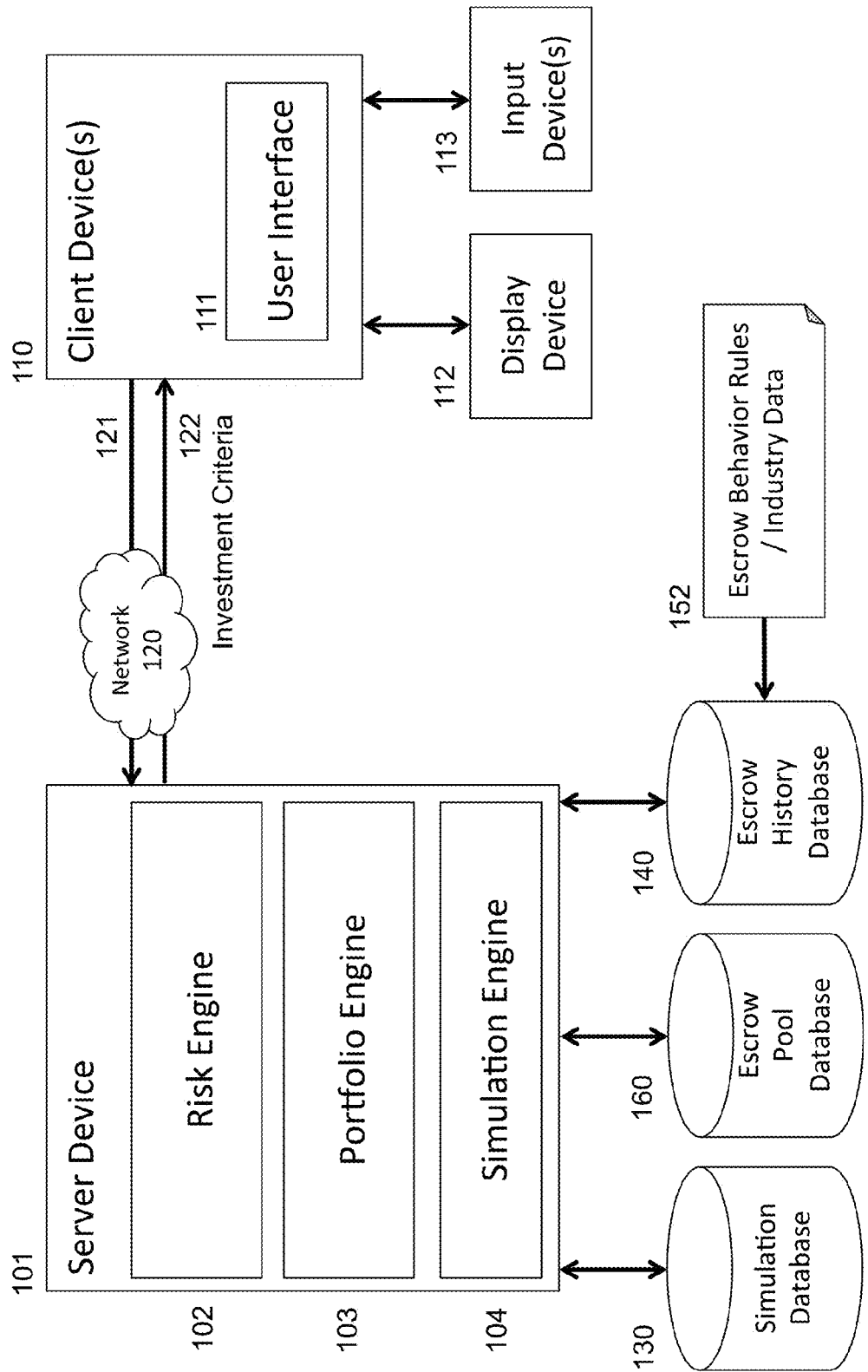
FIG. 1C shows a third preferred embodiment of a system in accordance with the present invention.

In the alternative embodiment shown in FIG. 1C, the Escrow History Database 140 is populated with Escrow Behavior Rules 151, which are optionally supplemented with other Industry Data, shown in element 152. However, there is no explicit data about specific historic escrows. By procuring data from published sources (such as the data in FIG. 39 and FIG. 40), an entity using preferred embodiments of the present invention need not have its own repository of historic escrow transactions. It can rely on summary data provided by third parties, provided that information is sufficient to build an accurate enough model. Accuracy may be determined in part by whether there is enough confidence in the data to perform optional steps of preferred embodiments of the present invention, such as including an insurance policy to provide protection against loss of principal on invested assets.

Specific systems and methods of managing a pool of escrows to maximize returns while reducing risk have been disclosed. It should be apparent, however, to those skilled in the art that many more modifications besides those already described are possible without departing from the inventive concepts herein. The inventive subject matter, therefore, should not be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of generating investment criteria for an investment vehicle that includes a pool of escrow deposits, the deposits being from a plurality of merger and acquisition transactions, the method comprising:
   (a) maintaining an escrow history database of data derived from historical behavior of escrows from a plurality of previous merger and acquisition transactions;
   (b) maintaining an escrow pool database of current escrow deposit data from a plurality of current merger and acquisition transactions, the escrow pool database including:
       (i) the current deposit amounts in the pool of escrow deposits, and
       (ii) stated terms governing the release of each deposit amount in the pool of the escrow deposits; and
   (c) generating, using a processor operating on the escrow history database and the escrow pool database, a set of investment criteria for selecting an asset pool, wherein the set of investment criteria includes maturity metrics selected from the group consisting of weighted average maturity, convexity, and maturity distribution profile.

2. The method of claim 1 wherein the data in the escrow history database of step (a) is based on actual historic escrow deposits, including:
   (i) historic escrow cash inflows, and
   (ii) historic escrow cash outflows.

3. The method of claim 2 wherein the escrow history database of step (a) further includes:
   (iii) historic information on claims made against the escrow deposits and their effect on the timing of escrow outflows.

4. The method of claim 2 wherein the actual historic escrow deposits of step (a) have stated terms governing the release of each deposit, and step (a) further includes:
   (iii) historic information on the variance of cash flows from the stated terms, and
   (iv) historic information on the reasons for the variance of cash flows.

5. The method of claim 1 further comprising:
   (d) generating, using the processor, a metric for the risk of a loss of value of the pool of escrow deposits that are invested in the investment vehicle accordance with the set of investment criteria generated in step (c), thereby allowing a third party to provide contractual protection against loss of value.

6. The method of claim 5 wherein the third-party contractual protection is used to allow for book value accounting in the calculation of payouts from the investment vehicle.

7. The method of claim 1, wherein the data in the escrow history database of step (a) is a set of rules computed from analysis of historic escrow cash inflows and historic escrow cash outflows of a group of actual historic escrow deposits.

8. The method of claim 1 wherein the escrow pool database of step (b) further includes:
   (iii) information on the rate at which escrows are expected to be added to the pool, including escrow size and escrow duration.

9. The method of claim 1 wherein the set of investment criteria of step (c) further includes metrics selected from the group consisting of sensitivity of asset selection to interest rate changes, sensitivity of asset selection to predicted rates of continuing escrow cash inflows, sensitivity of asset selection to escrow duration, diversification metrics, concentration metrics, and risk metrics.

10. The method of claim 1 wherein the generating in step (c) uses stochastic simulation methods to create best case and worst case scenarios for the value of the pool of escrows given a distribution of rates, sizes, and durations of new escrows.

11. The method of claim 1 wherein the investment vehicle is selected from the group consisting of an investment fund, a collective trust, and a total return swap.

12. The method of claim 1 wherein step (c) is repeated whenever:
   (i) new escrow deposits are received, or
   (ii) an indemnification claim is made against an escrow deposit, or
   (iii) a payout is made from an escrow, or
   (iv) an investment manager of the investment vehicle is notified of a pending cash outflow from an escrow other than a payout.

13. A non-transitory, tangible computer program product for generating investment criteria for an investment vehicle that includes a pool of escrow deposits, the deposits being from a plurality of merger and acquisition transactions, the computer program product comprising computer-readable media encoded with instructions for execution by a processor to perform a method comprising:
- (a) maintaining an escrow history database of data derived from historical behavior of escrows from a plurality of previous merger and acquisition transactions;
- (b) maintaining an escrow pool database of current escrow deposit data from a plurality of current merger and acquisition transactions, the escrow pool database including:
  - (i) the current deposit amounts in the pool of escrow deposits, and
  - (ii) stated terms governing the release of each deposit amount in the pool of the escrow deposits; and
- (c) generating, using the processor operating on the escrow history database and the escrow pool database, a set of investment criteria for selecting an asset pool, wherein the set of investment criteria includes maturity metrics selected from the group consisting of weighted average maturity, convexity, and maturity distribution profile.

14. The computer program product of claim 13 wherein the data in the escrow history database of step (a) is based on actual historic escrow deposits, including:
- (i) historic escrow cash inflows, and
- (ii) historic escrow cash outflows.

15. The computer program product of claim 13 wherein the instructions for execution by the processor perform a method further comprising:
- (d) generating, using the processor, a metric for the risk of a loss of value of the pool of escrow deposits that are invested in the investment vehicle accordance with the set of investment criteria generated in step (c), thereby allowing a third party to provide contractual protection against loss of value.

16. The computer program product of claim 13 wherein the data in the escrow history database of step (a) is a set of rules computed from analysis of historic escrow cash inflows and historic escrow cash outflows of a group of actual historic escrow deposits.

17. The computer program product of claim 13 wherein the escrow pool database of step (b) further includes:
- (iii) information on the rate at which escrows are expected to be added to the pool, including escrow size and escrow duration.

18. The computer program product of claim 13 wherein the generating in step (c) uses stochastic simulation methods to create best case and worst case scenarios for the value of the pool of escrows given a distribution of rates, sizes, and durations of new escrows.

19. The computer program product of claim 13 wherein the investment vehicle is selected from the group consisting of an investment fund, a collective trust, and a total return swap.

20. The computer program product of claim 13 wherein step (c) is repeated whenever:
- (i) new escrow deposits are received, or
- (ii) an indemnification claim is made against an escrow deposit, or
- (iii) a payout is made from an escrow, or
- (iv) an investment manager of the investment vehicle is notified of a pending cash outflow from an escrow other than a payout.

* * * * *

UNITED STATES PATENT AND TRADEMARK OFFICE
CERTIFICATE OF CORRECTION

PATENT NO.        : 8,706,599 B1                         Page 1 of 1
APPLICATION NO.   : 13/672139
DATED             : April 22, 2014
INVENTOR(S)       : William P. Koenig et al.

It is certified that error appears in the above-identified patent and that said Letters Patent is hereby corrected as shown below:

On the Title Page, Item (73), the Assignee Section of the Letters Patent should read "Acquiom Holdings LLC"

Signed and Sealed this
Fifteenth Day of July, 2014

Michelle K. Lee
*Deputy Director of the United States Patent and Trademark Office*